United States Patent [19]
Prokoski

[11] Patent Number: 5,982,932
[45] Date of Patent: *Nov. 9, 1999

[54] METHOD AND APPARATUS FOR FLASH CORRELATION

[75] Inventor: Francine J. Prokoski, Fairfax, Va.

[73] Assignee: Mikos, Ltd., Fairfax, Va.

[*] Notice: This patent is subject to a terminal disclaimer.

[21] Appl. No.: 08/762,102

[22] Filed: Dec. 9, 1996

Related U.S. Application Data

[63] Continuation of application No. 08/314,729, Sep. 29, 1994, Pat. No. 5,583,950, which is a continuation-in-part of application No. 07/984,514, Dec. 2, 1992, abandoned, which is a continuation-in-part of application No. 07/945,539, Sep. 16, 1992, abandoned.

[51] Int. Cl.$^6$ .............................. G06K 9/62; G06K 9/74; G06F 15/316
[52] U.S. Cl. ........................... 382/224; 382/278; 382/228
[58] Field of Search .................................. 382/278, 141, 382/142, 209, 218, 219, 220, 221, 215, 224, 228; 359/560, 561; 386/4, 6–8, 46, 52, 65, 68–70

[56] References Cited

U.S. PATENT DOCUMENTS

| | | | |
|---|---|---|---|
| 2,952,080 | 9/1960 | Avakian et al. | 380/54 |
| 3,279,095 | 10/1966 | Carlson | 380/54 |
| 3,829,831 | 8/1974 | Yamamoto et al. | 382/38 |
| 3,862,501 | 1/1975 | Jemseby et al. | 380/54 |
| 3,914,877 | 10/1975 | Hines | 380/54 |
| 3,984,671 | 10/1976 | Fletcher et al. | 382/31 |
| 4,185,888 | 1/1980 | Quelle, Jr. | 380/54 |
| 4,490,849 | 12/1984 | Grumet et al. | 382/31 |
| 4,544,836 | 10/1985 | Galvin et al. | 235/487 |
| 4,586,711 | 5/1986 | Winters et al. | 273/138.1 |
| 4,637,056 | 1/1987 | Sherman et al. | 382/31 |
| 4,660,221 | 4/1987 | Dlugos | 380/23 |
| 4,668,597 | 5/1987 | Merchant | 430/22 |
| 4,682,954 | 7/1987 | Cook | 380/54 |

(List continued on next page.)

FOREIGN PATENT DOCUMENTS

| | | | |
|---|---|---|---|
| 0 472 806 A2 | 3/1992 | European Pat. Off. | H04N 5/14 |
| 741051 | 5/1978 | U.S.S.R. | |
| 0691896 | 10/1979 | U.S.S.R. | 382/32 |

OTHER PUBLICATIONS

Prokoski et al. "High Security Tagging System for Evidence Marking & Verification," IEEE Int'l Conf. on Security Technology pp.86–90, Oct. 1992.

Cutaia "Multilevel Character Recognition System" IBM Tech. Disc. vol. 13 No. 12, May 1971.

"NanoScope® Combined Magnetic Force and Contact/Non-contact Atomic Force Microscope," *Photonics Spectra*, Jul. 1992, p. 59.

"Low–Noise Charge–Coupled Device," *NASA Tech Briefs*, Oct. 1991, p. 20.

"Matching Terrain–Height Maps for a Robotic Vehicle," *NASA Tech Briefs*, Oct. 1991, p. 108.

*Primary Examiner*—Bijan Tadayon
*Assistant Examiner*—Dmitry A. Novik
*Attorney, Agent, or Firm*—Cowan, Liebowitz & Latman, P.C.; R. Lewis Gable

[57] ABSTRACT

Flash correlation instantaneously compares two or more patterns to determine whether they are the same or essentially the same, regardless of the complexity of the images, and in spite of the addition of noise, local changes, and variations in resolution and focus. Flash correlation artifacts also provide cues to quantitative assessment of relative movement, stretching, blurring, and warping of one image with respect to the other. Presence of a flash correlation artifact between two stacks of patterns is sufficient to identify the stacks as containing at least one pair of massively correlated patterns. Precise control of registration, image size and orientation is not required. An image may be combined with other images, either by overlays or concatenation, and still be identified. A Flash correlation engine may utilize optical, analog or digital processing to provide rapid sorting, classification, and identification functions with minimal computational complexity.

31 Claims, 35 Drawing Sheets

U.S. PATENT DOCUMENTS

| | | | |
|---|---|---|---|
| 4,695,973 | 9/1987 | Yu | 359/361 |
| 4,701,879 | 10/1987 | Scarr | 365/49 |
| 4,776,013 | 10/1988 | Kafri et al. | 380/54 |
| 4,896,355 | 1/1990 | Iggulden et al. | 380/54 |
| 4,921,278 | 5/1990 | Shiang et al. . | |
| 4,949,381 | 8/1990 | Pastor . | |
| 4,958,376 | 9/1990 | Leib | 382/31 |
| 4,972,498 | 11/1990 | Leib | 382/42 |
| 4,995,090 | 2/1991 | Singh et al. | 382/32 |
| 5,003,600 | 3/1991 | Deason et al. . | |
| 5,029,220 | 7/1991 | Juday | 382/32 |
| 5,050,222 | 9/1991 | Lee . | |
| 5,052,807 | 10/1991 | Juday . | |
| 5,054,929 | 10/1991 | Dey | 356/401 |
| 5,067,162 | 11/1991 | Driscoll, Jr. et al. . | |
| 5,069,528 | 12/1991 | Dey | 356/401 |
| 5,146,228 | 9/1992 | Irani et al. | 382/42 |
| 5,163,101 | 11/1992 | Deering | 382/32 |
| 5,175,775 | 12/1992 | Iwaki et al. | 359/561 |
| 5,185,815 | 2/1993 | Brandstetter | 382/31 |
| 5,212,637 | 5/1993 | Saxena | 382/132 |
| 5,220,622 | 6/1993 | Scarr | 382/31 |
| 5,251,271 | 10/1993 | Fling | 382/44 |

54'

56'

58'

60'
1+2+3

62'

64'

66'

PATTERN #1

PATTERN #2

COMPOSITE = [#1 ⊕ #2]

FCA[−COMPOSITE, #1]

FIG. 18 (a)    FIG. 18 (b)
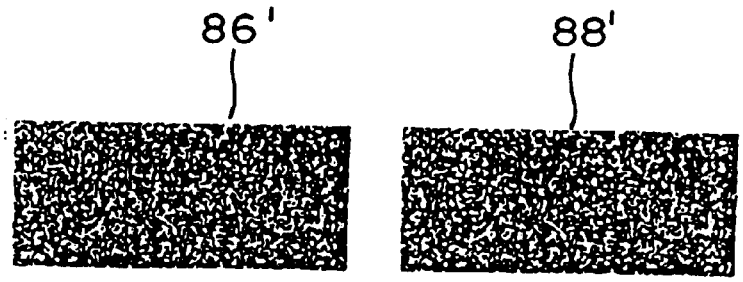
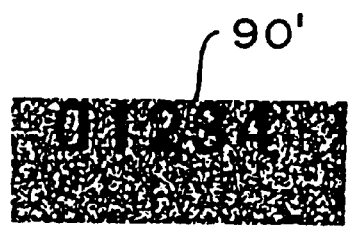
FIG. 18(c)
FIG. 19(a)    FIG. 19(b)

FIG. 21(a)　　FIG. 21(b)
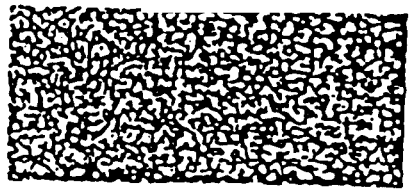
T(x,y)
⇩
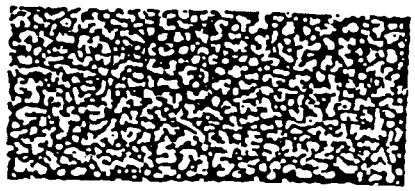
O(x,y)
R(x,y)
FIG. 21(c)
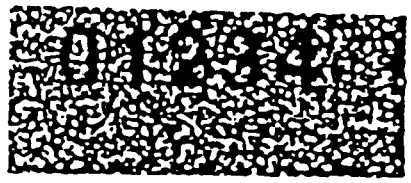
FIG. 22(a)　　FIG. 22(b)

FIG. 23(a)
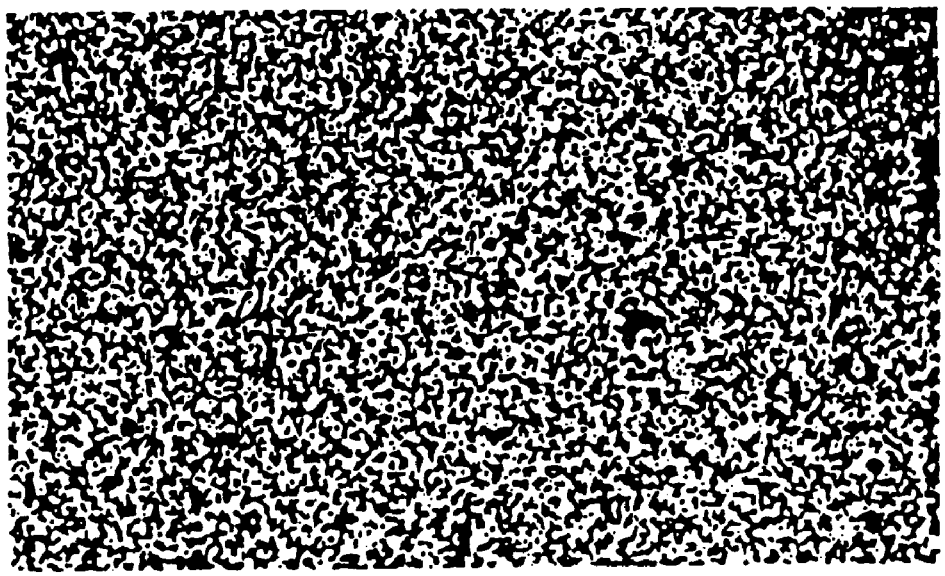
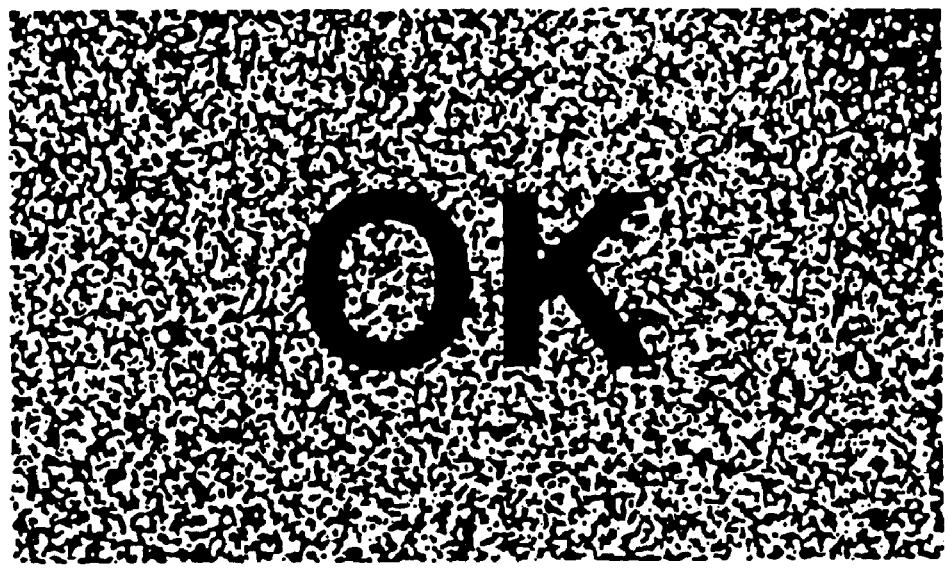
FIG. 23(b)

METHOD AND APPARATUS FOR FLASH CORRELATION

This application is a Continuation of U.S. patent application Ser. No. 08/314,729 (issued Dec. 10, 1996 as U.S. Pat. No. 5,583,950), entitled, "METHOD AND APPARATUS FOR FLASH CORRELATION", filed Sep. 29, 1994 in the name of Francine J. Prokoski, which in turn is a Continuation-In-Part of U.S. patent application Ser. No. 07/984,514 (now abandoned), entitled "METHOD AND APPARATUS FOR FLASH CORRELATION", filed Dec. 2, 1992 in the name of Francine J. Prokoski, which in turn is a Continuation-In-Part of U.S. patent application Ser. No. 07/945,539 (now abandoned), entitled "METHOD AND APPARATUS FOR CLASSIFYING AND IDENTIFYING PATTERNS", filed Sep. 16, 1992 in the name of Francine J. Prokoski.

This application is related to International Patent Application Serial No. PCT/US93/12350, filed Dec. 2, 1993 and entitled "METHOD AND APPARATUS FOR FLASH CORRELATION".

BACKGROUND OF THE INVENTION

The present invention relates to a method and apparatus for comparing two or more patterns to determine whether they are the same or essentially the same. The invention accommodates changes in size, including both linear and nonlinear warping, segmentation of either or both patterns, the addition of visual noise, local changes, and variations due to sensor conditions such as resolution and focus. The inventor has coined the term "flash correlation" to describe the method of comparison, which is inherently parallel and involves a single operation.

Flash correlation artifacts which are produced by the present invention also provide cues to quantitative assessment of relative stretching, blurring, and warping of one image with respect to the other. The existence and behavior of the flash correlation artifacts (FCAs), as well as other features of flash correlation, distinguish it from moiré' patterns. Generally, moiré' effects occur as a result of superimposed repeated patterns. The effects vary with angle, but generally occur throughout the overlaid images. Any two overlaid images of repetitive line patterns will produce moiré' effects; therefore, the existence of a moiré' effect does not indicate a match between patterns.

Patterns comprised of dots or of naturally occurring grains have been used to encode information for more than 25 years. The patterns can be generated through chemical, mechanical, photographic, or manual dispersals of particles. Carlson [U.S. Pat. No. 3,279,095 October 1966] uses photographic grains as a pseudo-random naturally occurring pattern which can be reproduced, with local photographic reversals, and used to transmit information hidden by the grain patterns. The recipient subsequently uses an overlay created photographically to unmask the embedded information. Carlson's technique required that the original and overlay be the same size and be registered exactly in order to read the information. The technique applies only to readout of a single embedded message in an image using a single overlay constructed for that image.

Cook [U.S. Pat. No. 4,682,954, July 1987] encodes a sheet of pictorial information by using one mask formed by random opaque and transparent areas, and a second mask which is the complement of the first. By photographically exposing the information through each of the two masks, the information is separated into two images which each appear to be randomized; however, the combination of the two, with precise registration and identical size, allows the original information to be read. The technique applies to readout of a single image.

Falvin et al. [U.S. Pat. No. 4,544,836, October 1985] utilize binary optical encoding techniques to generate cards for use in access control systems. Use of sandwiched layers of material prevents human viewing of the optical code without destroying the card. The access control card reader contains appropriate illumination sources to make the code visible. Bar code reading techniques are then employed to reject or accept the card. The sandwiched layers may pertain to different optical frequencies for enhanced security against counterfeit cards. Information density is not great, and precise registration is not required. Only one card at a time is read.

Winters [U.S. Pat. No. 4,586,711, May 1986] applies randomly encoded masks to generate matching cards for game applications. Employing the basic techniques of Carlson and Cook, Winters uses computer-generated binary images to create 2-card sets which overlaid together create visible images. Mass distribution of random cards, only one or a few of which match a "prize" card, can then be used for games of chance and advertising promotions. Only one possible card is compared at a time to the "prize" card. Precise registration and identical size are required.

Dlugos [U.S. Pat. No. 4,660,221, April 1987] utilizes a binary mask applied to printed characters to authenticate the characters. The mask may be varied with each use for additional security. In the intended application to authenticating postal franking machine printing, the result is to impose voids in the printed characters, where the pattern of voids can be used to authenticate the franking. Authentication involves reading out the voids in each location. Precise registration and identical size are required. Also, each void of a single image is decoded in series.

Kafri et al. [U.S. Pat. No. 4,776,013, October 1988] encode optical images by converting them to a grid of pixels where each pixel has a grey level value from at least two allowed values. The encoding is performed either optically or digitally by transmitting for each image pixel the intensity value of a master matrix, or a random value, depending on the value of the image pixel. Decoding requires use of the master matrix, and requires precise alignment between it and the transmitted encoded image. The technique applies to readout of a single image.

Others have applied similar techniques to the transmission of information via facsimile machine or over other channels. Readout of the information requires the use of a matching mask or overlay

Points of Novelty

The current invention offers the following points of novelty to the correlation of n-dimensional images:

1. Presence of a Flash Correlation artifact between two or more dispersed patterns is sufficient to identify the patterns as matching, given that the dispersion statistics are sufficiently random. It is not necessary to decode the images or to perform pixel by pixel comparison in order to identify a match.

2. Precise registration is not required between images being compared.

3. Precise control of image size and orientation is not required between images being compared.

4. Multiple images can be compared simultaneously.

5. The optical system for readout and comparison of images need not be able to resolve individual pixel elements.

6. Authentication of a pattern can be performed in one operation, regardless of the complexity of the pattern.

7. Multi-colored or multi-grey level images can be similarly authenticated or identified.

8. The sizes of images to be compared need not be the same. Both size and shape may be different.

9. An image may be segmented into many sections, and flash correlation will provide a method to recombine the sections. Also, each section may be individually authenticated and read out.

10. An image may be combined with other images, either by overlays or concatenation, and the image may still be authenticated and read out.

11. Neither photographic nor computer-generated images need be used; any manmade or naturally occurring pattern may be used for authentication and identification. In general, it is desired to use patterns which are unique enough to provide sufficient differentiation within a class of images. This novelty feature provides the security and the aesthetics of nonobvious marking.

12. Flash correlation techniques may be applied in highly unstructured scenarios in which the dimensional stability of the pattern material would render useless other optical encoding or optical marking techniques.

13. Minimal training and minimal equipment is needed to employ flash correlation, even for highly secure information transmission, in which the size, shape, texture, extent, color, density, and material of the information medium is unknown.

14. Camouflage patterns, or additional information may be superimposed on an image without destroying its readability or authenticate ability. A combination of visible and invisible patterns may be used, and all or any or the subpatterns may be authenticated or identified.

15. Due to the speed of flash correlation, it is practical to utilize flash correlation on every frame of a full motion video image to compare it against a reference tape in real time.

16. When used for marking of items, in comparison with 2-dimensional bar codes, the density of information contained in the pattern is limited only by the size of particles used. All particles need not be the same size or shape, in which case the achievable density of information is a function of the distribution of sizes and shapes.

17. Reusable tags which employ a bladder of loose particles can be conveniently utilized with flash correlation. Such tags cause a unique pattern to be generated each time a seal is opened or each time an object is disturbed.

18. By using existing patterns caused by tool marks, paper fibers, or material filaments, or by using applied patterns created by spray paint, there is minimal cost to generate unique patterns for subsequent authentication and identification using flash correlation.

19. Flash correlation is inherently parallel and not computationally intensive. Therefore, the cost to implement flash correlation for high throughput authentication and identification is less than competing techniques.

20. The robust nature of flash correlation allows its use from a distance and under uncontrolled conditions in which no ground truth information is available. Therefore, it is more appropriate for invisible marking and tracking applications. Likewise, the flexibility in marking materials and methods, including spraying with materials visible only at specific optical frequencies, lends itself to operational scenarios in which vehicles, parcels, and other items must be marked in situ and invisibly.

21. By utilizing either pseudorandom-generated patterns, or read-after-write random patterns, flash correlation offers the ability to overlay additional patterns as an item advances through a manufacturing or distribution cycle. The total composite pattern, or any number of subpatterns can subsequently be authenticated or identified. The pseudorandom pattern can be generated from biometric data, such as minutiae from a fingerprint reader. Therefore, in chain of custody uses, each person taking possession of a document or item can automatically overlay his mark (his pseudorandom pattern) on that of the preceding recipients. Flash correlation can authenticate all such overlaid marks.

SUMMARY OF THE INVENTION

The present invention provides method and apparatus for classification and identification of dispersed patterns such as: markings made on objects, scenes imaged by cameras, and coded information derived from a variety of sensors. It is a feature of the present invention that it provides a common identification technique to be used with any sensor whose data may be presented as 2-dimensional patterns, or considered as a sequence of 2-dimensional slices.

It is another feature of the present invention that it can utilize fuzzy locus, blurred, or otherwise degraded imagery, defaced or partially destroyed imagery, and imagery taken under different conditions such as range and angle from the reference patterns.

It is another feature of the present invention that it provides identification from long distances, and in real time or with post-processing.

It is another feature of the present invention that it provides instantaneous indication of a match within a stack of reference images.

In accord with the objects of the invention, the method and apparatus for generating and/or extracting patterns and subsequently classifying and identifying them generally comprises:

1) techniques and apparatuses for marking 2) database of marks made 3) techniques and apparatuses for extracting patterns 4) optical, digital, or other processor for performing the flash correlation 5) comparator for analyzing the results of the flash correlation.

6) techniques and apparatus for updating the database to reflect additional or newer patterns 7) techniques and apparatus for establishing decision thresholds and using them to direct the search through the database.

"Flash correlation" refers to the instantaneous indication of massive correlation between two or more n-dimensional records. "Flash correlation" means the process of overlaying two patterns, with one rotated and either inverted or not inverted with respect to the other, so as to produce a region with density statistically higher or lower than the rest of the overlaid pattern area, when and only when there is sufficient similarity between the two patterns.

"Flash correlation artifact" means a region of statistically different density, which may be repositioned within the overlaid area by relative translation of the two overlaid patterns having relative rotation.

As used herein, "pixel" means, in optical or analog processing, that area which defines the threshold of detectability (i.e., the minimum resolvable area increment), and in electronic processing, the conventional meaning of position in a rectilinear grid.

"OR'd" herein is used in the classical Boolean algebra sense of inclusive "or" where inclusion in either or both of two sets gives inclusion in the resulting set.

For this invention, it should be understood that a "record" is a 2-dimensional dispersed pattern or data array. The dispersed pattern may be random, pseudorandom, or nonuniformly distributed throughout a 2-dimensional region. In the ensuing discussion, the use of 2-dimensional records will be assumed. Different types of records will also be mentioned. A "base record" is the fundamental element of a database. The base record is an identifier record so that if an unknown record can be correlated with a base record, the unknown record becomes identified. Thus, a base record has associated with it all necessary and desirable identification information.

A "composite record" is assembled or made up from two or more base records. Sometimes it is convenient to think of a composite record as a stack of base records. The base records may be laterally offset with respect to one another, with or without overlap, in the composite record so that the resultant composite image has an acceptable density. The composite record can also be generated by simply superposing the several images so that they are in general vertical alignment.

An "inverted record" may be a base record or a composite record. Considering the record as being composed of a multiplicity of differential image elements or pixels each having a corresponding density, the image density at each differential image element in the inverted record is the inverse of the image density of the corresponding differential image element of the corresponding noninverted record.

"Superimposition" and "superposition" are used in their broad sense of overlaying one record with a second record. It is not significant which record is on the top or which record is on the bottom during superimposition or superposition. Superimposition or superposition of two dispersed patterns which are sufficiently correlated will produce one or more "correlation artifacts" which can be used to assess inclusion (i.e., authentication) of the two dispersed patterns or records, match one pattern or record with another, sort patterns or records, and/or identify specific patterns or records. Further, when identification has been established, a correlation artifact can be used to dewarp an unknown pattern or record. A correlation artifact has behavioral characteristics which, when observed, are indicative of the existence of a massive correlation between two records, and when not observed, are indicative that no correlation exists between those two records. The behavioral characteristics of a correlation artifact are that (a) a lateral movement of superimposed records results in a transverse movement of the suspected correlation artifact, the transverse direction being at an angle to the direction of lateral movement; (b) a transverse movement of the superimposed records results in a lateral movement of the suspected correlation artifact; (c) rotation of the superimposed records about an axis through the suspected correlation artifact causes a generally radial change in the size of the suspected correlation artifact; and (d) rotation of the superimposed records about an axis offset from the suspected correlation artifact causes a generally radial movement of the suspected correlation artifact.

"Dewarp" is used here in the sense of transforming a 2-dimensional record so that the orientation and scale of the record conform to the orientation and scale of a corresponding known record where the record being dewarped can be locally rotated, and locally scaled, by nonuniform amounts throughout its 2-dimensional extent.

"Pattern element" means the dot, grain, particle, or other markings which comprise the pattern. For electronic images, the pattern element may be pixels. The pattern elements may vary in color, size, shape, texture, and other features, and various types of elements may be combined in a given pattern. "Pattern" means an n-dimensional arrangement of pattern elements. The arrangement may be generated by random, pseudorandom, naturally-occurring or manmade processes. For discussion and illustration in this document, 2-dimensional patterns will be used.

"Known pattern" means a pattern which has been established as a reference, with known identity.

"Unknown pattern" means a pattern whose identity is unknown, and which is to be established through flash correlation with known patterns.

"Pattern stack" means the combination of two or more patterns to form one composite image. The composite may be formed by optically or by analog or digital means. The individual patterns may be scaled, rotated, and/or offset prior to forming the composite in order to avoid saturation of areas of the composite image such that an area of the composite becomes a single extended element. Throughout the discussion, any reference to a pattern may alternately be applied to a pattern stack.

"Inverted pattern" means a reversal of the grey scale or color density of each element in the pattern. In the case of binary black/white images, this means the negative of the original pattern. In the case of grey scale images, the grey scale is reversed. In the case of color images, the color assignment is reversed. Overlaying a pattern and its inverted pattern, with exact alignment, results in an image which is solid black, uniform grey, or uniform color in the case of binary, grey scale, and color patterns respectively.

"Overlay" means superimposition of two or more patterns. When performed optically, the patterns are on transparent backgrounds so that the result is to combine the patterns into one. When performed digitally, the patterns are represented by matrices which are logically "OR'd" together with an inclusive "OR" in the Boolean sense.

Flash correlation refers to the overlay of patterns which, when sufficiently similar, produces flash correlation artifacts. The existence of the correlation artifact serves to: authenticate that an unknown pattern is included within a set of known patterns; identify matches between unknown and known specific patterns; sort the candidate matches for a given unknown pattern as to which is the best match and which is or are marginal matches; and correct or de-warp an unknown pattern so as to improve its match with a particular known pattern.

The appearance of a flash correlation artifact is sufficient to indicate that a match exists between the overlaid patterns [or between patterns within stacks]. The lack of a flash correlation artifact, given that the relative rotation and translation are within the ranges dictated by the parameters of the patterns, is sufficient to indicate that no match exists. Therefore, although the characteristics and behavior of the flash correlation artifacts offer quantitative information for analysis of the compared patterns, in the simplest application the appearance or lack of appearance of the FCA is the primary function of the invention.

When the behavior of the FCA is to be considered, additional processing steps are required. For the case where the two overlaid patterns are the same size, and are essentially identical ("massively correlated"): When the two are translated with respect to each other, the FCA moves normal to the imposed translation. When the two overlaid patterns are rotated about a point which is not within a flash correlation artifact, the FCA moves radially. When the rotation is about the FCA itself, the size of the FCA increases as the angle is decreased, and include the entire overlaid image area when the angle is zero.

For the case where the two overlaid patterns were essentially identical, but where one has been stretched or warped with respect to the other, FCA's will still exist, given that the degree of warping is within range determined by pattern element size and distribution. When the two are translated with respect to each other, the FCA moves at an angle to the imposed translation. The difference between the angle observed and the 90 degree angle observed for same-size patterns is a measure of the relative warping between the two patterns in the area of the FCA. When the two overlaid patterns are rotated about a point which is not within a flash correlation artifact, the FCA moves along an arc. The variation of that arc from a straight radial movement is another measure of the relative warping in the area of the FCA. When the rotation is about the FCA itself, the size variation of the FCA as a function of the angle of rotation is another measure of the relative warping in the area of the FCA.

By successively and systematically repositioning the FCA to positions on a grid, correcting the local warping based on the measures defined above, and then refining the grid, two patterns may be dewarped with respect to each other to within an arbitrary degree of variation. Change detection can then be performed by rotation into alignment and differencing of the two patterns.

Two patterns do not need to be of the same size in order to be compared using flash correlation. In the case where one pattern is a fragment of the other, FCA's will occur when the fragment is overlaid at the approximate area of the reference pattern to which it corresponds. In the general case where two patterns do not have the same boundaries and size, it is necessary to search for FCA's by overlaying each area of each pattern with each area of the other; otherwise the virtual location of the FCA may be outside of the overlaid area and not visible.

For automated recognition of the existence and behavior of FCA's, it is necessary to characterize the patterns as to the size and distribution of pattern elements. In the search for the existence of an FCA, the density of any area which is a candidate FCA can be evaluated based on the overall statistics of the two patterns. The probability can be calculated that any candidate FCA is an actual FCA and not merely an area of anomalous density in one or both patterns. Based upon an established database of known patterns to be matched against unknown patterns, the statistics of the known patterns can be used to set a threshold for recognition of the FCA with any matching pattern. If it is desired to decide match/non-match in a single operation, then the density statistics of the overlaid patterns are compared to the threshold determined by analysis of the database.

Each pattern added to the database is correlated with itself and with at least a sampling of the patterns already in the database, over a range of rotation angles. The density and size of the resulting FCA's are calculated. Each pattern is also correlated with other patterns having the same statistics but not matching; for example, a mirror image of the pattern. No FCA will result, but the density of areas equal in size to the FCA area can be measured. A range of rotation angles, FCA sizes, and FCA densities can be established such that any unknown pattern to be compared to the database will produce an FCA with at least a certain size and density when overlaid at an angle within the determined range. This analysis of the database facilitates single-operation match identification against databases of statistically uniform patterns.

If the known patterns have a high degree of variation, if statistical analysis of the database of known patterns is not performed, if use of multiple operations per decision is permitted, and under other situations, then any overlay of patterns which produces a candidate FCA should be subjected to a translation or rotation about the FCA or rotation about another point. Subsequent detection of an FCA repositioned in the predicted location provides proof of the validity of the candidate FCA.

In the case where a pattern stack has been used and an FCA identified, the stack can then be partitioned into two or more substacks. Any substack which does not produce an FCA can be eliminated from further consideration. A substack which produces an FCA can be further divided as desired to pinpoint the exact matching pattern.

In the case of databases of many similar patterns, such as successive photographs of the same scene, there may be several matches which produce FCA's. When inverted unknown/known patterns are compared, the best match will correspond to the densest FCA, providing the capability to rank order candidate matches. Updating of a database can be performed by saving newer matches which meet specified criteria.

Implementation of the method can utilize patterns from any naturally occurring process or intentional marking techniques. These include dispersal of particulates through chemical, mechanical, or manual techniques such as: spray painting, sputtering, tool marks, naturally occurring paper fibers, distribution of additives during manufacture of glass, plastic, and other materials, application of particles to adhesive surfaces, scratching or otherwise removing materials from a surface, and use of signatures, fingerprint minutiae, extracts from voice prints, or other biometric data. The pattern information can be extracted through optical scanning, sonar or radar traces, acoustic monitors, computer generation, or any other sensor which produces an n-dimensional pattern. Any article can therefore be marked and later authenticated including: documents, signatures, medical containers, forensic samples, medical test samples, and items for which chain of custody must be maintained. By applying the pattern across entry or access points, tamper indication can be provided.

The method of this invention can utilize fuzzy logic, blurred or otherwise degraded images, defaced or partly obliterated patterns, and scenes taken under various conditions such as distance, angle, and lighting.

Use of the method with biometric data is particularly useful to identify persons who have been previously enrolled in a database. The robustness of the method allows for variations of the sort found in biometrics data collections, including for example curvature, blurring, intensity, overlaid patterns, and partial obliteration found in latent fingerprints. Due to the method's ability to detect any match within stacks of patterns, overlaid latent fingerprints can be analyzed without the need to decompose them into separate prints.

Particularly in the case of large databases, it is advantageous to prepare the database of known patterns in such a manner as to enhance the speed with which it can be searched. In this connection, database preparation may include the step of determining average or typical characteristics of the correlation artifacts of the type to be found when searching the database. To this end, it is preferred that database preparation includes the step of determining average or typical characteristics of the correlation artifact of the type to be found when searching the database. Preferably, that step is performed on each record as it is placed in the database. To this end, each selected known pattern to be included in the database is duplicated, inverted, and flash correlated with itself (autocorrelated). The FCA will be solid black in the case of binary patterns. The density distribution of the non-FCA areas of the composites formed at varying rotation angles provides a classification tool for characterizing that pattern.

When later an unknown pattern is compared against the database of known patterns, the unknown pattern may very likely not be perfect replicas of any of the known patterns. Rather, the unknown pattern is expected to include noise, to perhaps be of different scale and orientation, and to perhaps be of different size and include more or less data than the known patterns. As a result, the FCAs produced will not be solid black and may not be of regular shape. The extent to which the FCA varies from solid black, and the extent to which it varies from a regular shape indicate the degree of difference between the known and unknown patterns.

Cross correlation between all known patterns in the database, and consideration of the characteristics of the composite patterns and any FCAs produced, provides a measure of similarity between any two known patterns and among the database in general. The statistics of those characteristics can be analyzed to assess the probability that any high density area resulting from flash correlation between a database pattern and an unknown pattern is in fact an FCA, without the need to test the candidate FCA through translation.

When known patterns are highly structured or include extended pattern elements, the patterns may be scrambled to break up the extended elements. The scrambling technique must be similarly performed on each pattern to be compared. Such scrambling will in general increase the detectability of the FCA relative to non-FCA areas in the overlaid composite patterns. However, all patterns to be compared must be sufficiently aligned that corresponding subpatterns are shuffled to corresponding positions. In general, this requires that the shuffling or scrambling technique must provide that the extent of misalignment be smaller than the size of the subpatterns which are scrambled within the patterns.

BRIEF DESCRIPTION OF THE DRAWINGS

Many details and advantages of the present invention will be apparent to those skilled in the art when this document is read in conjunction with the attached drawings where matching reference numbers are applied to matching elements and where:

FIG. 18 illustrates a two-part tag used for authentication with an embedded message;

FIG. 19 illustrates that the same two-part tag may produce different messages when read with two different overlays;

FIG. 21 is an illustration of a two-part random tag and the resultant overlay with message;

FIG. 22 is an illustration of a two-part random tag using a common random background where different overlays provide different messages; and FIG. 23 is an illustration of a two-part random tag using spray paint pattern for the random background and an overlay to define a message.

DETAILED DESCRIPTION OF THE PREFERRED EMBODIMENTS

Figure 1A:
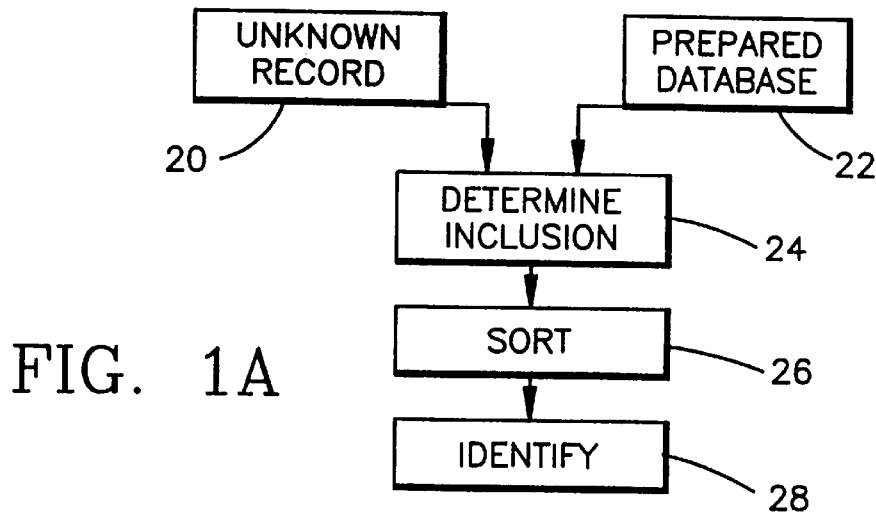
FIG. 1A is an overview of the hierarchy of record identification provided by the present invention.

The present invention relates to the production and use of "flash correlation artifacts" generated by digital, optical, or other analog processing on pairs or stacks of known and unknown patterns. Through appropriate rotation and translation between the known and unknown patterns, "flash correlation" artifacts are produced if and only if there is "massive correlation" between two or more of the patterns. Flash Correlation therefore provides a method for identification of complex images which is computationally non-intensive and highly forgiving of variations and flaws in the imagery to be identified. The presence of the artifacts persists even when there is significant variations in image size, image angle, pixel size, local distortions, and defacements such as scratches, dust, and partial obscuration. The invention therefore has general applicability to a wide variety of identification and sorting tasks.

The preferred embodiment of the invention relates to the use of computer-generated printed tags consisting of pseudo-random patterns of dots of any desired density, distribution, and size. Such patterns being subsequently recorded and compared via flash correlation with the database of original patterns. In the case of optical or analog processing, light transmission is blocked through the overlaid stack where there are particle elements in any one of the stacked images, and light is transmitted where no stacked pattern demonstrates particles. In the case of digital processing the multiple images are "OR'd" together to produce the resulting composite image.

Artifacts (Flash Correlation Artifacts or "FCA's") are produced when and only when there is massive correlation between two or more patterns in the overlaid stack. The presence of the FCAs can be identified by locating regions of the composite image stack which move in predictable directions and to predictable extent as a result of induced translation between subsections of the stack. Existence of the FCAs serves to identify that an unknown pattern is massively correlated with a pattern in the stack. By subdividing the stack repeatedly, the correlated patterns can be identified.

In certain intended applications, it is sufficient to know that a match exists within a stack. In other applications, it is sufficient to know that there is a match within a certain substack. In yet other applications, it is necessary to know the particular individual patterns which are a match. The present invention is designed to perform each such level of matching, through recursive use.

Initial passes through the flash correlator produce indication that a match exists between one or more unknown patterns and a database of known patterns. Additional passes limit the candidate pool to the extent required. In the case where a particular single known pattern is indicated as a match against a particular unknown pattern, FCA analysis can then be used to de-warp the two images with respect to each other.

Due to its intended application as an automated pattern identifier, as in authentication of applied dispersed particle tags, the Preferred Embodiment of the present invention utilizes:

1. method and apparatus for generating 2-dimensional pseudorandom patterns, including: a digital computer, a pseudorandom number generator, and a printer;

2. method and apparatus for scanning of 2-dimensional random patterns;

3. method and apparatus for performing and assessing the results of flash correlation, including an optical or digital computer, a database of reference patterns along with its statistical analysis, and display for output from the correlator.

Other embodiments of the invention may utilize patterns produced by the following or by other techniques:

1. The patterns may be naturally occurring, such as images taken from a distance of scenes including roadways, trees, etc., scratches on an object, paper fibers in a document, tool marks made by or on a tool during fabrication or use, security threads in currency notes, ballistics marks, and similar two or three dimensional images which may be produced through visible viewing, relief imaging, transilluminance, stryographing, or other techniques.

2. The patterns may be computer generated text, symbols, scenes, maps, audio or other information encoded into patterns of dots for the purpose of marking, or incidental to the marking use.

3. The patterns may be intentionally or incidentally made by the chemical, mechanical, or manual dispersion of particles such as paint, sizing, conformal coatings, or other particulates to produce a pattern, which can be three dimensional, involve unlimited colors, and be comprised of various size particulates.

4. The patterns may be the arrangement of printed circuit board traces and components, or other manufactured compositions such as sheets of pharmaceutical tablets arranged in blister packs.

5. The patterns may represent codes, such as:
   a. Two-dimensional bar codes.
   b. Audio coded information using frequency hopping at time intervals.
   c. Optically encoded and, embedded messages.
   d. Patterns assigned to words or phrases for text search applications.
   e. Binary-coded features of a scene or multiple-choice exam answer sheets.

6. The patterns may be appliques applied to objects for the purpose of quality analysis, such as markings stenciled onto an object for the purpose of indicating manufacturing variations in the object at rest, or under loading or stressed conditions.

7. The patterns may be produced from biological markers, such as fingerprints, DNA samples, voice prints, handwriting, or facial features—which patterns may be preprocessed to extract minutiae points.

8. The patterns may represent data from visible, infrared, radar, millimeter wave, laser interferometer, x-ray, nuclear magnetic resonance, computed axial tomography, or other sensors.

9. The patterns may represent the illumination distribution across ends of a fiber optic cable, or bundle of cables.

Other embodiments of the invention may utilize the following or other equipment for subsequent scanning of patterns and flash correlation:

1. Non-CCD cameras, optical scanners, optical digitizers, relief image extractors, styographs, photomicrographs, satellite-based collection systems or other techniques may be used to extract a pattern for analysis.

2. The database of reference patterns may be stored in the form of: transparent 2-dimensional overlays, digitized images (compressed or not), seeds used to generate pseudorandom patterns, or analog signals. In the case that the patterns represent encoded information, either the information or patterns may be stored.

3. The flash correlation procedure may be performed by manual overlay of two or more transparencies, or by digital, optical, or other analog computer. Identification of the flash correlation artifacts may likewise be performed by human visual observation, by pattern recognition automated techniques, or by statistical analysis within the computer.

As a predicate for understanding the fundamental invention here, it is instructive to consider a 2-dimensional pattern of binary information—a base record. When a transparent copy of that image is prepared and superposed on the base record, several fundamental observations can be made: (i) if the copy and the base record are perfectly aligned, there is no observable distinguishing characteristic; (ii) if the copy and the base record are rotated relative to one another, there is a generally circular region of anomalous density—low density; and (iii) if a relative translation is imposed on the base record and the copy, the region of anomalous density experiences a generally orthogonal displacement. Such a region of anomalous density is an example of a correlation artifact.

These correlation artifacts have now been discovered to exhibit impressive properties. For example, correspondence between an unknown record and a known record is established if an unknown record and a known record are overlaid or superposed, and the presence of a correlation artifact is detected. Should the known record be a composite record, that phenomenon is also sufficient to determine the inclusion of the unknown record in a composite of two or more known records. Again, the existence of a correlation artifact is determinative of the presence of a match between the unknown record and one of the base records comprising the composite record.

A correlation artifact will be observed as long as there is a threshold correlation between the unknown record and the known record. More particularly, a correlation artifact will occur under any and all of the following conditions:

i. one of the known and unknown records is elongated relative to the other (i.e., "1"-dimensional stretching);

ii. one of the known and unknown records has a different scale than the other (i.e., "2"-dimensional stretching so as to be larger or smaller);

iii. one of the known and unknown records is rotated with respect to the other about an axis normal to the records;

iv. the plane at which one of the known and unknown records was created lies at an acute angle to the plan at which the other was created;

v. one of the known and unknown records is a portion of the other;

vi. one of the known and unknown records has variations of scale, rotation, and inclination relative to the other—variations which are nonuniform throughout the planar extent of the record;

vii. one of the known and unknown records has changed portions relative to the other;

viii. one of the known and unknown records has its density inverted relative to the corresponding base record;

ix. one of the known and unknown records is scratched or partially obliterated;

x. the known and unknown records have different colors;

xi. either or both of the known and unknown records comprise a composite of several records; and xii. one of the known and unknown records is offset with respect to the other.

As the foregoing list illustrates, the presence of a correlation artifact as an indicator of correspondence or as an indicator of inclusion is highly forgiving to differences between the known and unknown records—not only as to size and position, but also as to record quality and identity.

When at least 70% of the differential image elements or pixels exist in both of the two superposed records, it has been observed that the threshold correlation condition is satisfied. The threshold correlation may be lower depending upon particle size, particle density, and particle distribution. More specifically, larger particles and denser particles tend to lower the threshold correction whereas broader particle dispersion tends to increase the threshold correction.

There exists a variety of applications where it is only necessary to know whether an unknown record is included in a particular database of known records or a part thereof. Examples which readily come to mind include verification that a record has been cataloged in the database, verification that an image is part of the database of acceptable images, verification that an image is not in a database of unacceptable images, etc.

In part, the forgiving character of the correlation artifact may give rise to correlation artifacts being found in the comparison of an unknown record with more than one base record. For example, many of the records showing sequential views of an area undergoing changes during intervening time periods may give rise to correlation artifacts with an unknown record taken while the changes were occurring. Under those circumstances, the known records with correlation artifacts are sorted and ranked according to the character of the correlation artifact. The best correlation between the unknown record and the known records is, then, the known record with which the unknown record creates the strongest (i.e., densest where one record is inverted) correlation artifact.

Where the known record is a composite of several base records, then the unknown record must be compared to each base record of that composite in order to specifically identify the unknown record. Again, the presence or absence of a correlation artifact is the mechanism for selecting the best match between the unknown record and the known base records.

Where the known and unknown records have been prepared using the same technique, the correlation artifact appears as a region of anomalously low density in the superposed records. Alternatively, where one of the known and unknown records is inverted, e.g., a negative, then the correlation artifact will appear as a region of anomalously high density in the superposed records. For applications where the known and unknown records have color, correlation artifacts will still be observed—the correlation artifact is simply colored. In this connection, it is noted that color can be useful in detecting changes between an unknown record and its corresponding base record.

In a broad sense then, the steps of this invention involve (see FIG. 1A) determining inclusion 24 of an unknown record 20 in a database 22 according to the presence or absence of correlation artifacts, sorting 26 known records according to the strength of correction artifacts, and identifying 28 of the unknown record to a specific base record of the database according to the strength of a correlation artifact.

Where the unknown record or specimen 20 is to be examined with respect to a large database (see FIG. 1A), it is preferred that the database 22 of known records be suitably prepared to expedite the search. More particularly, it is preferred that the database be partitioned so that a predetermined number of base records can be searched simultaneously in each partition. The step of partitioning the database permits the use of a massively parallel processor (MPP), and the concomitant reduction in search time. For example, each partition of the database could be assigned to a corresponding processor of the MPP. Currently available MPPs can have 64,000 to 200,000 central processing units (CPUs) operating at $10^8$ operations per second. By replicating the unknown record and searching the database partitions in a parallel manner in an MPP, search times to ascertain inclusion of an unknown record 20 in a gigantic database 22 can be reduced to fractions of a second. For purposes of this invention, optical processors can be considered as MPPs with even faster operation times.

The task of correlation may also involve picking which one of the several base records most closely represents the unknown record. For example, if the database includes records showing a sequence of changes to a record, there will be correlation between the unknown record and several records in the database. Under such circumstances, it will be necessary to sort 26 the matched records to evaluate which has the highest level of correlation. In this fashion, the base record having the greatest similarity to the unknown record is readily selected.

Should it be necessary to then identify 28 a specific base record as corresponding to the unknown record, the selected database partition can be further partitioned or subpartitioned, and searched in the same fashion. Further partitioning continues until the particular known record has been identified to which the unknown record corresponds.

There are myriad applications for this correlation technique in which the database of known records may include as few as one record or as many as billions of records. For example, in a manufacturing process, the unknown record could be an image of a printed circuit board which is being examined to determine if all its components and circuits are correct and properly located, while the database of known records could simply be the image of a correctly manufactured circuit board. In a larger database, the unknown record might be a document such as a stock certificate or bond which is being tested for authenticity, and the database of known records would include images of each such document at the time it was issued. A still larger database could include millions of records such as the fingerprint records maintained in government agencies, with the unknown record being a particular fingerprint as to which identification is desired. The database might even comprise images of each pill manufactured by a drug company, while the unknown record is a particular pill being examined to see if tampering has occurred. Particularly in the case of large databases, it is advantageous to prepare the database of known records in such a manner as to enhance the speed with which it can be searched. In this connection, database preparation (see FIG. 2B) may include the step of determining average or typical characteristics of the correlation artifacts of the type to be found when searching the database. To this end, it is preferred that database preparation includes the step of determining average or typical characteristics of the correlation artifact of the type to be found when searching the database. Preferably, that step is performed on each record as it is placed in the database. To this end, each selected base record 30 to be included in the database is copied 32. The copy and its corresponding base record are then superposed 34. One of the base records and the superposed copy is rotated by an arbitrary angle measured around an axis perpendicular to the plane of the records so that an autocorrelation can be performed on that base record. By placing the axis of rotation at the center of the base record, some economies of analysis are effected. An autocorrelation artifact will be centered on that axis of rotation. The characteristic dimensions of that correlation artifact are then determined or evaluated 36. For electronic processing, such evaluation can be effected by integrating or summing data density in a square region of preselected size, centered about the axis of rotation. The preselected size is determined so as to be large enough to encompass correction artifacts of the anticipated size. The known base record and statistical details of size are stored in the database.

By varying the angle of rotation between the base record and its copy in increments, the angular rotation limits, i.e., the maximum and minimum angle at which a correlation artifice occurs, can be evaluated 36. Characteristic dimensions of the correlation artifice 38 can be determined by varying the preselected size of the square region.

Using such information from the base records, the maximum and minimum limits, $\phi$max, $\phi$min, for the allowable range of angular rotation can be determined to any desired or predetermined statistical accuracy. The optimum angle, $\phi$opt, for the angular rotation is preferably selected as that angle where the correlation artifact has the largest characteristic dimension. The characteristic dimensions of the correlation artifacts from the base records are analyzed statistically to identify the average characteristic dimension, Ravg, and the standard deviation of the characteristic dimensions, $\sigma_R$. Knowing these properties of the correlation artifacts in the database, a square region can be selected within which a correlation artifact will likely be confined. That region has a side with a length equal to Ravg+n$\sigma_R$, where "n" is in the range of from 1 to 4 and preferably in the range of 2–3. Most preferably, "n" is selected as being about 2.

By examining the correlation artifact from an autocorrelation of each base record, a procedure is established for checking the base record data. More particularly, if a particular base record gives autocorrelation data having extreme values relative to the other base records, then the data of that particular base record may be erroneous and must be checked.

The base records can also be individually examined to assess the typical image density, $\rho$, of base records 40 comprising the database. Evaluation of the image density may be accomplished by integrating the base record pixel-by-pixel, comparing the integrated value of image density to that of an opaque image of the same size. Those image densities are then statistically analyzed to determine an average, $\rho$avg, and a standard deviation of the densities, $\sigma\rho$. By selecting a threshold density, P, that will permit a reasonable amount of transparency, e.g., something in the range of 0.5 to 0.8, with about 0.75 being preferred, the number of base images which can be combined in a stack can be established. For example, where "i" is the maximum number of -records that can be superimposed, the integer portion of the following relationship can be used:

$$"i" = \frac{P}{\rho_{avg}"n"\sigma_q} - 1$$

where "n" is selected to be in the range of 2–5 and preferably about 3.

Knowing the number of base records which can be superimposed, "i", a composite of at least two known records can be made such that the density of the composite record will be less than the predetermined threshold density. Those composite records can then be stored as searchable composite records. It should also be understood that less than all the base records can be analyzed to determine characteristics of the correlation artifacts. Thus, it is also within the scope of this invention to select a representative sample of base records, analyze them as described above, and use that information to evaluate various parameters discussed.

Furthermore, it should be understood that any particular base record can be reduced to a format in which characteristic elements become the base record. For example, the known record could be filtered, transformed, and/or sampled to reduce it to characteristic elements. Filtering may, without limitation, include selecting particular wavelength reflections, selecting specific minimum particle sizes, and the like. Transforming may, without limitation, include manipulating the base record so that identified features match a predetermined spatial relationship. Sampling may, without limitation, include picking a particular area from record as the indicator. Some base record information is adaptable to representation by characteristic elements, in which event, the base record can simply be those characteristic elements. By way of example, fingerprints can be represented by the spatial arrangement of minutia points corresponding to the location of selected features of the swirls, deltas, and ridge terminations. That distribution of minutia points is an ideal base record format for fingerprint searching.

To increase the probability that an unknown image will be disposed at an angle that will give rise to a correlation artifact, each base record of the database is preferably subjected to a predetermined rotation 44. That predetermined rotation can correspond to the angle $\phi opt$ so as to maximize the size of the anticipated correlation artifact.

So that an unknown image can be compared to a composite of several base images, as many as "i" base images can be stacked 46 directly upon one another to create a composite record. To increase the number of base records that can be stacked, the base records can be overlapped by a distance related to the reciprocal of "i" so that at no place is there more than "i" records in depth. Where the base records are accumulated in offset stacks, the unknown record is replicated so that it covers a commensurate area.

It has been found that high density correlation artifacts are simpler to identify than are low density correlation artifacts. Accordingly, it is preferred that each base record be subjected to binary inversion so that a high density correlation artifact will result during database searches. In addition, recognizing that no correlation artifact will exist when two images have not been rotated with respect to one another, the inverted base record is subjected to a predetermined rotation before assembly into a searchable composite record. That rotation is selected to be $\phi_{opt}$.

Figure 3A:
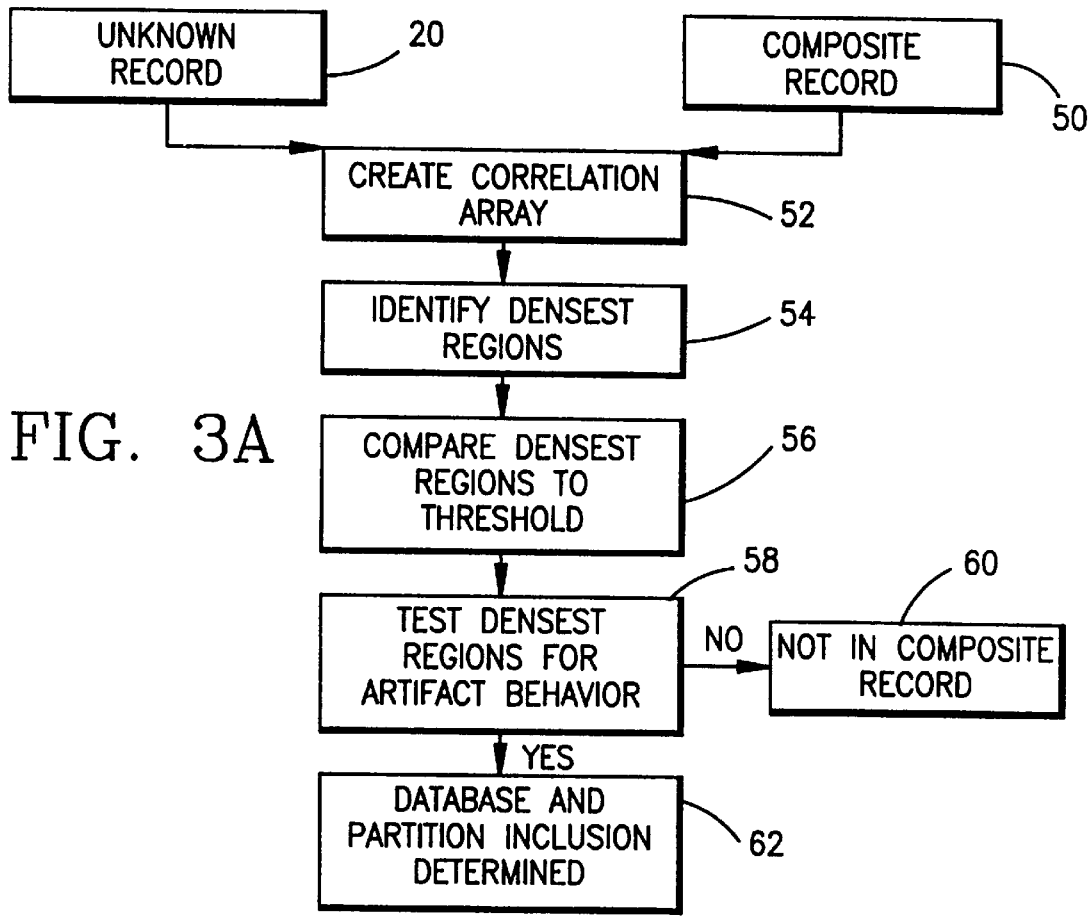
FIG. 3A is a schematic illustration of the sequential steps in ascertaining whether an unknown record is included in the database of known records.

With rotation and inversion complete, the base records are stacked in searchable composite records of two or more base records which then comprise the prepared database 22 (see FIG. 1A). In preparing the searchable composite records, a plurality of individual base records may be laterally offset from one another in overlapping relation in one or two orthogonal directions, or arranged in a tiled pattern where there is no overlap. Such replication of the unknown record appears to strengthen the correlation artifact that may ultimately be located. To determine whether a particular record 20 or unknown record is included in the database, the unknown record is compared with each composite record 50 (see FIG. 3A) of the database. The first step involves preparation of the unknown record for searching. Depending upon the arrangement of the searchable composite records in the database, the unknown record may be replicated about an axis by angular increments corresponding to the optimum angle determined from autocorrelation. The unknown record may be replicated with a predetermined offset corresponding to the offsets used in preparing the searchable composite records, or replicated in a tiled arrangement corresponding to tiling of the searchable composite records. The next step in the inclusion analysis is to create a correlation array 52 between the unknown record, which may have been replicated as discussed, and the known composite record. That correlation array is conveniently established by superposition of the unknown record with the known composite record. Manually, the correlation array may be created by, for example, placing a transparency of one of the unknown and the composite records on the other. In a digital computer, the correlation array can be created by assembling a temporary array using a binary OR algorithm.

The densest regions of the correlation array are then identified 54. Manually, the densest regions are detected visually. In a digital computer, the density of a test region having the predetermined size is calculated. Then, that test region is moved across the correlation array, with the density integration being performed for each repositioning of the test region. When the entire correlation array has been evaluated, the integrated densities for the sampling are examined and ranked in order of highest density.

Having located the densest regions of the correlation array, those regions are compared to the predetermined threshold density at which a correlation artifact has been observed 56. That comparison, when performed manually, is visual analysis of whether the artifact is identifiable. In a digital computer, the comparison compares the magnitude integrated density for the test region to a predetermined threshold. If the test region density does not reach the threshold, it is discarded as being insignificant.

In setting the predetermined threshold density, a cross-correlation is preferably performed on each base record as it is prepared to inclusion in the database. By cross-correlating each base record with a randomly selected different base record, density characteristics for the same square region discussed above can be assessed. Density characteristics for the random cross-correlations of base records establish the threshold density for non-correlation. Using the statistical characteristics of the autocorrelation and the statistical characteristics of the cross-correlation, the threshold density is selected to give Type I error (i.e., incorrect indication of correlation artifact) and Type II error (i.e., incorrect exclusion of correlation artifact) at a preselected confidence level. For example, to be 99.9% sure that a region of anomalous density is a correlation artifact, the Type I error would be specified at 0.001. Similarly, to be 98.0% sure that a region of anomalous density is not a correlation artifact, the Type II error would be set at 0.02.

Each of the densest regions is then tested to determine if the region behaves like a correlation artifact 58. That test is based upon the observation that, when superposed records which exhibit a correlation artifact are linearly displaced in an arbitrary direction, a true correlation artifact is displaced at an angle to that arbitrary direction. For example, where the overlapping records have the same scale, a horizontal displacement of the records will give a vertical displacement of the correlation artifact. This testing, when done manually, simply involves moving one of the known and unknown records relative to the other and noting that the correlation artifact moves in an angular direction. In a digital computer, the testing step imposes a predetermined displacement on one of the records, establishes a new correlation array, locates the repositioned corresponding high density region, and evaluates whether the new location of the high density region has moved at an angle to that displacement.

Where the high density region, when tested, does not exhibit correlation artifact behavior 60, that region is not included in the composite record 50. On the other hand, if artifact behavior is exhibited, then the unknown record 20 is conclusively identified as being a constituent of the composite record 50.

Parenthetically it is noted that testing for artifact behavior can also be based on the observation that the correlation artifact moves in a generally radial direction as the known and unknown records rotate relative to one another about an axis, whereas other areas of the overlap appear to have circumferential movement. The testing procedure is repeated for each region that exceeds the threshold density because of the possibility that the unknown record could have matches with more than one record in the database and because the composite record, as described, can comprise plural images. In the situation where the known records were not inverted when the searchable composite records of the database were created, the testing procedure would involve selection of the regions which do not attain a threshold density.

If the composite record 50 is only one of several in a database partition, then the foregoing steps are repeated until unknown record has been tested against each composite record in the partition. At that time, the unknown record is known to be excluded from the database partition.

Figure 4A:
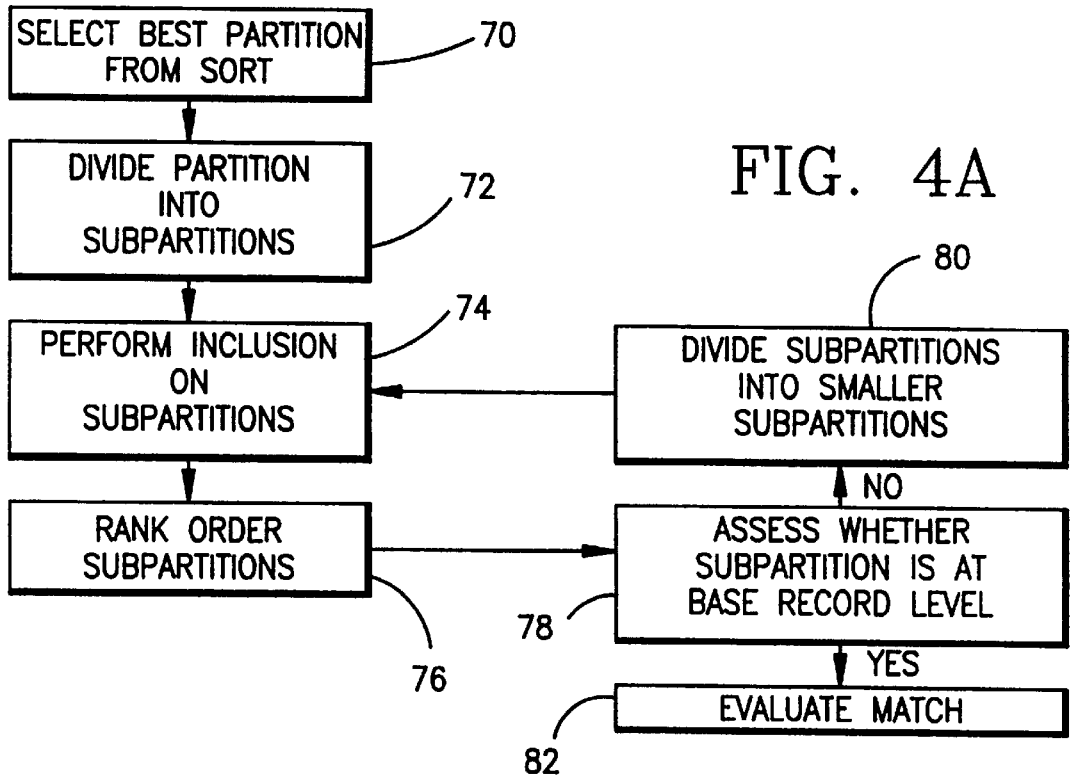
FIG. 4A is a schematic illustration of the sequential steps in ascertaining whether an unknown record is included in the database of known records.

The unknown record is then tested against each other partition of the database. That additional partition testing can be performed serially or in parallel. If done in a parallel manner, a massively parallel processor can materially reduce the requisite search time.

Where the unknown record is known to be included in the database, it becomes appropriate to assess the specific identification of the particular record to which the unknown record corresponds. In this connection, it is appropriate to sort the various partitions of the database according to the density of the correlation artifacts located. Then, the partition is selected which contains the best correlation artifact 70 (see FIG. 4A). Assuming that the database partition comprises a plurality of composite records, the database partition is divided into subpartitions 72, each containing a smaller number (at least one) of composite records. Then each subpartition is subjected to the inclusion analysis 72. That analysis may be performed as discussed above in connection with FIG. 3A.

The subpartitions are then rank ordered according to the strength of the correlation artifacts located 76. The subpartition is then assessed to evaluate whether the subpartition is at the base record level 78—i.e., each record being searched is itself a base image, rather than a composite image. If each subpartition contains more than one composite image, then the best subpartition is further divided into smaller subpartitions 80, which are then subjected to inclusion analysis and rank ordering.

When the subpartition level includes only one composite record or where the database partition is represented by a single composite record, the next subdivision 80 reduces the subpartitions to base records. Following the inclusion analysis 74 and the rank ordering of results 76, there will be a single base record identified as the best correlation with the unknown record. The degree of correlation between the now-identified record and the corresponding base record is then evaluated 82.

Figure 5A:
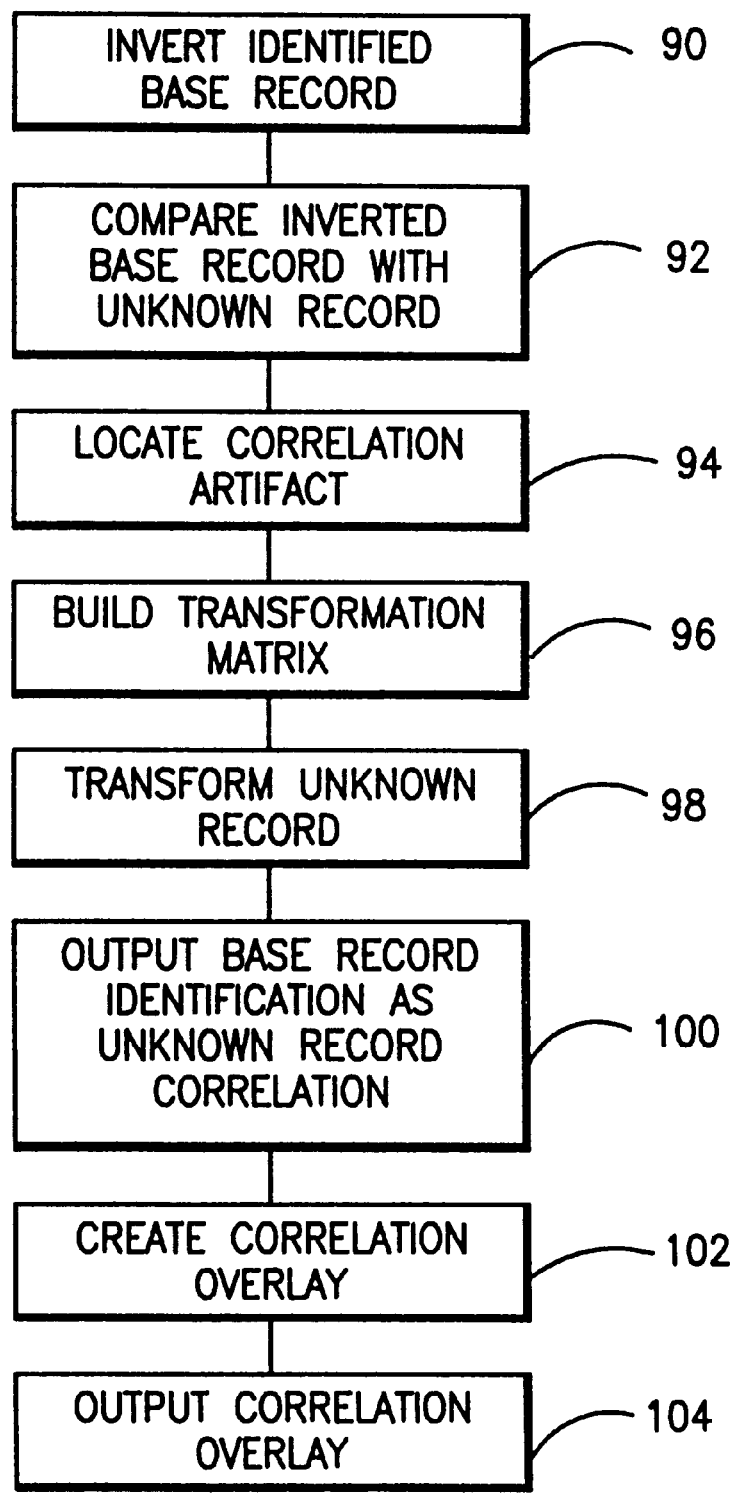
FIG. 5A is a schematic illustration of sequential steps for comparing an unknown record to the known record of the database.

For a variety of reasons, it may be desirable to conduct the matching process when the now-identified record and the base record have the same image polarity, i.e., neither is inverted relative to the other. More particularly, the resulting match analysis will present the data in recognizable format, will illustrate low density correlation artifacts which contain additional visual information, and will expedite identification of changed areas between the records. In the situation described above, the base record was inverted when the database was prepared. Accordingly, in that situation, the base record of the database is inverted 90. The inverted base record is then compared with the unknown record 92 (see FIG. 5A) using the techniques described in connection with FIG. 3A, except that regions of lowest density are analyzed. The correlation artifact is then located 94 (see FIG. 5A). When using low density artifacts with electronic processing, less memory storage is required than when high density artifacts are processed.

The correlation artifact is then evaluated to determine whether it is surrounded by concentric rings, elliptical rings, or spiral rings—the rings being characterized as density variations of the superposed records. If concentric rings are observed, then a transformation which corrects a difference in scale is required. If elliptical rings are observed, then a transformation which corrects the scale of one elliptical axis to the scale of the other elliptical axis is required. On the other hand, if there are spiral rings, then the transformation must correct for general warped condition between the two records.

Next, a transformation matrix is built 96 for the unknown record which will effect its mapping onto the known record, regardless of the rotation, scale differences, and warping of the unknown record relative to the base record. To build the transformation matrix, the unknown record is preferably evaluated at each of a plurality of grid points. The correlation artifact is first centered at a selected grid point. The superposed records are then displaced in an arbitrary direction by a distance sufficient to reach the next closest point in the grid, i.e., $\Delta_x$. The displacements of the center of the correlation artifact in that same direction, $C_x$, and in the perpendicular direction, $C_y$, are measured or calculated. The records are then repositioned to the selected grid point, and are displaced in a direction perpendicular to the first direction by a distance sufficient to reach the next closest point, i.e., $\Delta_y$. The displacements of the center of the correlation artifact, $D_x$, $D_y$, in those two directions are then measured or calculated. For convenience, "x" is taken to be in the first arbitrary direction and "y" is taken to be in the perpendicular direction, the subscripts thus indicating the direction in which displacements and measurements occur.

Using that information, the local angle of rotation, $\theta$, the scale factor in the arbitrary direction, $S_x$, and the scale factor in the perpendicular direction, $S_y$, at that grid point between the known and unknown are evaluated from the following equations:

$$\theta = \arctan\left[\frac{(C_y\Delta_y + D_x\Delta_x)}{(D_y\Delta_x - C_x\Delta_y)}\right]$$

$$S_x = \frac{D_x\sqrt{(C_y\Delta_y + D_x\Delta_x)^2 + (D_y\Delta_x - C_x\Delta_y)^2}}{\Delta_y(C_yD_y + C_xD_x)}$$

$$S_y = \frac{-C_y\sqrt{(C_y\Delta_y + D_x\Delta_x)^2 + (D_y\Delta_x - C_x\Delta_y)^2}}{\Delta_x(C_yD_y + C_xD_x)}$$

The same sequence of steps is performed at other points of the grid. Where the correlation artifact has circular or elliptical rings, the use of several points is appropriate to obtain averaged values for the scale factors. Where the correlation artifact has spiral rings, all grid points must be used since a general mapping is required. Where a general dewarping is needed, the grid is subdivided until the desired detail level is attained. The dewarping matrix is then evaluated at each point of the grid.

Using the dewarping or transformation matrix, the unknown record is transformed 98 to the scale and orientation of the corresponding known record using the following relationships for each point of the grid:

$$\partial_x = x_o(1-S_x \cos \theta) + y_o S_x \sin \theta$$

$$\partial_y = -x_o S_y \sin \theta + y_o(1-S_y \cos \theta)$$

where $x_o$, $y_o$ are the coordinates of the point in the unknown record, and $\partial_x$, $\partial_y$ are the distances along the respective axes that the record information at the point ($x_o$, $y_o$) must be moved to dewarp the record information for that point.

At some time, the base record is identified and output as the record to which the unknown record corresponds 100. The precise location of this step is not crucial, but is certainly important to the identification process.

Next, a correlated overlay is generated or created 102 by superposing the transformed unknown record and the known record. The correlated overlay is then output by printing, for example 104. Examination or inspection of the correlated overlay will identify each portion, region, or pixel area of the base record which corresponds identically to the unknown record. Moreover, the correlated overlay will identify each portion of the base record which varies from the unknown record, making changes, alterations, and the like immediately detectable.

For simplicity in illustrations, binary 2-dimensional representations of patterns will be considered, and the high-density FCA will be used for evaluation of matches. The flash correlation artifacts produced in the binary representations would have additional artifacts associated with grey scale or color effects. Similarly, three or n-dimensional images would produce n-dimensional artifacts. Both in the case of non-binary images and in the case of 3 or more-dimensional images, the behavior of the artifacts can be considered as the joint behavior of 2-dimensional, binary slices.

Figure 1B:
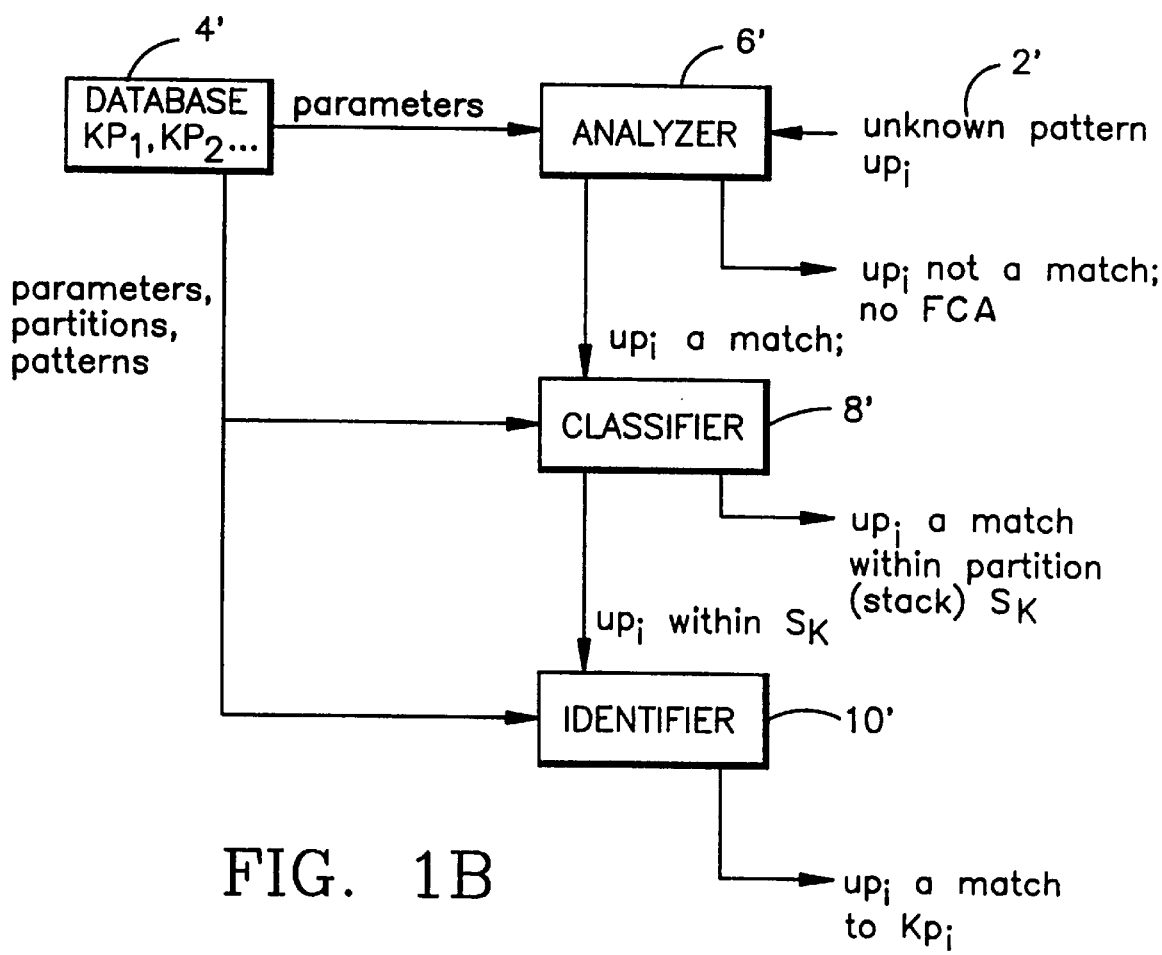
FIG. 1B is an overview of the pattern assessment, classification, and identification flow provided by the present invention.

FIG. 1B illustrates the steps of the present invention. An unknown pattern 2' is assessed as being either included or not in a reference database of patterns 4', depending on whether or not a flash correlation artifact is generated 6' by the superimposition of the unknown pattern with each database pattern. Prior to the FCA analysis, preliminary analysis may be performed to assure that the unknown pattern is well formed and of the same type as the database.

The unknown pattern can be further analyzed by classifying it 8' as belonging to the subset of the database of known patterns which produce FCA's. The unknown pattern can be identified 10' as a match to the particular known pattern which produces the strongest artifact.

Figures 2A, 2B:
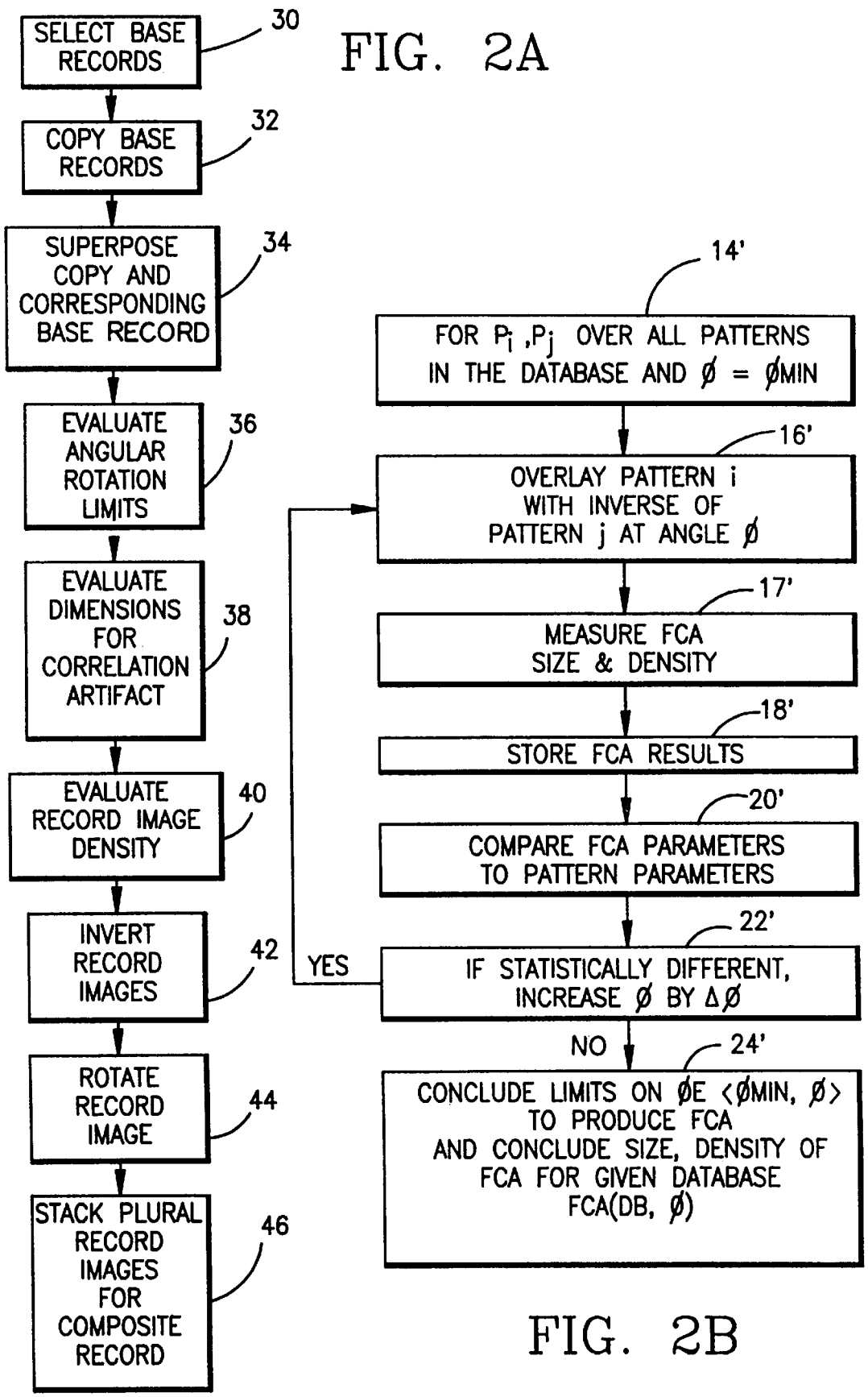
FIG. 2A is a schematic illustration of the sequential steps used to prepare a database for optimal use with flash correlation analysis.
FIG. 2B is an illustration of the preparation of a database of known patterns.

FIG. 2B illustrates the characteristics of database patterns used to establish statistically significant artifact density for selecting candidate FCA's. Each pattern 14' is flash correlated with each pattern 16' in the database, including itself, to produce one or more FCA's. Where the database contains many similar patterns, such as in a collection of sequential video frames, each pattern may produce FCA's with several other patterns. When the database consists of essentially random patterns, each will only produce an FCA when matched with itself. Each FCA 17' is measured as to size and density and the results 18' are stored. The rotation angle is varied systematically 22' to define a range where the area of the FCA has density statistically different from the general pattern density 20'. The flash correlation parameters of the database 24' include the range of rotation angle which produces a detectable FCA, and the size and density of the FCA for a given angle.

It is not necessary to compare every combination of pattern vs. pattern; a sampling may be performed. Also, comparisons of stacks of various sizes against stacks or individual patterns may be performed to generate relevant statistics.

Figure 3B:
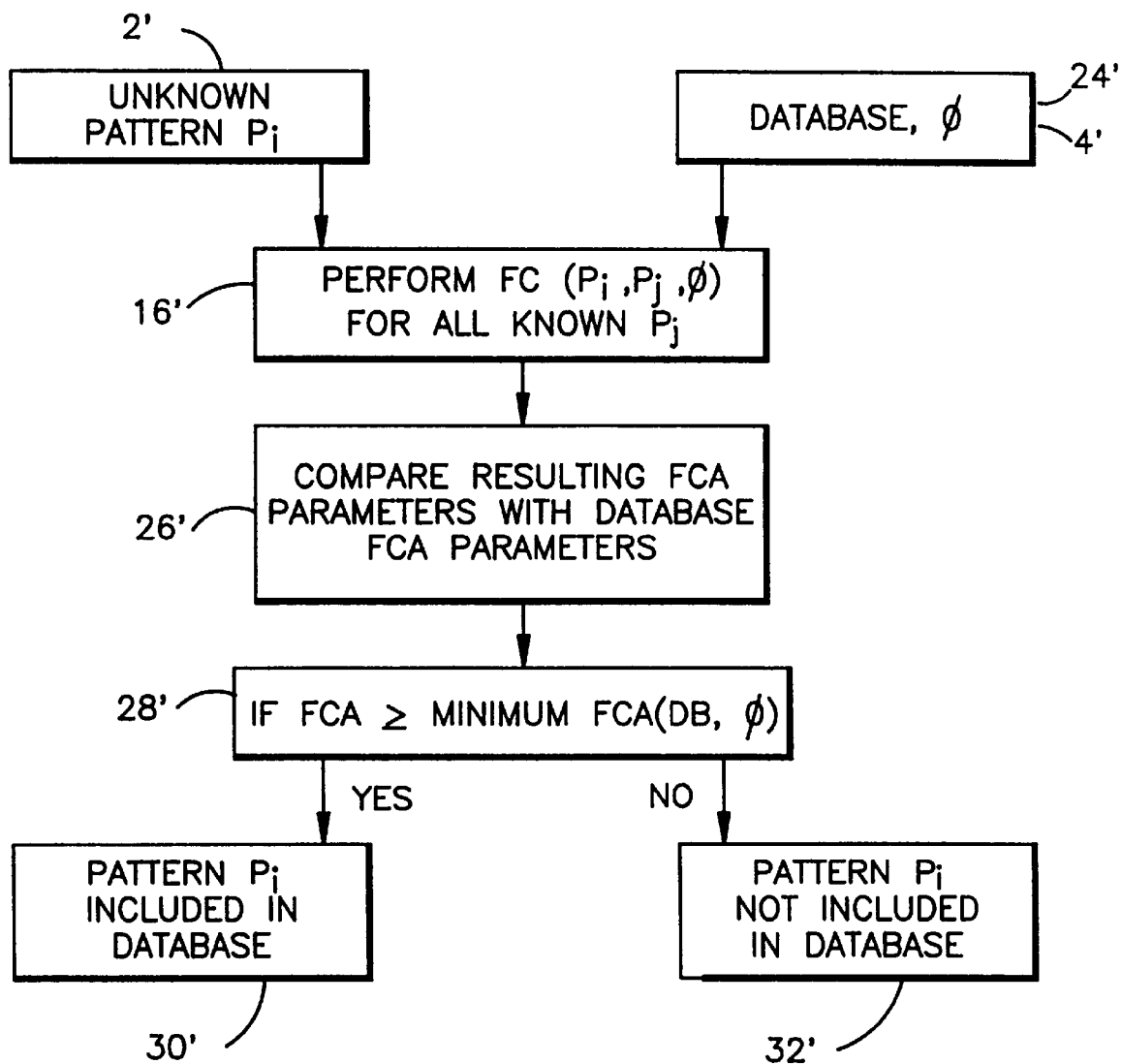
FIG. 3B is an illustration of searching for an FCA against a database, to decide if the unknown pattern is included.

FIG. 3B illustrates the process for deciding whether an unknown pattern 2' is "massively correlated" or essentially the same as a pattern which is included in the database 4'. The unknown pattern is flash correlated 16' with each database pattern, over the selected range of angles defined by the database parameters. Any resulting apparent FCA is compared 26' with the density and size of the database parameters. If the apparent FCA 28' is stronger than the minimum size and density database parameters, the unknown pattern is concluded to be included in the database 30'. Otherwise 32', it is considered not included.

For example, if the database includes a sequence of images of an essentially static scene, all such scenes will produce FCA's when flash correlated with another scene from the sequence. Entirely different scenes will not produce FCA's.

Figure 4B:
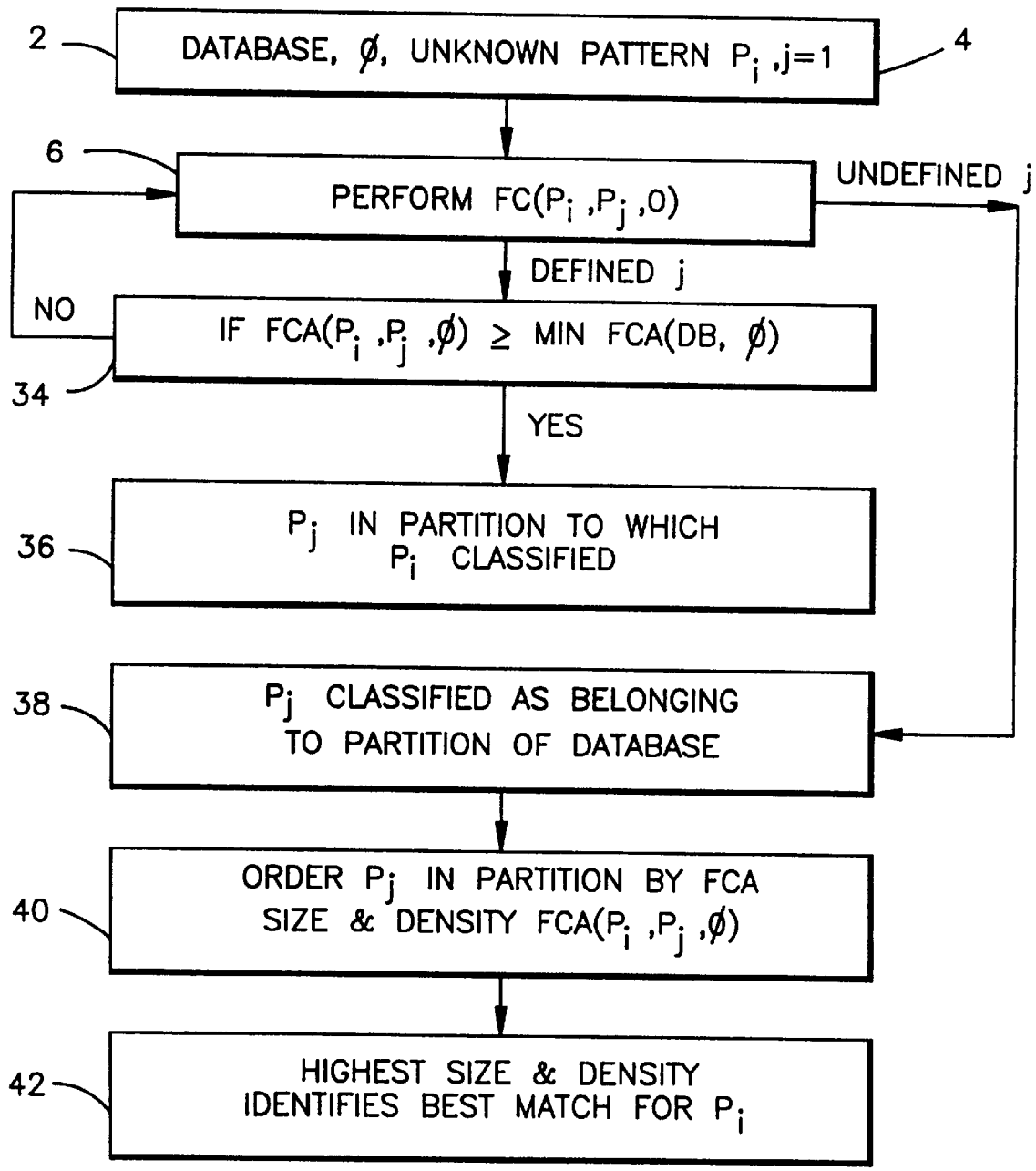
FIG. 4B is an illustration of sequential partitioning to classify and identify a match with a particular pattern in a database.

FIG. 4B illustrates the process for classifying the unknown pattern 2' with the partition 36' of the database in which each pattern produces an FCA with the unknown pattern; and for identifying the unknown pattern as matching 42' a particular known pattern which produces the strongest FCA—which pattern will most closely match the unknown pattern.

Figure 5B:
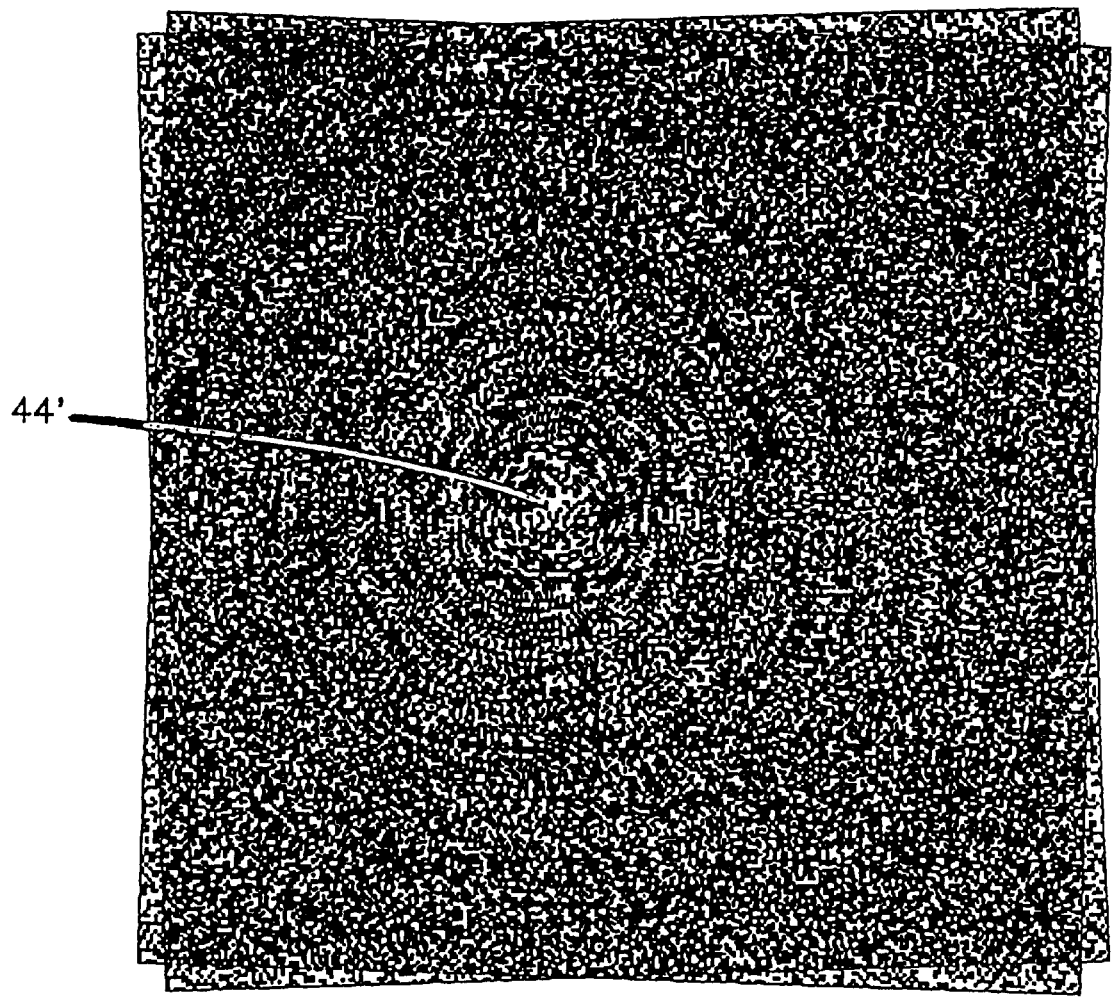
FIG. 5B illustrates a low density FCA corresponding to a match between two patterns which are massively correlated, the same size, and the same polarity.

FIG. 5B presents a low density FCA produced from two sufficiently similar patterns of the same size, and same polarity, overlaid with relative rotation of 10 degrees. The center area 44' of the FCA appears less dense than the average density of the overlaid images. Concentric rings of low density emanate from the center. Sufficiency is determined by, among other parameters, the size, shape, and dispersion of the particles creating the patterns. The location of the center can be positioned anywhere within the overlaid area by translating one pattern with respect to the other. The size of the low density area can be changed by changing the relative rotation between the two patterns.

Figure 7:
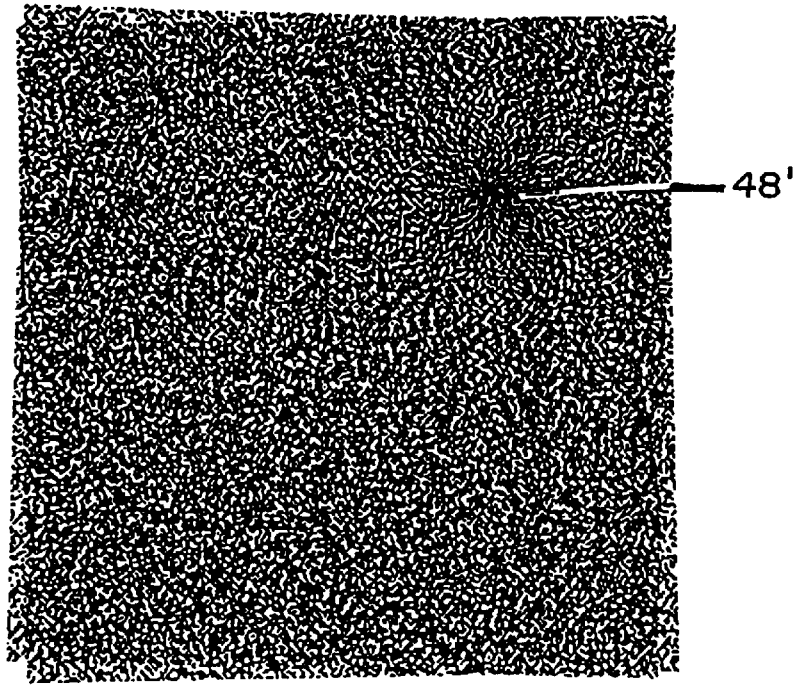
FIG. 7 illustrates the repositioning of the FCA in FIG. 6 upon an imposed translation.
Figure 6:
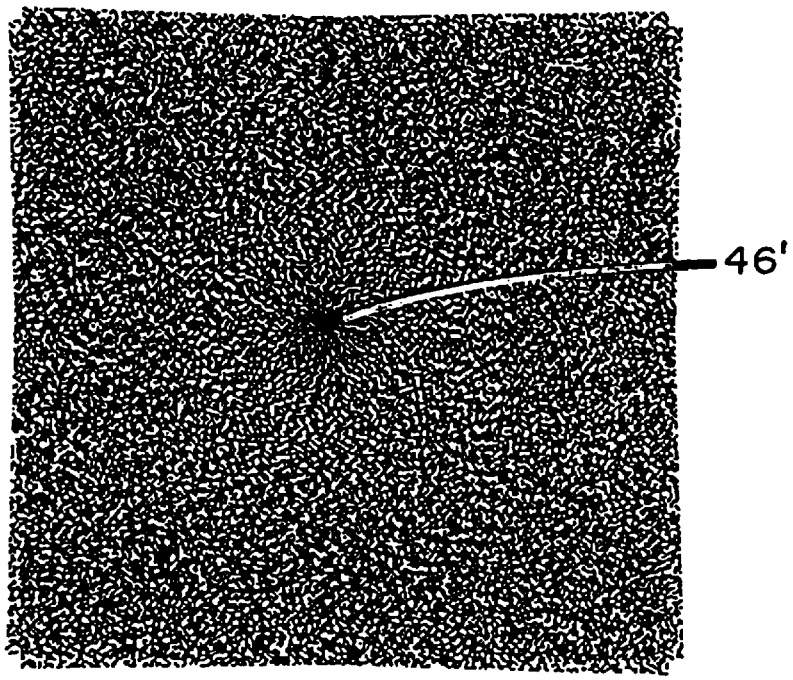
FIG. 6 illustrates a high density FCA corresponding to a match between two patterns which are massively correlated, the same size, and of different polarity.

FIG. 6 presents a high density FCA produced from the same pair as FIG. 5B except that the polarity of one of the two patterns is inverted. The FCA appears as a dark area 46'. In both the high and low density artifacts, the spot will move a distance equal to the amount of imposed translation between the two patterns, and in a direction normal to the imposed translation, when the two patterns are the same size. FIG. 7 illustrates the movement of the FCA 48' of FIG. 6 towards 2:00 in response to a translation between the two patterns in the direction of 5:00. The magnitude of the movement is equal to the magnitude of the translation since the two patterns are the same scale.

Figure 8:
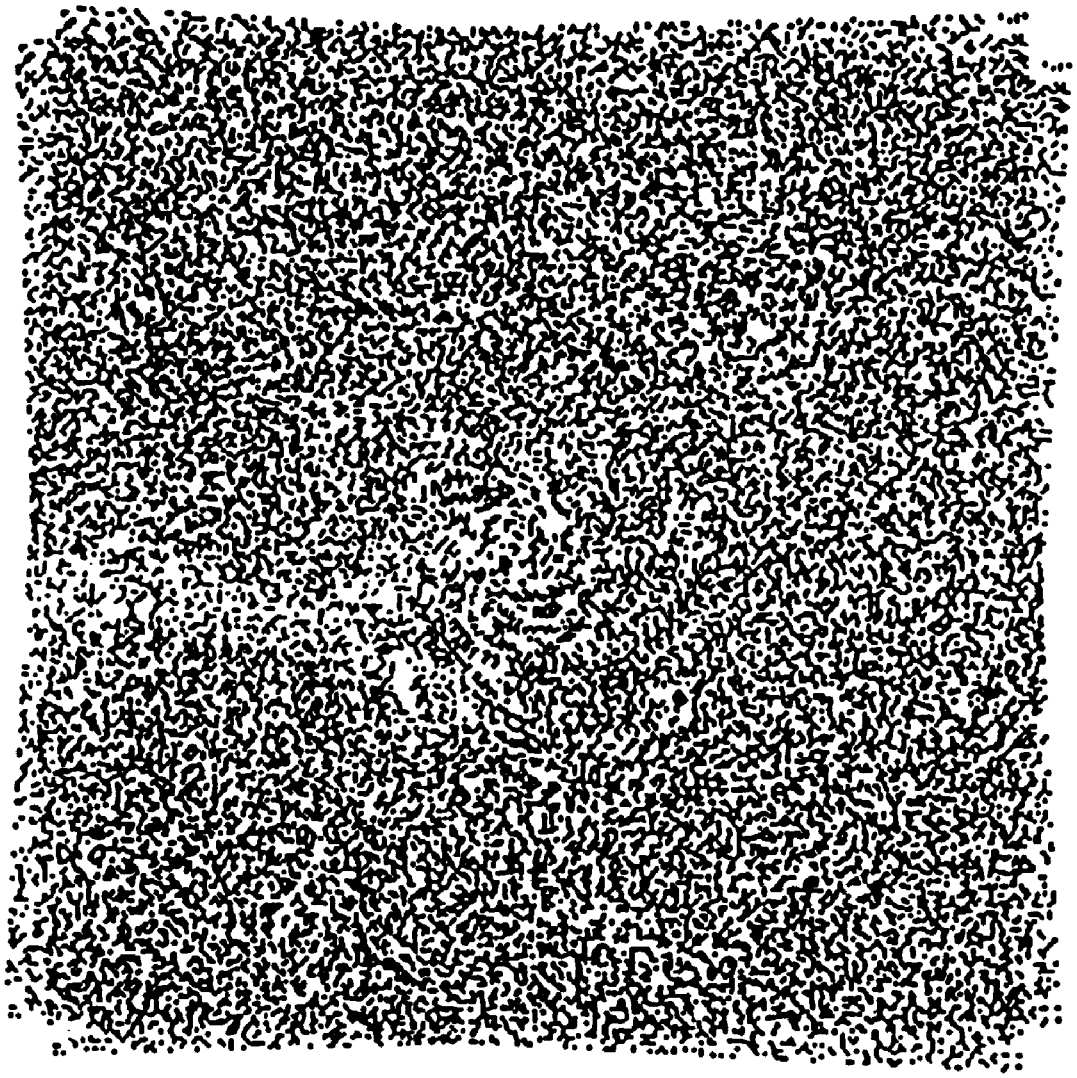
FIG. 8 illustrates the conversion of the rings of FIG. 5 into spirals as a result of the enlargement of one of the patterns.

In the case that one of the patterns is larger, the low density FCA such as shown in FIG. 5B, which appears as concentric circles of low density, is converted into an assembly of spirals as in FIG. 8. The tightness of the spirals is a measure of the relative size of the patterns. The existence of a spiral FCA is still sufficient to identify a pattern as included in a database.

Furthermore, the spiral FCA can be used to de-warp the two patterns. By positioning the FCA systematically about a grid of locations and varying the pattern sizes locally to eliminate the spiral effect, an automated system can proceed with refining the grid size and continuing the process recursively until the remaining distortions are less than an acceptable degree of relative warping.

Figure 9:
FIG. 9 illustrates the high density FCA from identification of a highly structured image.

When patterns are highly structured, it may be difficult or impossible to discern FCA's which may be confused with features of either pattern. In this case, it may be necessary to use translation or rotation to confirm the existence of a potential candidate FCA. FIG. 9 illustrates a high density area 50' which can be shown to be an FCA by imposing translation as in FIGS. 6 and 7. Alternately, if the patterns can be aligned to a standard orientation and scale, then they may be scrambled prior to comparison, where the scrambling is designed to reposition each pattern element within a transformed pattern so as to break apart densely structured portions of the original patterns which might obscure the FCA. For certain classes of imagery, scrambling of the patterns may sufficiently randomize the pattern density across the pattern as to eliminate the need for testing of candidate FCA's by imposing translations between potential matching patterns, since only FCA's will then have extended high density characteristics.

Figure 10:
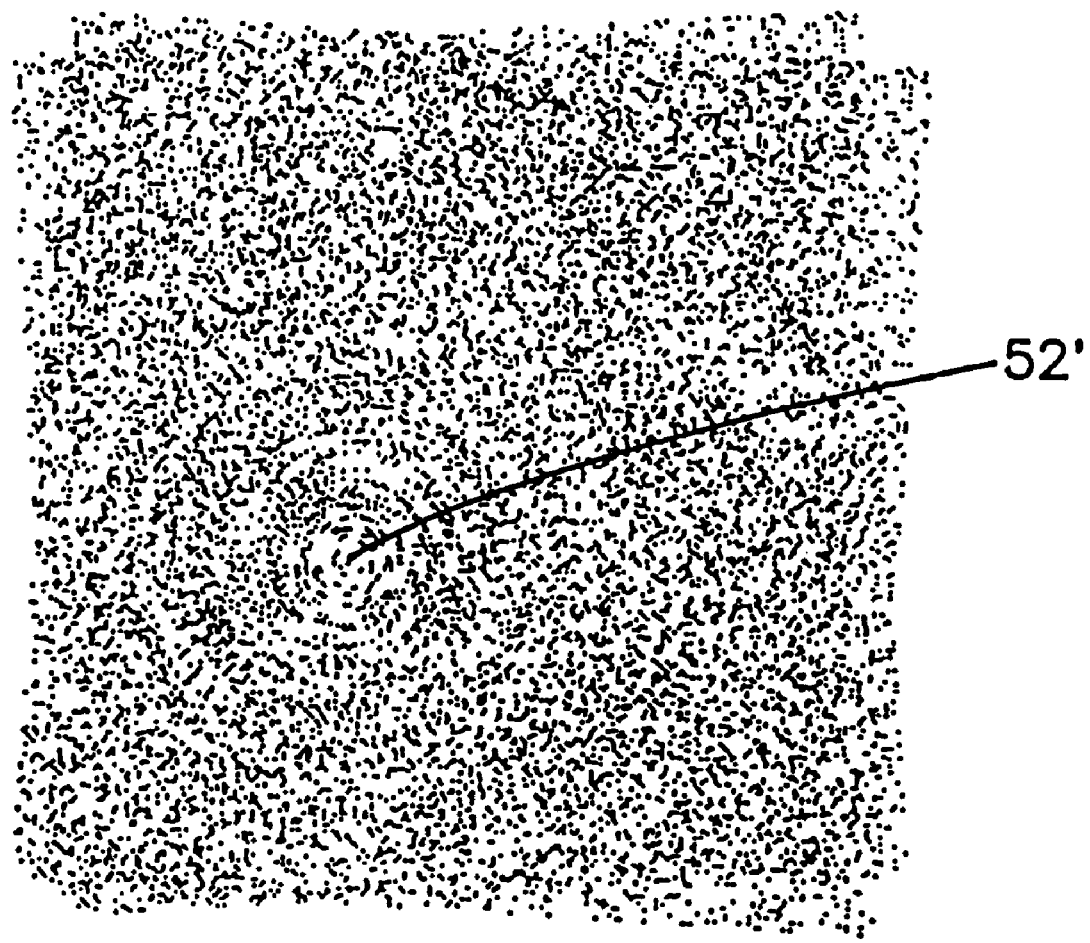
FIG. 10 illustrates the low density FCA result from a difference in angle of view between two patterns.

When two pattern planes are at different angles, nonsymmetrical artifacts will result. FIG. 10 indicates the result of a 30 degree angle difference between the patterns of FIG. 5B. The resulting asymmetrical FCA 52' is still sufficient to identify a match between the two patterns. Measurement of the asymmetry can be used to analyze the relative angle between the two patterns.

Figure 11A:
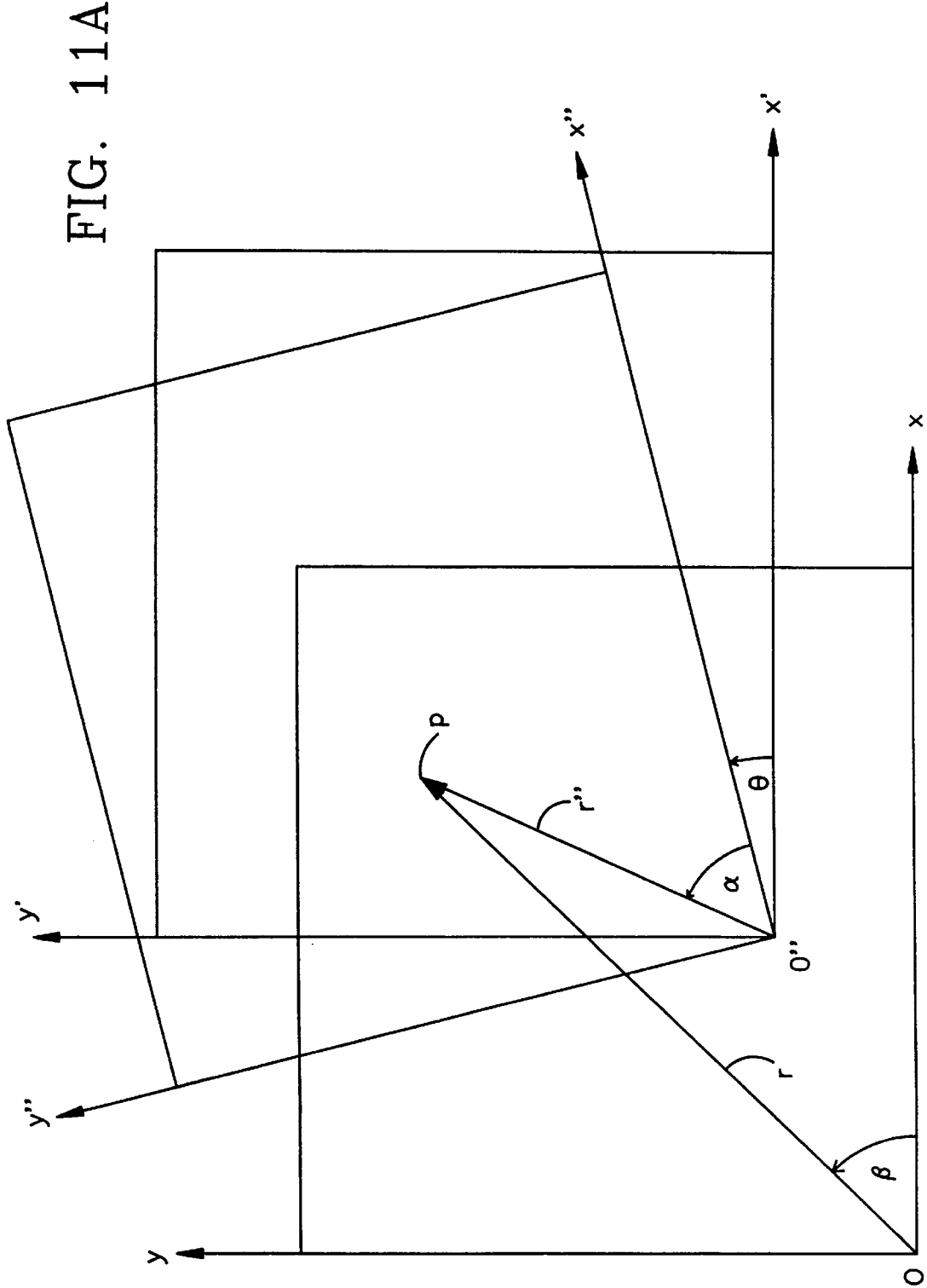
FIG. 11 represents the general affine transformation of two patterns to predict the location of the FCA.

The center position and movement of the correlation artifact can be predicted using a classical affine transformation as shown in FIG. 11. The center point O has coordinates (x,y) in the initial plane and (x',y') in the plane whose origin has been translated by (x,y) and ("x","y") after being rotated by O(0,-). The point p has coordinates (g, β) in coordinates x, y, and coordinates ("g", d) in coordinates "x", "y". Mathematically, the use of flash correlation can be expanded to slices in n-dimensional patterns.

The movements of the center of the correlation artifact along a first axis and a second axis orthogonal to the first axis obey the respective following equations:

$$\frac{\Delta_x(1 - S_y \cos\theta)}{1 + S_x S_y - (S_x + S_y)\cos\theta} = C_x$$

$$\frac{\Delta_x S_y \sin\theta}{1 + S_x S_y - (S_x + S_y)\cos\theta} = C_y, \text{ and}$$

$$\frac{-\Delta_y S_x \sin\theta}{1 + S_x S_y - (S_x + S_y)\cos\theta} = D_x$$

$$\frac{\Delta_y(1 - S_x \cos\theta)}{1 + S_x S_y - (S_x + S_y)\cos\theta} = D_y$$

where:

$\Delta_x$ is the imposed displacement between the records along the first axis;

$\Delta_y$ is the imposed displacement between the records along the second axis;

$S_x$ is the local scalar factor for the first axis;

$S_y$ is the local scalar factor for the second axis;

$\theta$ is the local angle of rotation between the two records;

$C_x$ is the displacement of the artifact along the first axis in response to a displacement between the records in the direction of the first axis;

$C_y$ is the displacement of the artifact along the second axis in response to a displacement between the records in the direction of the first axis;

$D_x$ is the displacement of the artifact along the first axis in response to a displacement between the records in the direction of the second axis; and $D_y$ is the displacement of the artifact along the second axis in response to a displacement between the records in the direction of the second axis.

Figure 11B:
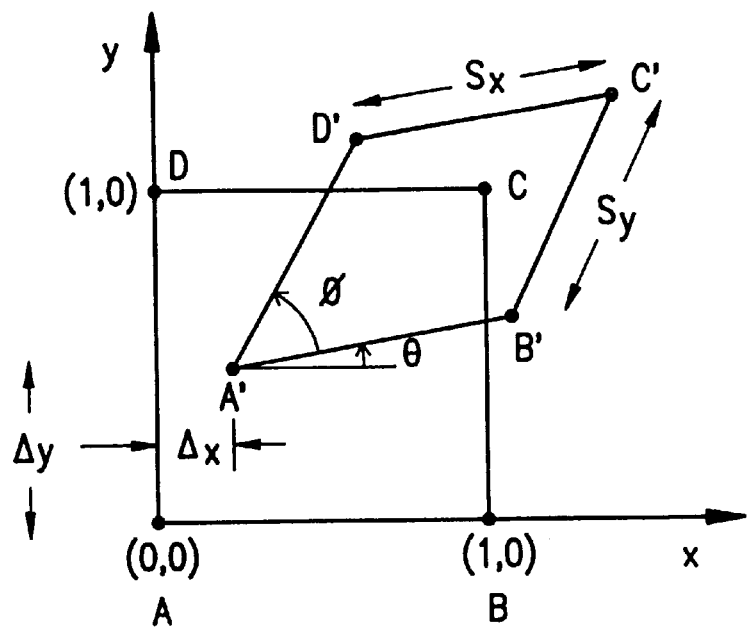

FIG. 11B illustrates the position of an arbitrary pattern in the x,y plane, and its affine transformation into the x',y' plane. The affine transformation is given by equation (1):

$$\begin{bmatrix} Sx\cos\theta & Sy\cos\theta\cos\phi - Sy\sin\theta\sin\phi \\ Sx\sin\theta & Sy\sin\theta\cos\phi - Sy\cos\theta\sin\phi \end{bmatrix} \begin{bmatrix} xold \\ yold \end{bmatrix} + \begin{bmatrix} \Delta x \\ \Delta y \end{bmatrix} = \begin{bmatrix} Xnew \\ Ynew \end{bmatrix} \quad [1]$$

A dark artifact appears, in the case of the two patterns being compared, in an area where the patterns are complementary. Such a comparison is referred to here as a +/− correlation. The artifact appears when Xold=Xnew. Defining $\alpha=\theta+\phi$, the artifact location is defined by equation (2):

$$\begin{bmatrix} XOLD(Sx\cos\theta - 1) + YOLDSy\cos\alpha \\ YOLDSx\sin\theta + YOLD(Sy\sin\alpha - 1) \end{bmatrix} = \begin{bmatrix} -\Delta x \\ -\Delta y \end{bmatrix} \quad [2]$$

The artifact location is refined by equations (3) and (4)

$$XOLD = \frac{\Delta x(1 - Sy\sin\alpha) + \Delta y Sy\cos\alpha}{SxSy\cos\theta\sin\alpha - Sx\cos\theta - Sy\sin\alpha + 1 - SxSy\sin\theta\cos\alpha} \quad [3]$$

$$YOLD = \frac{\Delta x Sx\sin\theta + \Delta y(1 - Sx\cos\theta)}{SxSy\cos\theta\sin\alpha - Sx\cos\theta - Sy\sin\alpha + 1 - SxSy\sin\theta\cos\alpha} \quad [4]$$

Once the artifact is found, it can be moved (or it will move) as a function of a shift in the relative position of the two patterns. Equations (5)–(22) derive the resulting movement of the artifact. Impose a shift $\delta_x$ horizontally, and the artifact moves to a new position (hx, hy). Impose a shift $\delta_y$ vertically, and the artifact moves to a new position (vx, vy). Define D=1−$S_x$ cos θ−Sy Sin α+SxSy Cos θ Sin α−SxSy Sin θ Cos α, Then:

$$hx = \frac{\delta x(1 - Sy\sin\alpha)}{D} \quad [5]$$

$$hy = \frac{\delta x Sx\sin\theta}{D} \quad [6]$$

$$Vx = \frac{\delta y Sy\cos\alpha}{D} \quad [7]$$

$$Vy = \frac{\delta y(1 - Sx\cos\theta)}{D} \quad [8]$$

Solving for Sin α provides:

$$\sin\alpha = \frac{hy - hxSx\sin\theta}{hySy} \quad [9]$$

Combining equations (7) and (6), and solving for Cos α provides:

$$\cos\alpha = \frac{\delta x S x V x \sin\theta}{\delta y S y h y} \quad [10]$$

Combining equations (7) and (8), and solving for Cos α provides:

$$\cos\alpha = \frac{Vx(1 - Sx\cos\theta)}{VySy} \quad [11]$$

Combining equations (10) and (11), and solving for $S_x$ provides:

$$Sx = \frac{\delta y h y}{Vy\delta x\sin\theta + hy\delta y\cos\theta}, \text{ and} \quad [12]$$

Substituting equation (10) into equation (8) provides:

$$\cos\alpha = \frac{\delta x V x \sin\theta}{Sy(Vy\delta x\sin\theta + hy\delta y\cos\theta)} \quad [13]$$

Substituting equation (10) into equation (7) provides:

$$\sin\alpha = \frac{Vy\delta x\sin\theta + hy\delta y\cos\theta - hx\delta y\sin\theta}{Sy(Vy\delta x\sin\theta + hy\delta y\cos\theta)} \quad [14]$$

Define D as:

$$D = \frac{\delta x \delta y \sin^2\theta(hxVy - hyVx)}{(Vy\delta x\sin\theta + hy\delta y\cos\theta)^2} \quad [15]$$

Substituting equations (10) and (13) into equation (4) provides:

$$\tan\theta = \frac{hy\delta y}{hxVy - hyVx - Vy\delta x} \quad [16]$$

Substituting equation (14) into equation (13) provides:

$$D = \frac{\delta x \delta y}{hxVy - hyVx} \quad [17]$$

Substituting equation (17) into equation (6) provides:

$$Sx = \frac{hy\delta y}{\sin\theta(hxVy - hyVx)} \quad [18]$$

Inserting equation (18) into equation (5) provides:

$$Sy = \sqrt{\left(1 - \frac{hxD}{\delta x}\right)^2 + \frac{Vx^2 D^2}{\delta y^2}} \quad [19]$$

$$\alpha = \tan_2^{-1}\left(1 - \frac{hxD}{\delta x}, \frac{VxD}{\delta y}\right) \quad [20]$$

As shown in FIG. 11B, an artifact appears centered at ($X_o$, $Y_o$). When one of the two records is shifted $\delta_y$ units horizontally, the artifact appears at ($X_o + h_x, Y_o + h_y$). When one of the records is shifted $\delta_y$ units vertically from the original position, observe the artifact at ($X_o + V_x, Y_o + V_y$) with the terms illustrated FIG. 11B.

$$\Delta_x = X_o(1 - S_x \cos\theta) - Y_o S_y \cos\alpha \quad [21]$$

$$\Delta_y = -X_o S_x \sin\theta + Y_o(1 - S_y \sin\alpha) \quad [22]$$

The derivation above applies to general images. For pixelized imagery, without loss of generality, assume a point of relative rotation between two patterns to be at the origin and the angle of rotation to be positive. Consider a pixel centered at $(x,y) = (r \cos\alpha, r \sin\alpha)$. After an imposed translation between the patterns, its new position will be:

$(r \cos(d+\theta), r \sin(\alpha+\theta)) = (r \cos\alpha \cos\theta - r \sin\alpha \os\theta, r \sin\alpha \cos\theta + r \cos\alpha \sin\theta) = (x \cos\theta - y \sin\theta, x \sin\theta + y \cos\theta)$ It will contribute to the artifact if and only if its new location is within a half of a pixel width, δ, of its original position, i.e., if and only if:

$$x - \delta \leq x \cos\theta - y \sin\theta \leq x + \delta \quad [23]$$

$$y - \delta \leq x \sin\theta + y \cos\theta \leq y + \delta \quad [24]$$

Figure 11C:
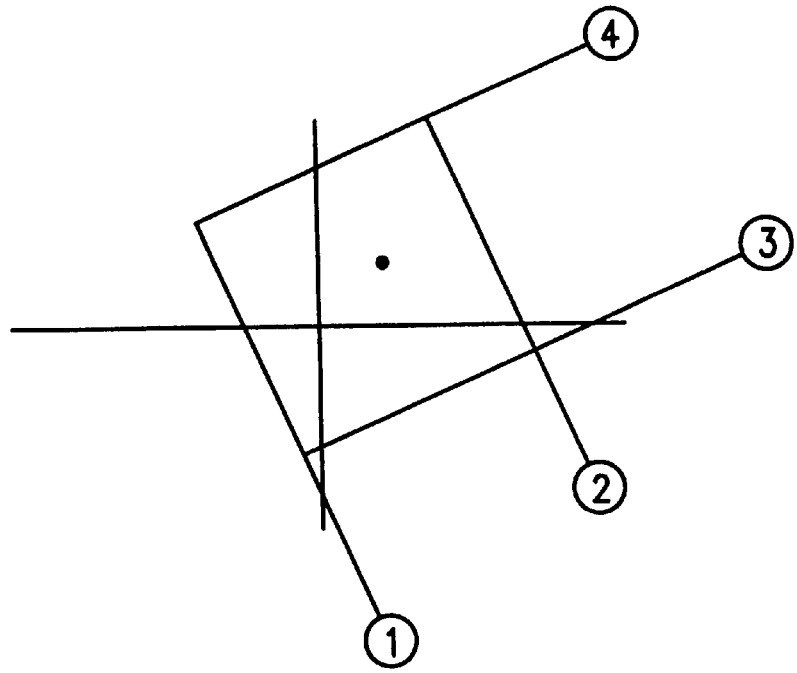

This includes the area bounded by lines 1, 2, 3, and 4 in the FIG. 11c.

Considering the bounds of lines 1 and 2:

$$\frac{-(1 - \cos\theta)}{\sin\theta} x - \frac{\delta}{\sin\theta} \leq y \leq \frac{1 - \cos\theta}{\sin\theta} x + \frac{\delta}{\sin\theta} \quad [25]$$

Considering the bounds of lines 3 and 4.

$$\frac{\sin\theta}{1 - \cos\theta} x - \frac{\delta}{1 - \cos\theta} \leq y \leq \frac{\sin\theta}{1 - \cos\theta} x + \frac{\delta}{1 - \cos\theta} \quad [26]$$

The intersection of lines 1 and 4 is where:

$$\frac{-(1 - \cos\theta)}{\sin\theta} x - \frac{\delta}{\sin\theta} = \frac{\sin\theta}{1 - \cos\theta} x + \frac{\delta}{1 - \cos\theta} \Rightarrow \quad [27]$$

$$\left(\frac{\delta}{2}\left(\frac{\cos\theta - \sin\theta - 1}{1 - \cos\theta}\right), \frac{\delta}{2}\left(\frac{\sin\theta - \cos\theta - 1}{\sin\theta}\right)\right)$$

The intersection of lines 2 and 4 is where:

$$-\frac{1 - \cos\theta}{\sin\theta} x + \frac{\delta}{\sin\theta} = \frac{\sin\theta}{1 - \cos\theta} x + \frac{\delta}{1 - \cos\theta} \Rightarrow \quad [28]$$

$$\left(\frac{\delta}{2}\left(\frac{1 - \sin\theta - \cos\theta}{1 - \cos\theta}\right), \frac{\delta}{2}\left(\frac{1 + \sin\theta - \cos\theta}{\sin\theta}\right)\right)$$

The distance squared between these two intersection points is:

$$\delta^2 \frac{2 + 2\cos\theta}{\sin^2\theta} \Rightarrow \frac{\sqrt{2(1 + \cos\theta)}}{\sin\theta} \text{ pixels} \quad [29]$$

Thus, it is demonstrated that the artifact for pixelized image is a square centered at the point of rotation with a side dimension of:

$$\frac{.5\cos(\theta/2)}{\sin(\theta)}$$

The square is tilted at angle θ.

Patterns can be sampled or filtered images or data represented as a code or score card. A 2-dimensional pattern need not necessarily reflect a spatial distribution of materials; synthesized speech, a mark-sensing card, or music can produce 2-dimensional patterns which evince FCA behavior. In certain cases, a pattern may appear too regular or smooth to demonstrate strong FCA effects; in that case, magnification of the pattern to emphasize irregularities may be required in order to differentiate among a database of very similar patterns.

Not all of an image needs to be considered when using flash correlation for matching against a database; for example, rolled fingerprints on a smooth surface, latent fingerprints on a textured surface, minutiae points extracted from analyzed fingerprints, or a scorecard representing binary decisions to describe and classify a fingerprint may all be used as formats for the classification and identification of fingerprints against a database of similar patterns. Flash correlation can be used to help remove background surface texture, leaving the print itself for analysis.

Patterns which are not sufficiently dense may not produce sufficiently visible FCA's. Techniques can be used which replicate the pattern so as to increase the pattern density without generating false matches. In the particular case of fingerprints, minutiae points may be repeated along orthogonal axes selected to be repeatable. In the example of FIG. 12, the repetition frequency is selected to be twice the spacing between fingerprint ridges. The elements are repeated five time in each orthogonal direction. The resulting FCA's from the repeated and non-repeated patterns are also shown.

Figure 12A:
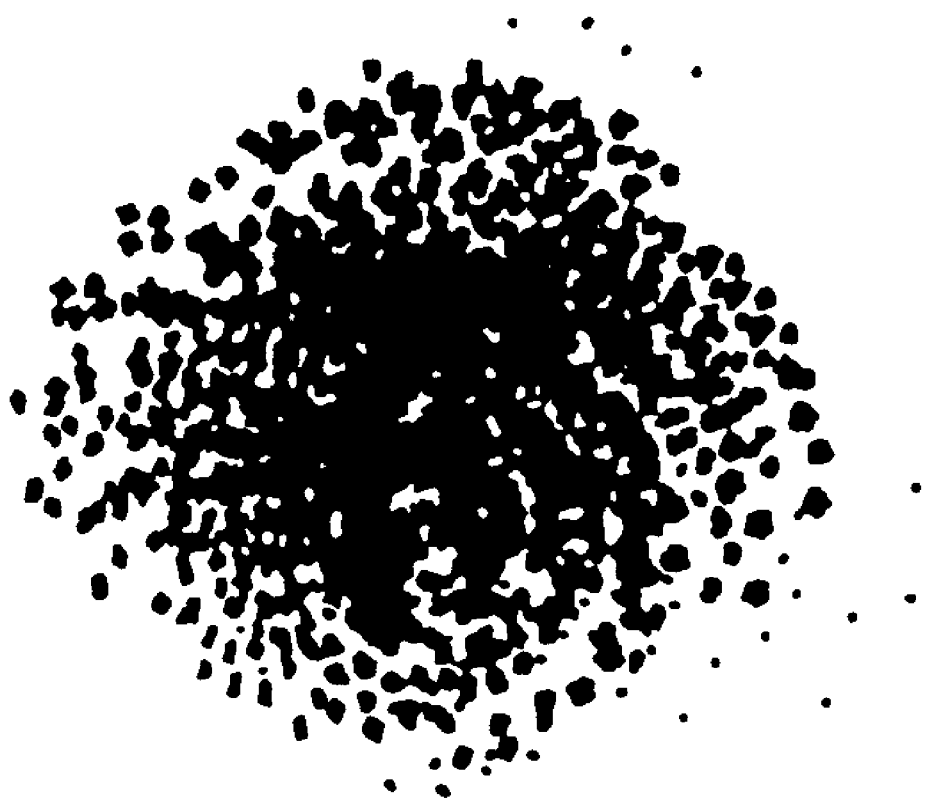
FIG. 12A shows the low density correlation artifact corresponding to a match between a pattern and a stack of three patterns.
Figure 12B:
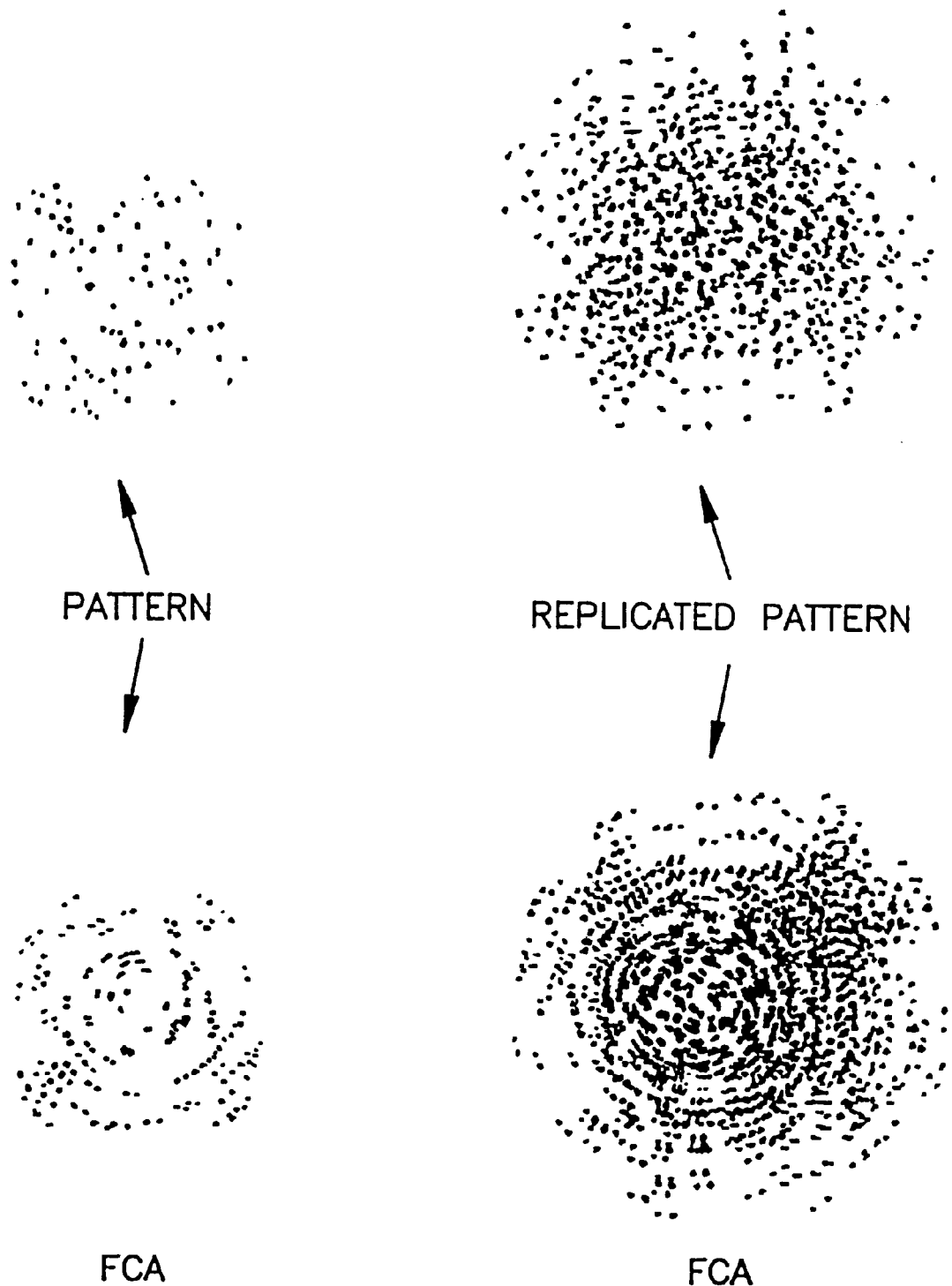
FIG. 12B illustrates replication of a pattern to increase its density and the result on the subsequent FCA.
Figure 12C:
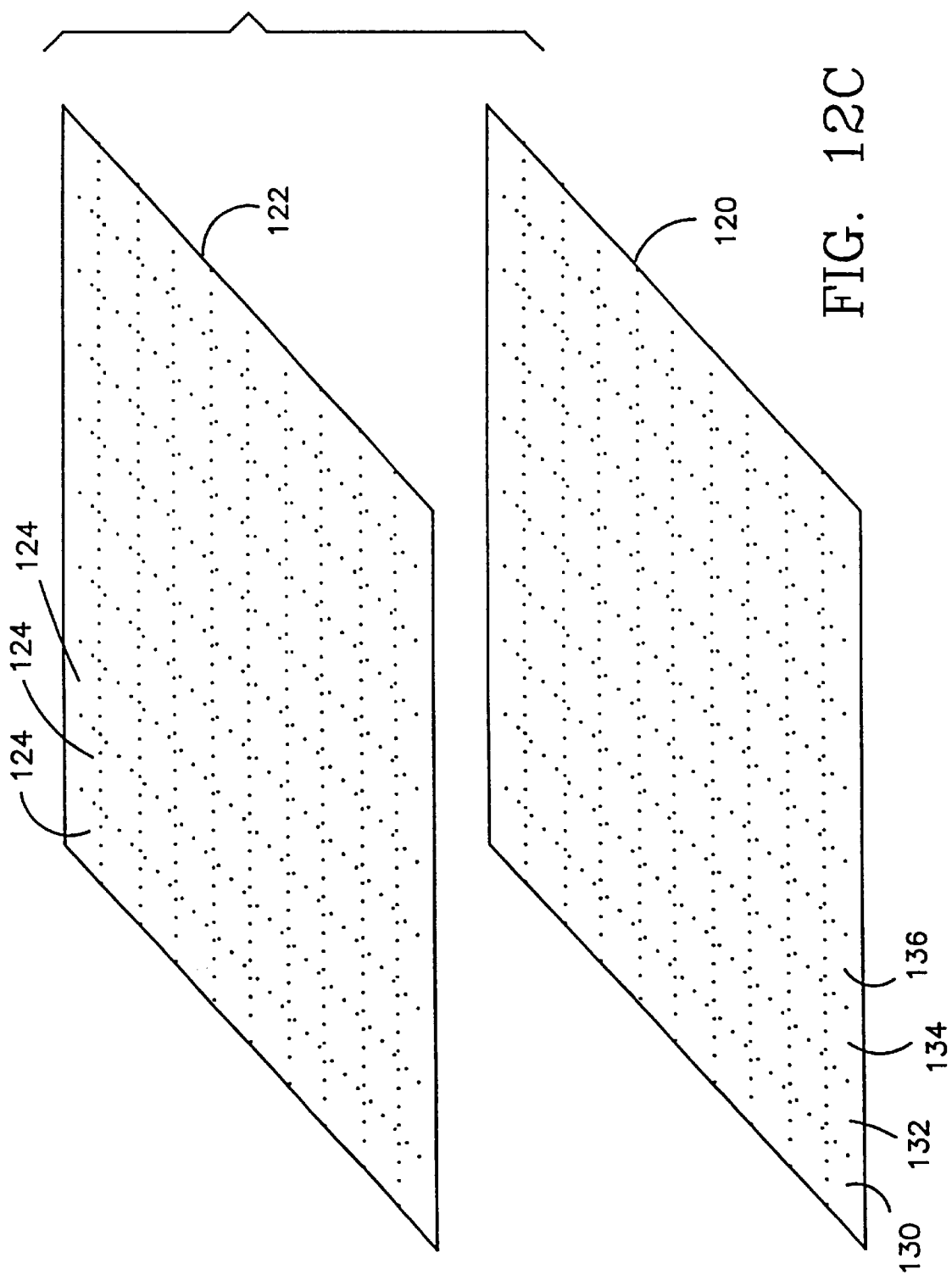
FIG. 12C shows the overlay arrangement for matching a replicated 10×10 pattern against 100 tiled patterns.
Figure 12D:
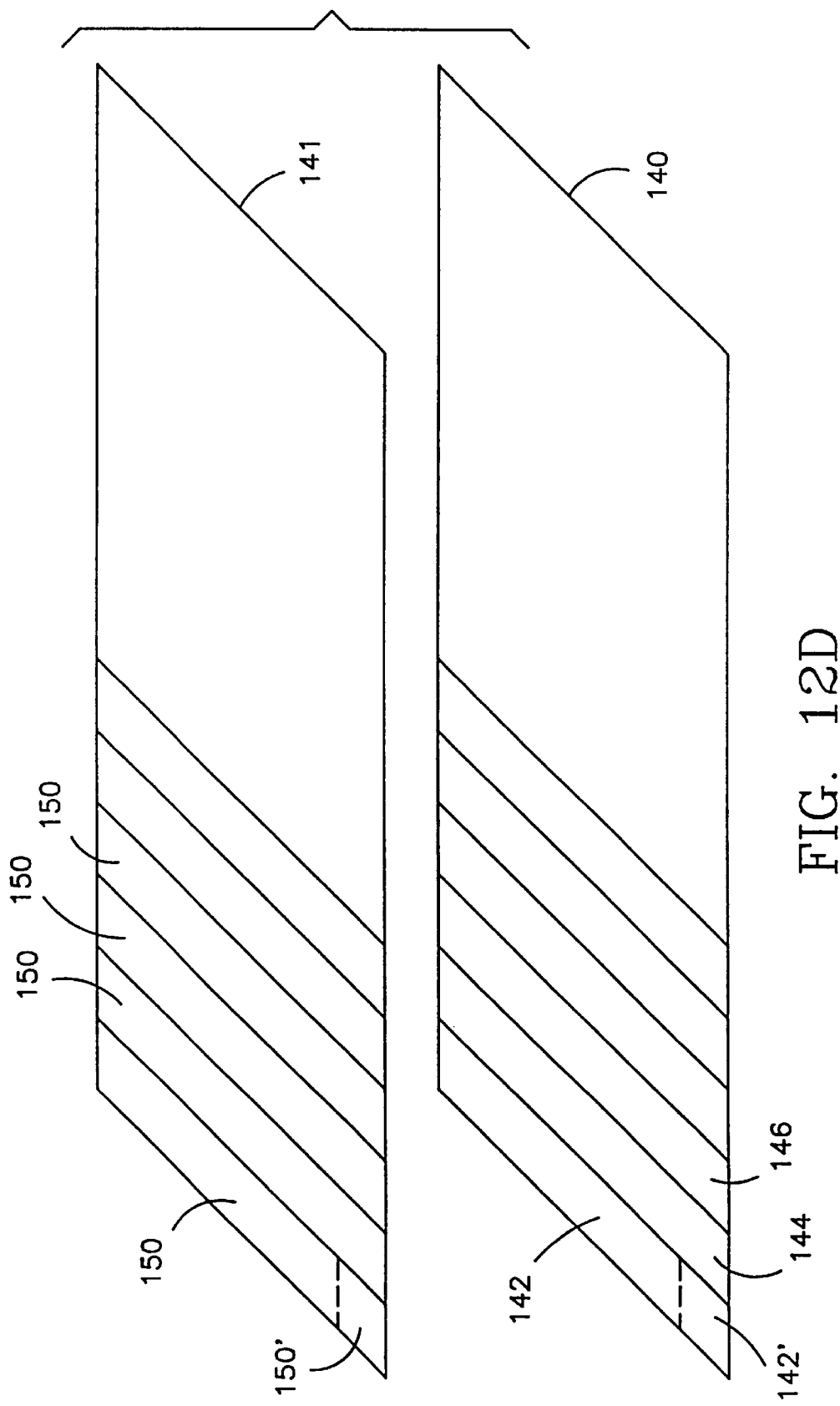
FIG. 12D shows the overlay arrangement for matching expanded and offset replications of a pattern against multiple expanded and offset known patterns.
Figure 13A:
FIG. 13 illustrates a composite pattern formed from 3 component patterns.
Figure 13B:
Figure 13C:
Figure 13D:
Figure 13E:
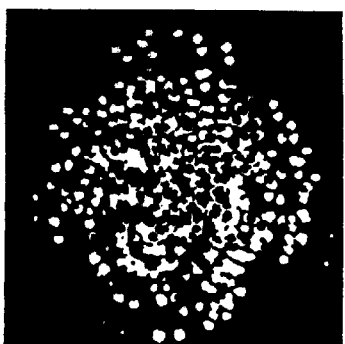
Figure 13F:
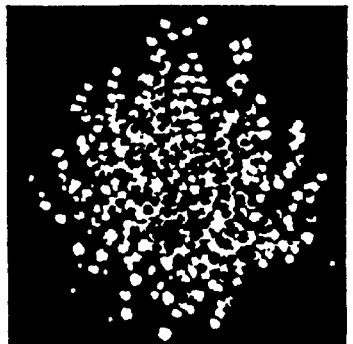
Figure 13G:
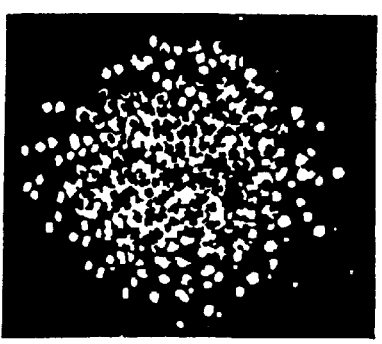
Figure 14A:
FIG. 14 illustrates one technique for simultaneously matching a pattern against enlarged and superimposed patterns.
Figure 14B:
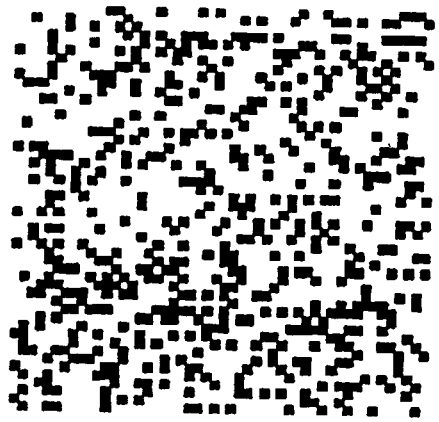
Figure 14C:
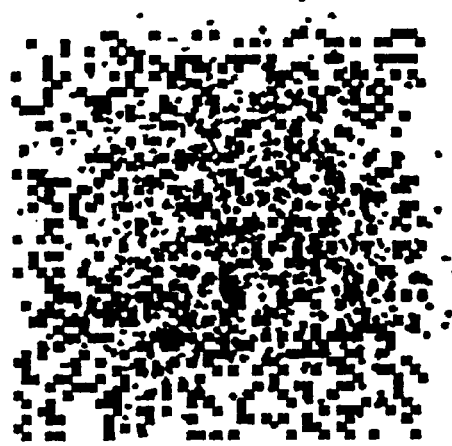
Figure 14D:
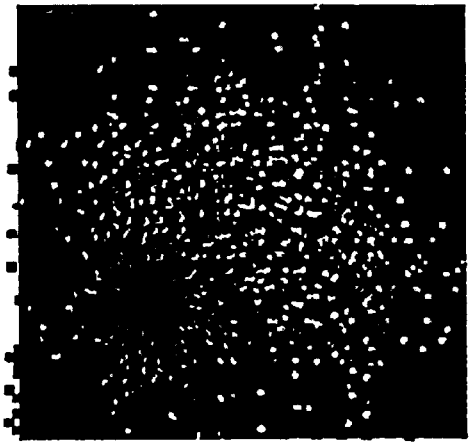

A particular pattern can be compared simultaneously to a stack of images, where the stack is OR'd together to produce a single binary composite image. The existence of an artifact demonstrates that there is a matched pattern somewhere in the stack. FIG. 12A illustrates a correlation artifact produced by a match between a stack of three patterns and the reference pattern.

To permit larger stacks to be simultaneously searched without saturation of the stack array, multiple patterns can be arranged side-by-side (see FIG. 12C) in a tiled pattern 120. Each cell 130, 132, 134, 136, etc. of the tiled pattern 120 contains a different base record. The overlay of unknown records 122 is prepared by replicating the unknown record 124 in each cell of the overlay 122. The presence of a correlation artifact as between one cell of the overlay and one cell of the tiled pattern 120 indicates a match.

Another arrangement for larger stacks of information (see FIG. 12D) involves a composite record 140 composed of a plurality of individual base records 142, 144, 146, etc. each of which is offset from the adjacent base records. The base record 142 may actually represent an enlargement of the actual base record 142'. The overlay 141 of the unknown record may also be prepared as a composite of offset copies 150 of the unknown record. As with the known records, the unknown record 150 may represent an enlargement of the actual unknown record 150'. The base records in the composite and the unknown record in its composite may also be stacked in the perpendicular direction to further increase the searchable density of the stack. The correlation artifact produced from the overlay 141 and the composite 140 not only indicates the presence of a match, but its center location indicates the index in the expanded array which designates the particular matching pattern. Other configurations of the database, including interleaved patterns, can be used with similar results. Mathematically, the use of flash correlation can be expanded to "n"-dimensional images.

Alternately, a composite pattern can be decomposed through matching with database members and then subtracting those members from the composite until no FCA remains. FIG. 13 illustrates the treatment of a composite fingerprint. Flash correlation performed between fingerprints 54', 56', and 58', each with composite 60', produces FCA's 62', 64', and 66'. Subtracting the component pattern elements associated with those three prints from the composite leaves no remaining pattern elements. Therefore, the composite print has been found to contain the prints of those three individuals and no others.

Given the structure of a database and the nature of component patterns, if every pattern has an identifiable orientation and center or edge boundaries, the database can store just composite patterns and the related range of q and (Δx,Δy) required to insure a complete search of the database partition. If the centers, boundaries, or orientation cannot be identified uniquely for each pattern, then it may be necessary to store each pattern in the database.

In forming composite patterns, to avoid saturation of the pattern area, the size of all patterns may be enlarged for optical correlation. Alternately, for digital processing, the pattern may be spread out and patterns forming the composite may be slightly offset from each other. FIG. 14 illustrates superimposition of 2 patterns where large and small dots are used for emphasis. FCA can be used to match either of the patterns, or the composite pattern.

Figure 15A:
FIG. 15 illustrates one technique for simultaneous matching against a mosaic of patterns.
Figure 15B:
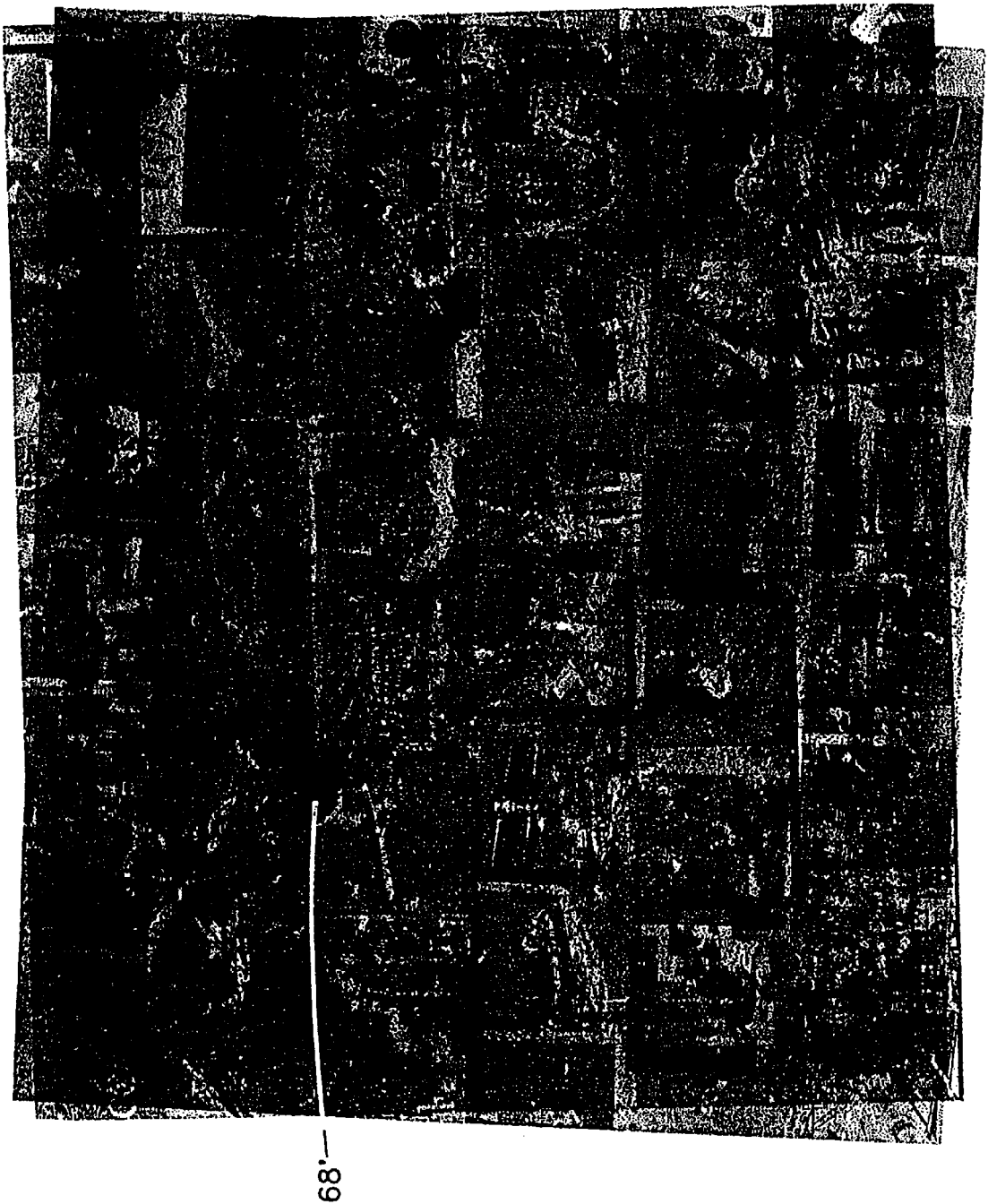
Figure 15C:
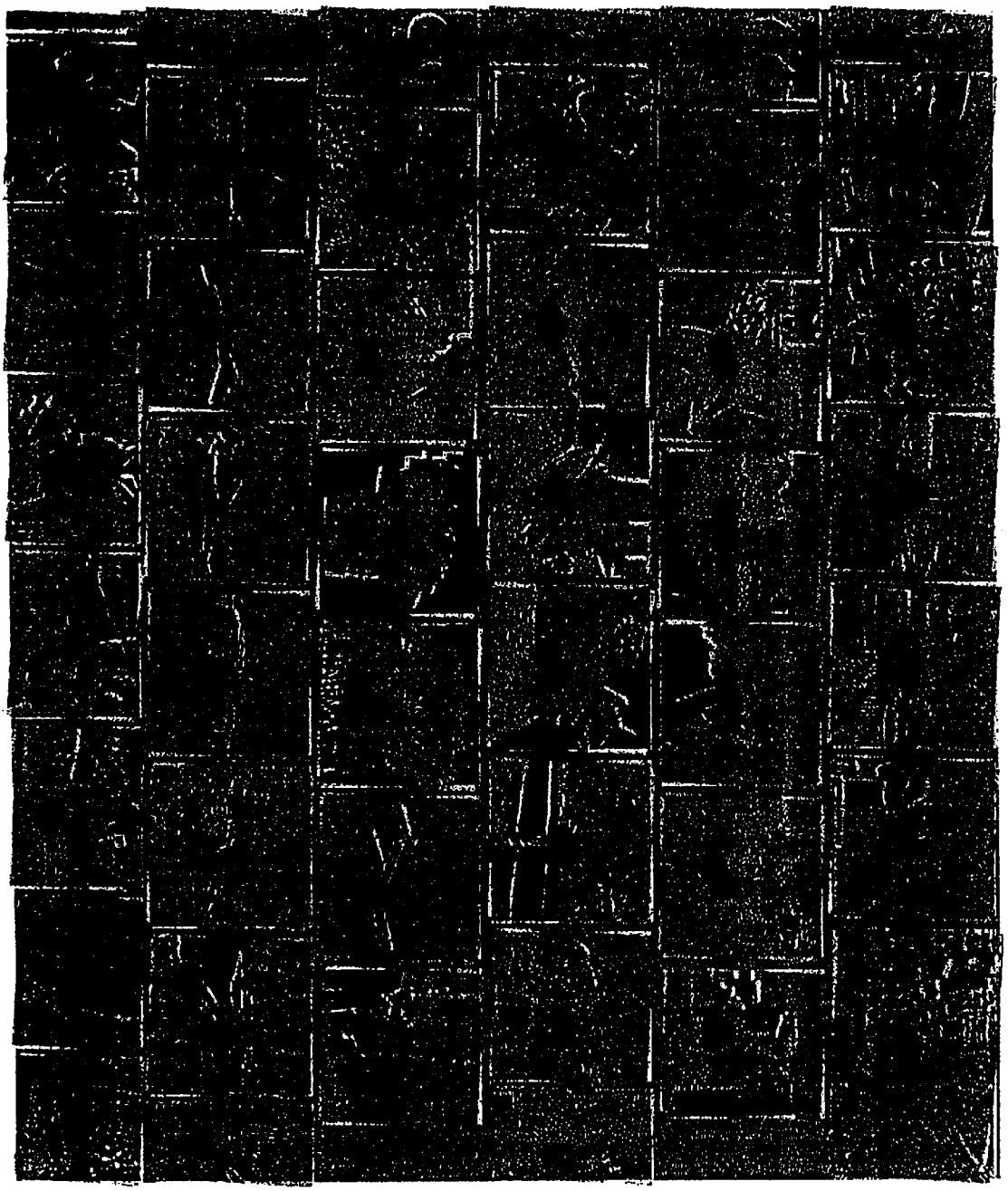

Flash correlation can be used to simultaneously match a mosaic of patterns. FIG. 15(a) illustrates a mosaic of complex images, FIG. 15(b) indicates an FCA 68' positioned within one cell. If there is a possibility that one or more cells of the mosaic have been changed and it is necessary to detect that occurrence, then the FCA should be repositioned to within each cell. If the FCA cannot be repositioned to a particular cell, then that cell has been significantly changed. Alternately, as in FIG. 15(c), multiple FCA's can be simultaneously generated in each cell by appropriate preparation of the mosaic. In this illustration, each cell in the known mosaic has been rotated prior to overlaying the unknown mosaic. If only one cell's contents are of interest, such as when it is desired to search for a particular plane in many frames of overhead imagery, that cell can be replicated into a mosaic in which all cells are the same. A mosaic of unknown cells (patterns) can therefore be matched simultaneously against duplicate cells containing the target of interest. Alternately, an unknown pattern may be replicated to fill every cell in a mosaic, and then be matched against a mosaic in which the various cells represent different views of a target of interest, such as radar or photo images of the plane taken from different angles and heights. In this application, each unknown image could be simultaneously tested for massive similarity with any of the different orientations of the target of interest.

Figure 16A:
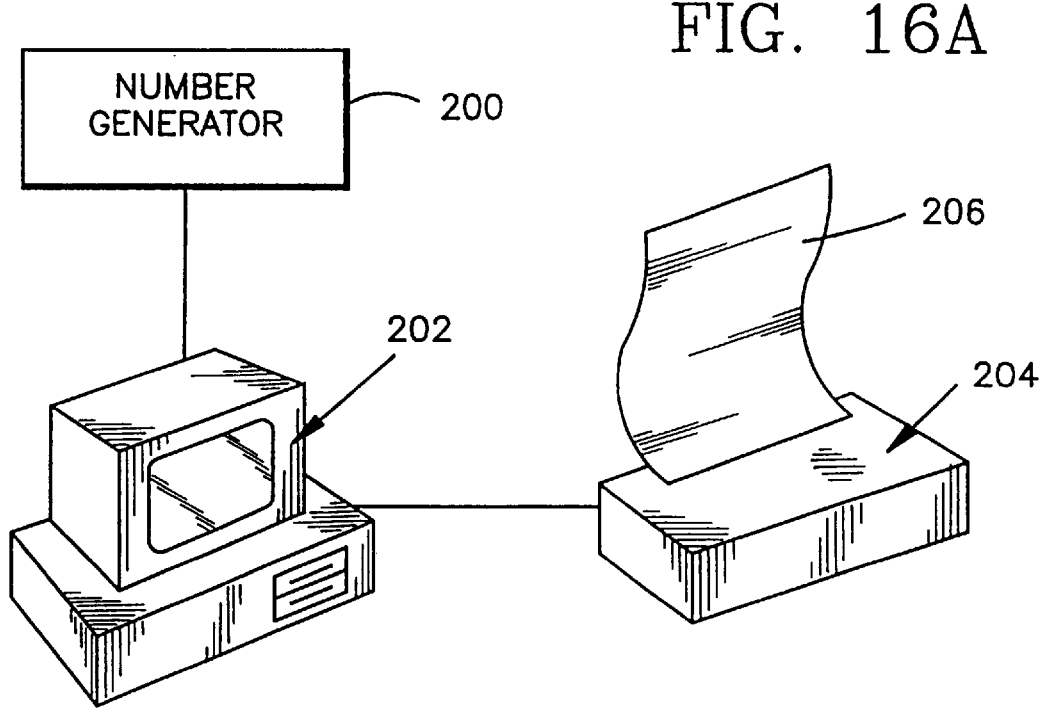
FIG. 16A is a schematic illustration of a record generator.

Due to its intended application as an automated record identifier, as in authentication of applied dispersed particle tags, apparatus for practicing the preferred embodiment of the present invention (see FIG. 16A) includes a suitable conventional random number generator 200 which is either connected to or programmed into a suitable conventional digital computer 202. The programmed digital computer 202 is connected with a suitable conventional output device 204 which may be a printer. In any event, the output device is capable of generating a hard copy record 206 of random 2-dimensional patterns, or records, suitable for use in tagging articles. Those tags can be attached in any desired manner, including adhesively, bonding into surface material, hang tags, and the like.

With each article having been tagged, the method of identifying individual articles includes recording the 2-dimensional base record corresponding to each article and creating a database of those base records as discussed above. To later identify a particular article, a record of the unknown article is made at the time. Using the flash correlation method described above, the database is then searched to identify the corresponding base record.

Figure 17A:
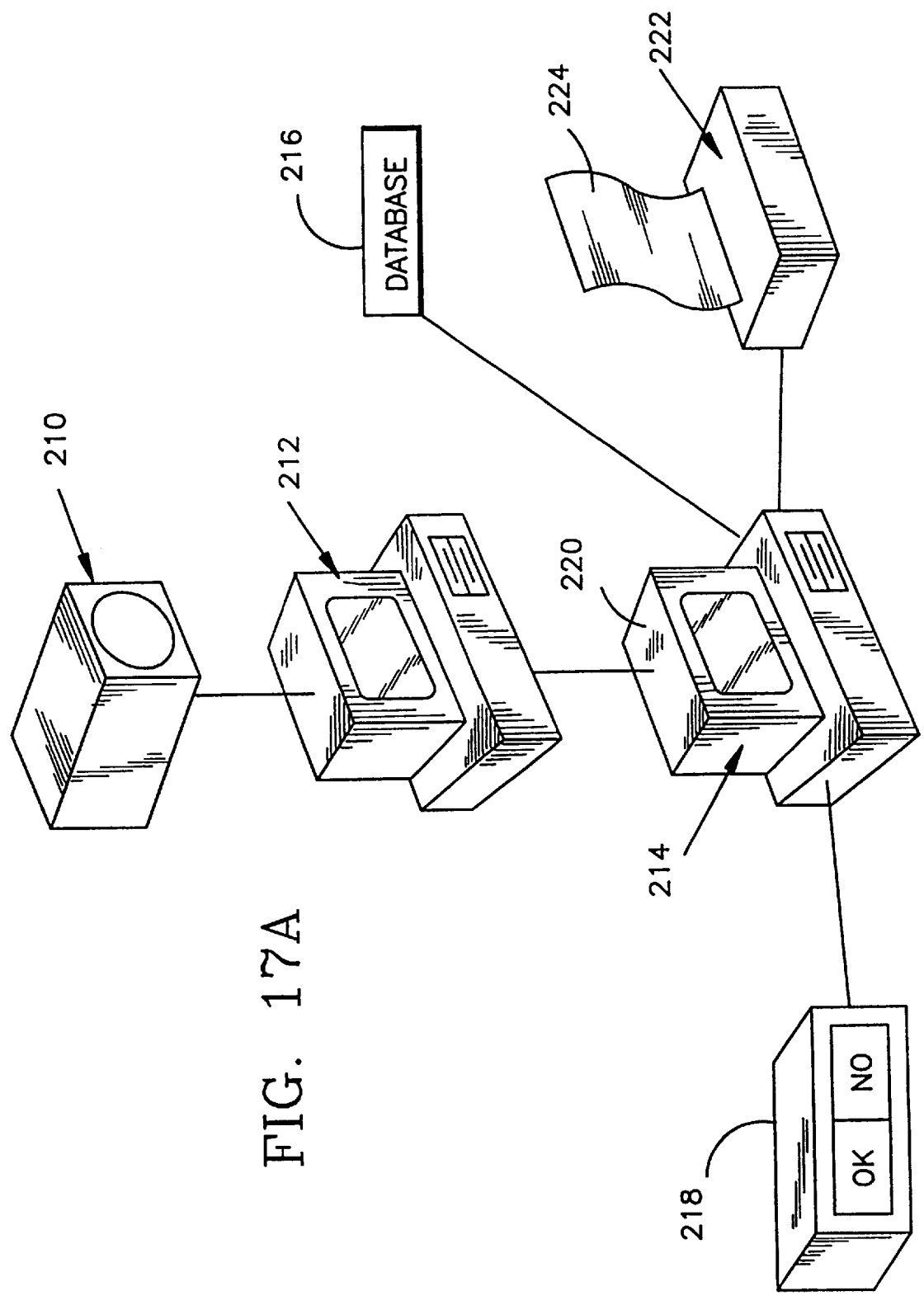
FIG. 17A is a schematic illustration of a record identification system.

A preferred way of scanning existing 2-dimensional random records, or tags, for subsequent flash correlation with a database (see FIG. 17A) may include a CCD array camera 210 for scanning the tags and generating a signal indicative of the density variations across the tag. That signal is then processed by a suitable conventional digital computer 212 which reconstructs the 2-dimensional array for the unknown tag or record. That 2-dimensional array is then passed to a suitable conventional massively parallel processor 214 which has access to a database 216 of authorized record-generating codes.

The processor 214 performs a flash correlation between the unknown array and the database 216. If the tag is being examined to control access or to ascertain authenticity, a simple indicator 218 with lights, LEDs or other actuatable indicia can be operated by the processor 214 to indicate that the tag is "OK" or "NO". Such a signal could also be sent, or could alternatively be sent, to a monitor 220 of the processor 214, if desired.

Attached as an Appendix A to this specification is a print-out of subroutines written in the FORTRAN programming language which can be used with a CPU having an 80486 microprocessor and a suitable conventional FORTRAN compiler. The subroutine's of the Appendix cover Oring two images, rotation of an image, generation of a random image and searching for a correlation artifact. Also attached is a second subroutine marked as Appendix B, which compares two images of any dimension and at any angle to determine the strength of the artifact to be detected.

When the unknown tag is to be positively identified, the processor 214 can transmit the identification information to either or both of the monitor 220 and a suitable conventional output device 222 such as a printer capable of generating a hard copy record 224. The hard copy record could simply comprise identifier information for the unknown tag. In some applications, the hard copy record 224 may comprise an overlay of the unknown record and the corresponding known base record from which changes can be readily identified. The latter approach would be particularly useful when the unknown image is dewarped to the same scale and orientation as the base record.

Figure 16B:
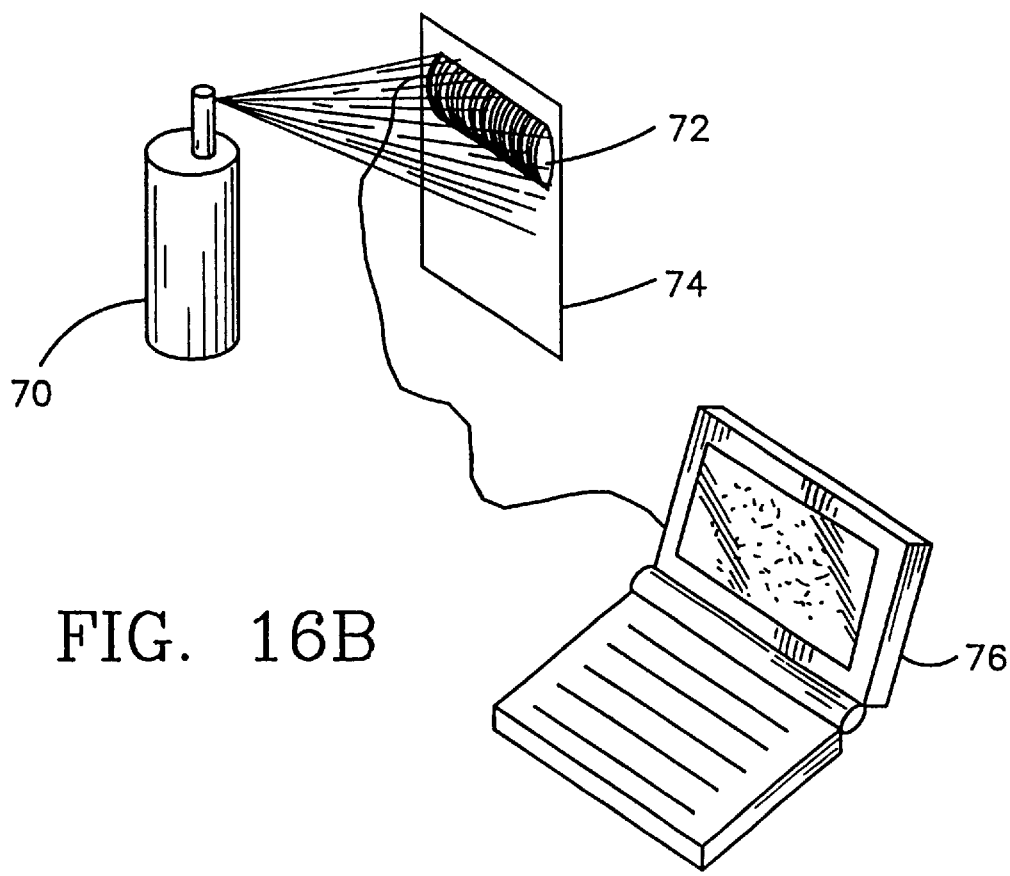
FIG. 16B is a schematic of a pattern generator.

A further embodiment of a system for pattern generation includes the equipment shown in FIG. 16B, which consists of a can of spray paint 70', a handheld optical scanner 72' which digitizes the spray painted pattern 74' and stores it in a database within a portable computer 76' as a known pattern. Other techniques for pattern generation include use of computer generated pseudorandom patterns output through printers directly onto an object to be marked or onto a label to be applied. The advantage of using a pseudo randomly generated pattern is that only the seed to the pseudorandom generator need be stored, rather than an entire pattern.

Other techniques and equipment can utilize naturally occurring patterns such as paper fibers which may be imaged using transmitted light and a high resolution camera.

Figure 17B:
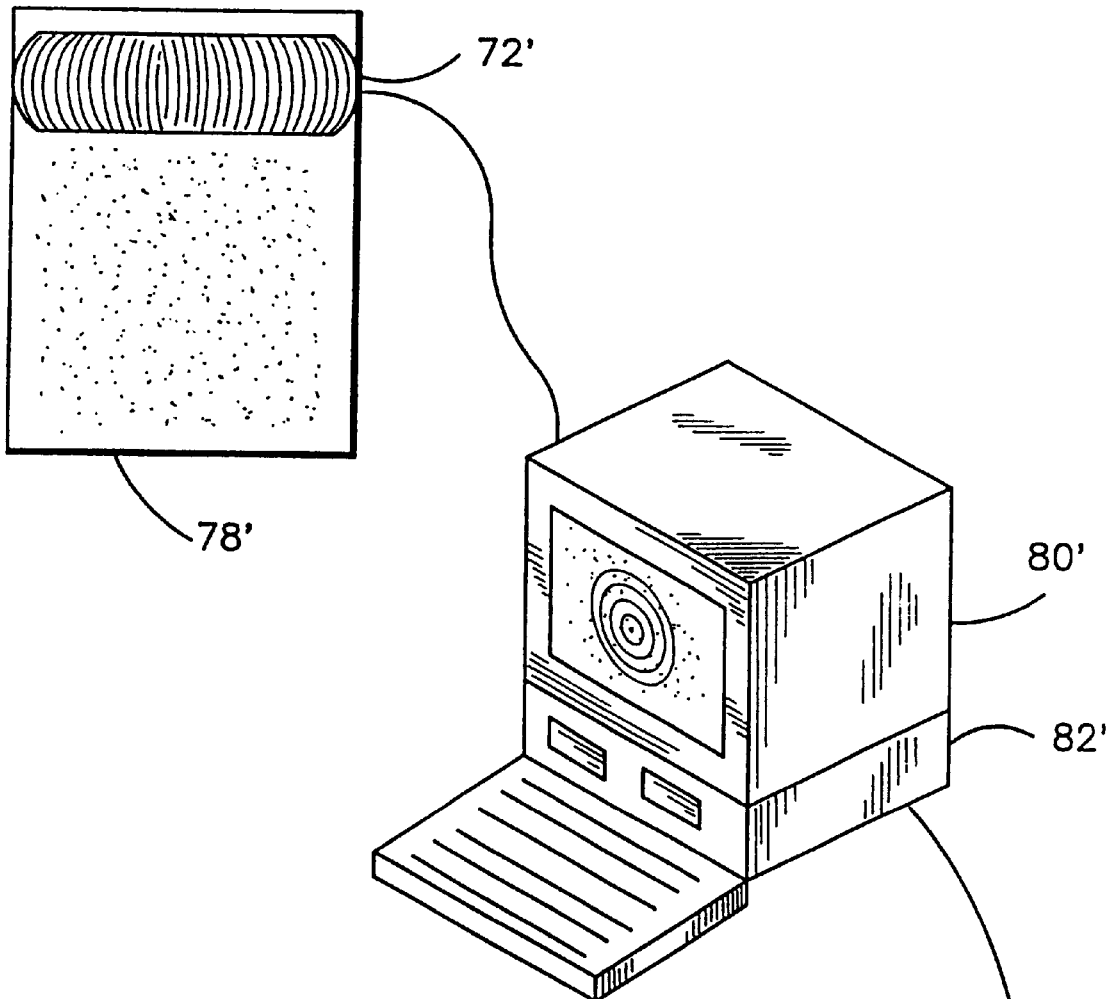
FIG. 17B is a schematic of a pattern matching system.
Figure 17B:
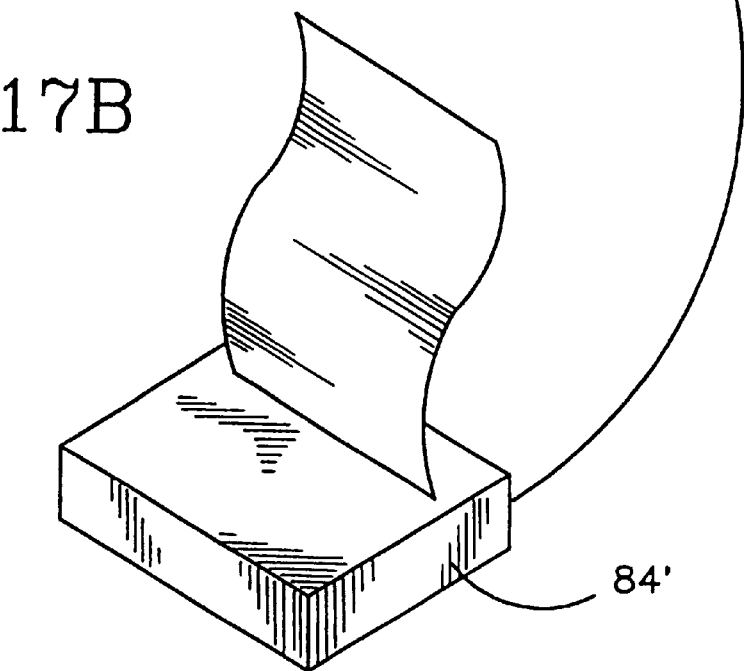

The apparatus for classifying and identifying patterns can be a general purpose computer system such as shown in FIG. 17B. A scanner 72' is used to collect unknown patterns 78', digitize and input them into a computer 80', which performs flash correlation with an on-line database 82' of known patterns. In a fully automated mode, the system perform flash correlation, analyzes the parameters of FCA's produced and indicates the identification of the unknown pattern on a screen or printer 84' or other output device. In an interactive mode, the system may display FCA's, with or without parameters, and permit the operator to make the final determination. In the case of fingerprints or other patterns for evidentiary use, the system can also display and output the original images, and patterns extracted from the images for classification and identification.

The FCA persists when local variations are created in the original pattern, such as when the information is encoded to be read out by superimposition of two related patterns. FIG. 18 illustrates patterns 86' and 88', which produce a strong FCA. Using the FCA as an axis of rotation, the two patterns may be aligned to display the embedded message 90'. When 88' is replaced by another pattern, it produces a different message 92' as in FIG. 19.

Figure 20A:
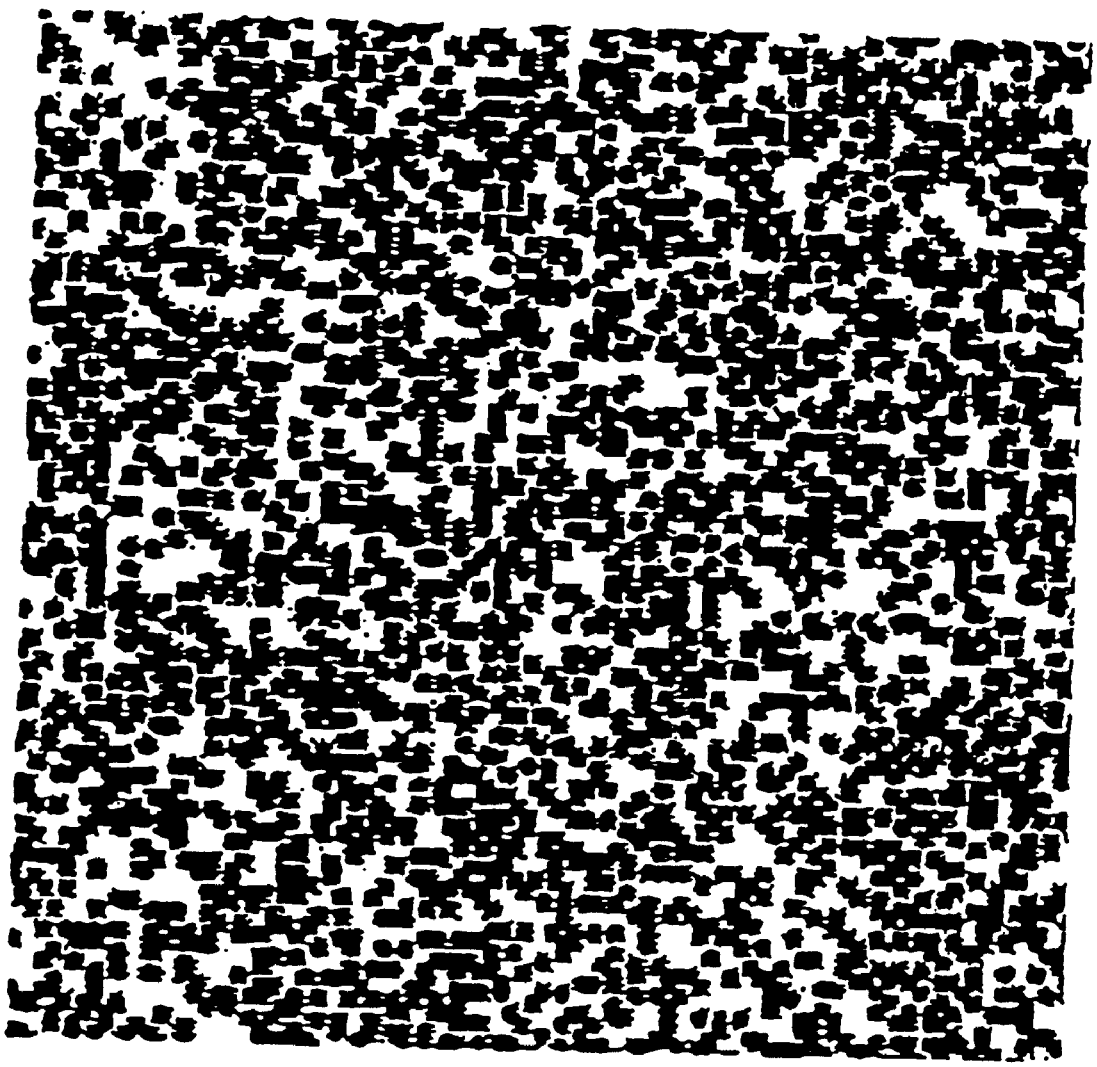
FIGS. 20($a$ and $b$) illustrates respectively first and second patterns from different generators, ($c$) the logical OR of the first and second patterns, ($d$) the FCA produced by matching one of the patterns with its complementent, ($e$) the flash correlation between the first pattern and a composite of the first and second patterns, ($f$) the flash correlation of the pattern of FIG. 20($c$) with itself, and ($g$) the resulting +/− correlation of the component patterns of FIG. 20($c$) with their resolution reduced.
Figure 20B:
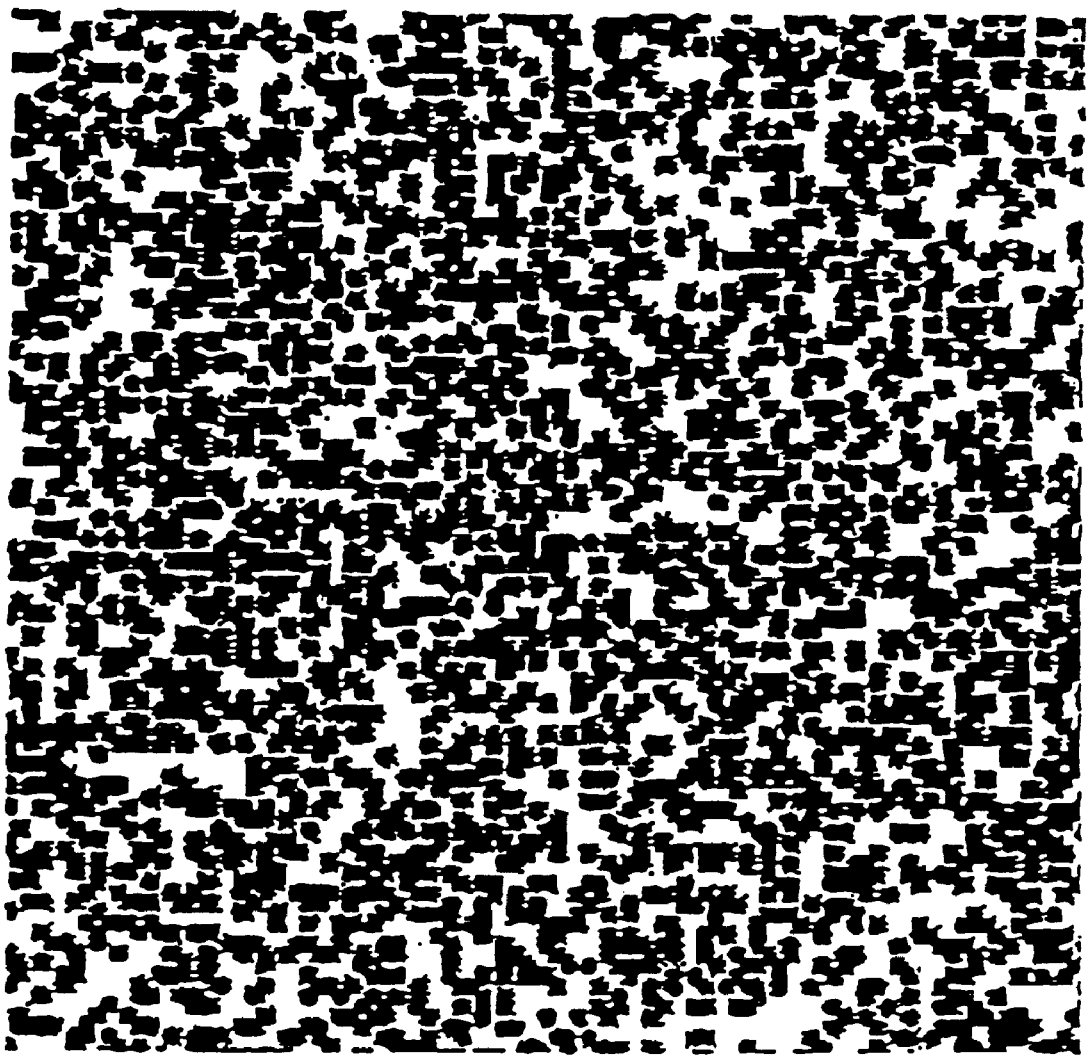
Figure 20C:
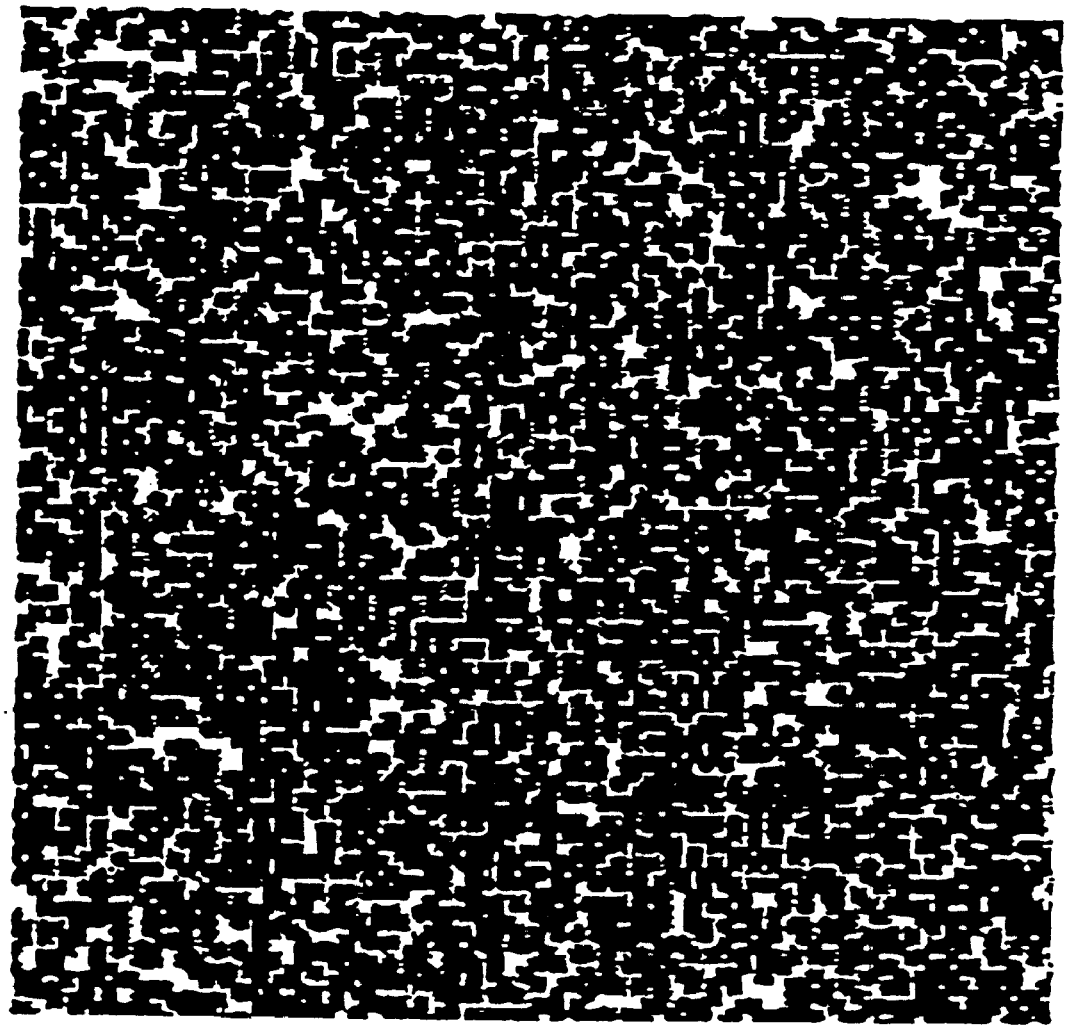
Figure 20D:
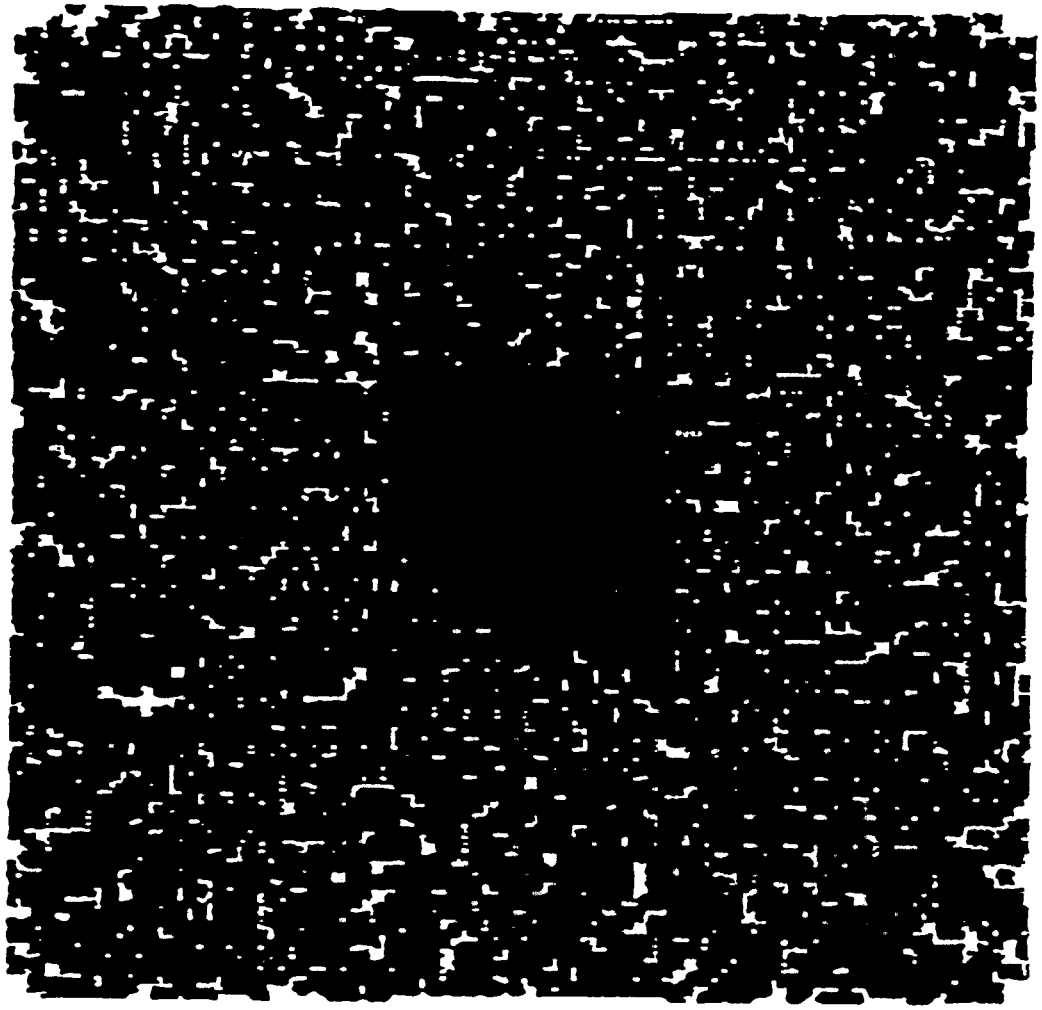

The ability to combine patterns and subsequently match either the composite or the component patterns has many areas of application. FIG. 20 illustrate the appearance of the dark artifact for pixelized imagery. FIG. 20(a) is a first pattern. FIG. 20(b) is a second pattern uncorrelated with the first. FIG. 20(c) is the overlay or logical OR of the two patterns. FIG. 20(d) shows the artifact produced when FIG. 20(c) is flash correlated against its complement by overlaying the two at an angle of 2 degrees. The result is a black square centered at the point of rotation, which in this illustration is the origin. The square is solid black, indicating that the two patterns are exact complements, at least within the area represented by the square. FIG. 20(f) shows the result of flashcorrelating FIG. 20(c) with itself rather than with its complement. The rings characteristic of the light artifact are present and extend to the edges of the resulting composite. That indicates that significant correlation exists throughout the two patterns matched, not just within the area represented by the square dark artifact. One technique to ensure that anomalous local artifacts do not occur is to perform both the +/+ and +/− comparisons.

When candidate matching patterns within a database are sufficiently distinct, such as when they are generated by a random process, it may be sufficient to use a small artifact for identification of matching patterns using the +/− comparison only. When the database may include patterns with some similarity to one another, a larger artifact can be generated by using a smaller angle of rotation. This will essentially compare a greater portion of the two patterns.

Alternatively, a very small +/− artifact can be generated and moved to various positions within the area of overlay to test that the correlation is universal throughout all areas of the two patterns. This approach has the advantage of compensating for relative warping between the two patterns.

Any sets of images which can be aligned sufficiently can be shuffled to produce randomized pixelized patterns such as shown in FIG. 20. The shuffling, using standard techniques known in the art (butterfly shuffle being a popular example) assures that there will be pattern information within the center region where the search for the artifact will occur. Shuffling also can be used as a sampling technique so that a small artifact can be produced but still result in high confidence in the resulting match decision. As an example, consider the map of Washington D.C. shown in FIG. 9. The +/− artifact could be hidden within a solid black area of the composite, and be therefore undetected. If highly structured imagery such as FIG. 9 is to be matched, the artifact can be translated to an area of low density in the composite to make it more detectable. However, if the known and unknown images can be aligned to a reference and can each be shuffled with the same algorithm, then the resulting comparison will have the appearance of FIG. 20(d).

Figure 20E:
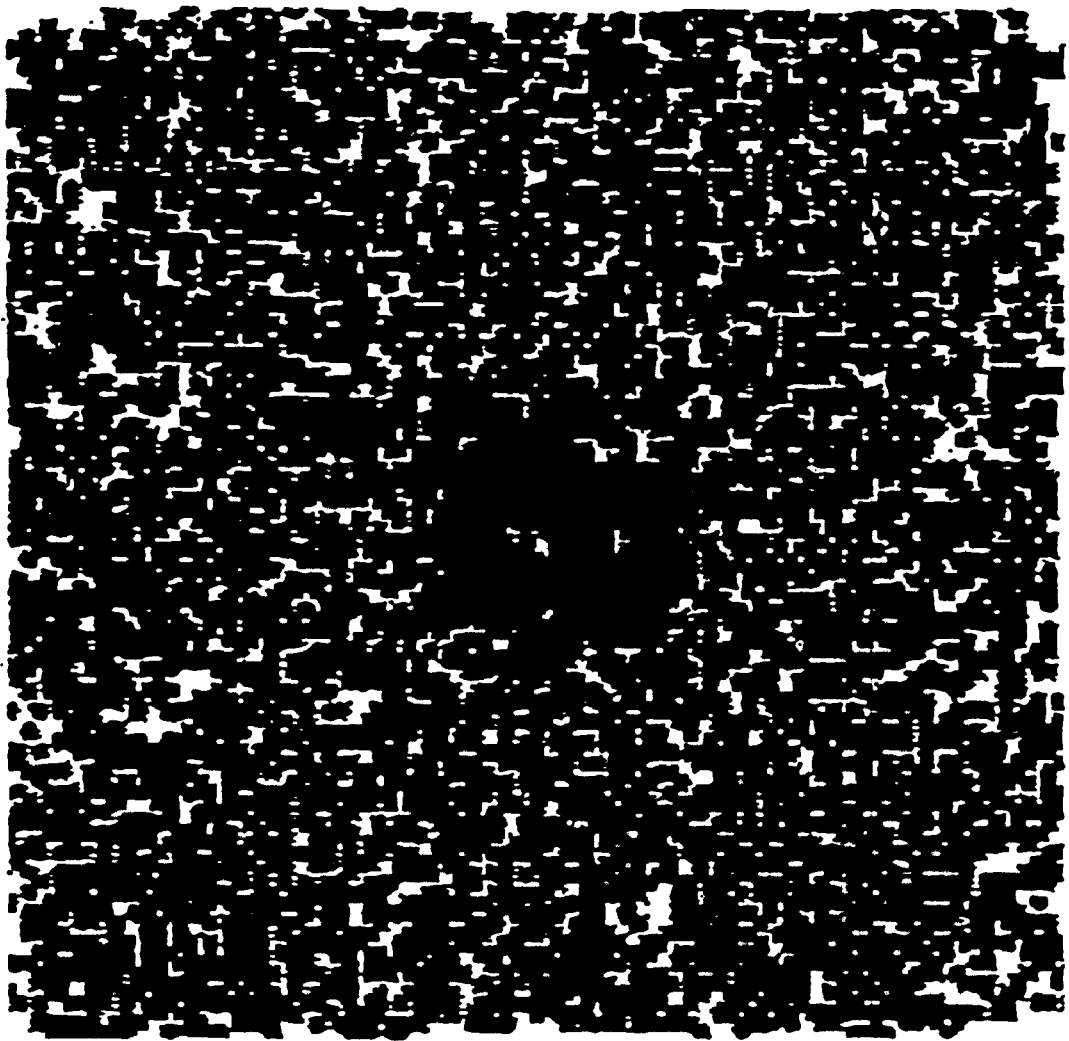
Figure 20F:
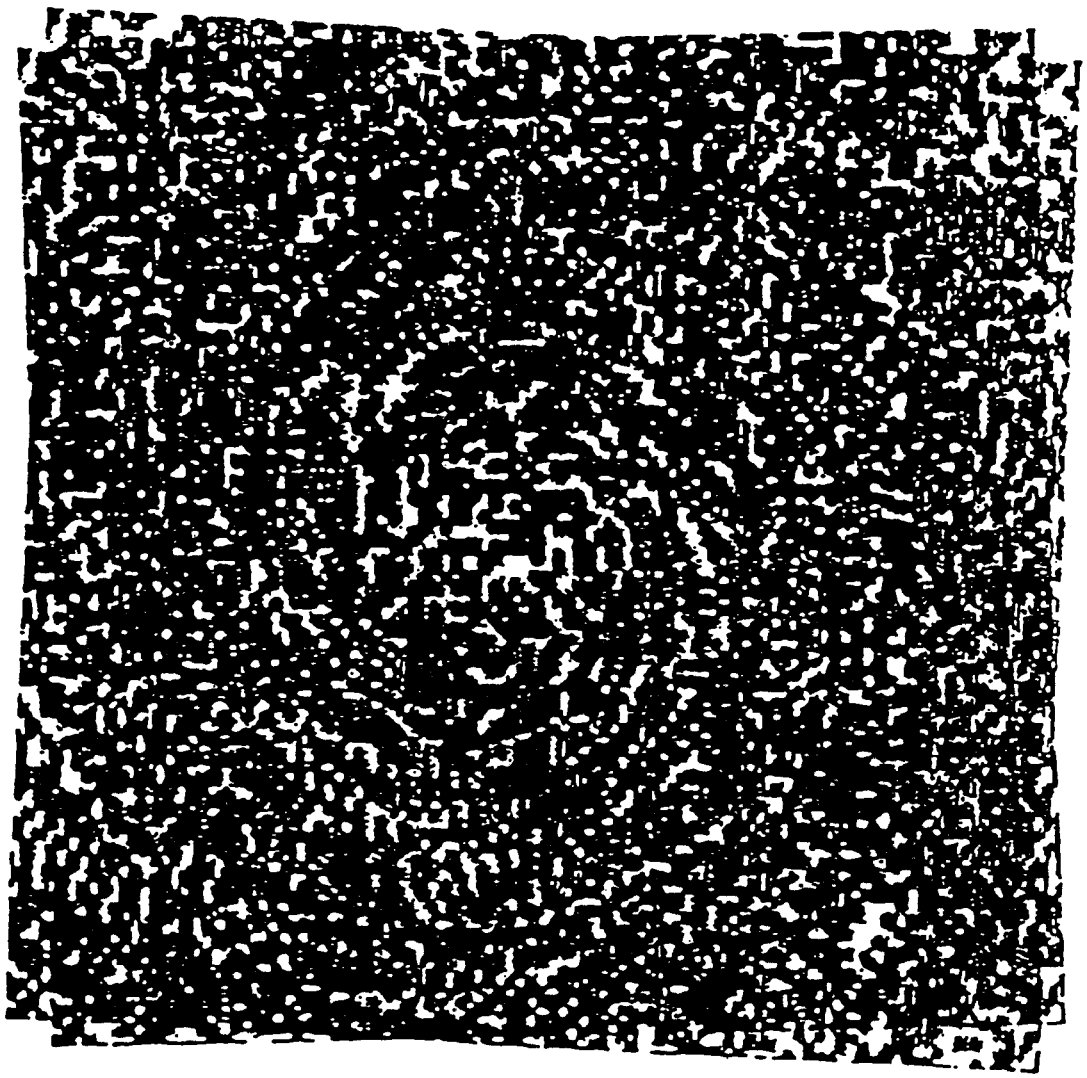

FIG. 20(e) illustrates the flash correlation between the first pattern and the composite formed of the first and second pattern. The result is an artifact which is not solid black, indicating that the two patterns being compared are highly correlated but not exactly the same. In this example, the first and second patterns 20(a) and (b) were randomly generated with 30% black pixels. The composite 20(c) was therefore approximately 50% black. The ratio of white to black pixels within the artifact area calculated from equation (26) is a measure of the degree of correlation between FIGS. 20(c) and 20(a).

When it is desired to speed the matching process, a coarser pixelization of two images can be initially used for detection of the FCA in a preliminary sort through a database. If multiple database images produce FCA's, the best match may be determined among the candidate matches by flash correlation of the fully resolved images. Such a rank ordering can proceed with stepwise increases in resolution until a single image produces the strongest artifact. This approach is most useful in large databases where there may be strong similarity among some of the component images.

Figure 20G:
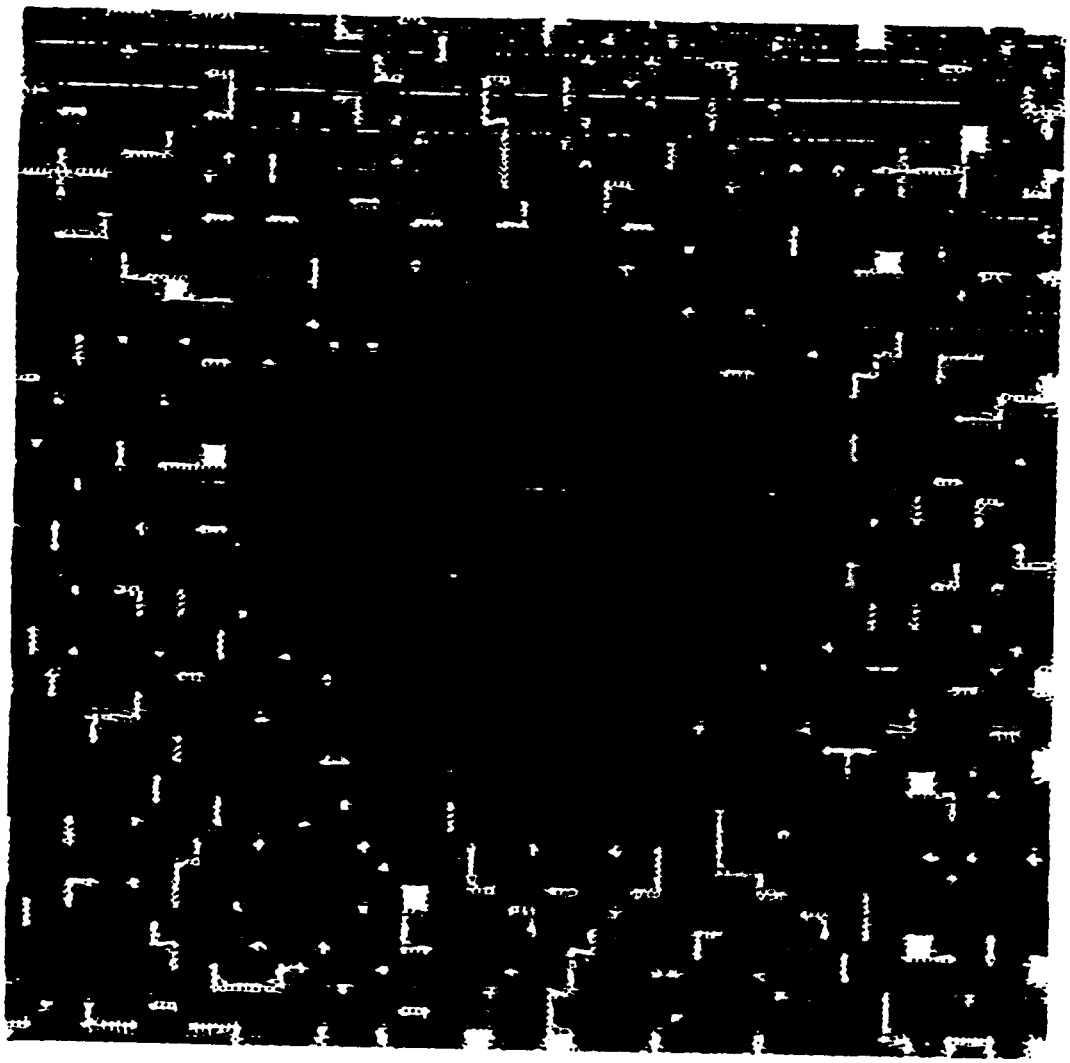

FIG. 20(g) shows the resulting +/− correlation resulting when the component patters of FIG. 20(c) have their resolution reduced to 50×50 pixels from 100×100 pixels. The resulting FCA is twice as large since the pixels are twice as large when the patterns are drawn to the same scale. Comparing this result with FIG. 20(d) shows that the coarser comparison is sufficient to indicate the FCA.

In addition to naturally occurring patterns, patterns may be generated from encoded text, symbols, scenes, maps, audio tracks, magnetic fields, or the chemical, mechanical, or manual dispersion of particles such as paint, sizing, conformal coatings, or other particulates to produce a record, which can be 3-dimensional, involve unlimited colors, and be comprised of variously sized particulates. Examples include printed circuit board traces, sheets of pharmaceutical tablets arranged in blister packs, biological or biometric markers, such as fingerprints, DNA samples, voice prints, handwriting, facial features, or illumination distribution across the ends of a fiber optic cable or bundle of cables. These images may be preprocessed to extract sample or minutiae points as a pattern, and may be scrambled, encoded, or otherwise modified systematically for enhanced security or detectability of the FCA. The images may result from visible, infrared, laser interferometer, x-ray, NMR, CAT, or other sensors.

Reflective particle tags (Weber U.S. Pat. No. 4,825,801) have been in use in high security marking applications. Current methods for authenticating and identifying such tags are cumbersome and slow. Flash correlation offers an alternative technique for manual or automated verification. The use of reflective particles, as well as the use of multiple colors, thick particles, and other techniques can insure that the patterns considered by flash correlation are originals, rather than photo reproductions. Alternately, a multi-colored or multi-spectral image can be decomposed into component patterns, and each component tested using flash correlation. This can provide enhanced security and proof of originality of the patterns.

The database can be stored in various forms, including transparencies, photographs, digitized patterns on electronic medium, and digital codes for pseudorandom number generators. The flash correlation method may be performed by manual overlay of two or more transparencies, by interactive use of a processor which performs and displays the overlay, or by automated system which performs inclusion, classification, and identification steps.

The limitations to the size of the patterns are due to the resolution of the optics and digitizer used to record the pattern, and the relative size and distribution of the pattern elements. In general, the pattern may be any size and use any type and distribution of elements. The pattern need not be on a flat surface, and need not be visible to the eye. The size and nature of the processor, along with the size of the patterns, will determine the speed of the processing.

It has been found that mixing microscopic elements into plastic resins provides a very inexpensive unique marking technique for items produced in very large volumes, such as pharmaceutical coatings and their packaging. Similarly, the high magnification imaging of most production items offers unique patterns for subsequent identification of each particular item. Additional pattern may be superimposed using pseudorandom pattern generation, to replace the use of 2-dimensional bar codes for product identification. Using flash correlation, the effects of dirt, abrasion, defacement, curved surfaces, and other limitations of bar coding are reduced.

Existing technology for tagging and verification of the identity and integrity of containers and other items offers insufficient security against sophisticated adversaries. Low-cost, easy-use techniques such as paper seals and reflective particle tags provide enhanced security; however, their difficult installation and verification procedures restrict their use and raise questions regarding the validity of any indication of misidentification or breached integrity.

Significant need exists for tagging and verification techniques which exhibit uniqueness and irreproducibility in quantities to billions of patterns; ease of installation; surety of ease of verification; ability to secure bundles, pallets, or bins of items with single point tamper indication; understandable techniques requiring minimum training and skill; low-cost production and verification; immunity from undetected removal and replacement; embedded identification number for each in manual inventory checking; rapid production, installation, and verification; usable under all lighting and environmental conditions; exportable technology; amenable to manual or automatic verification; verifiable from convenient distances; passive and providing no interference with allowed use or transport; continued utility in spite of dirt, partial defacement, reorientation of sensors, and aging effects; insitu production as required quickly and inexpensively; secure transmission of newly created patterns to a central database; procedures for rapid verification of large numbers of items, in real time or with post-processing; and variable sizes to accommodate all scenarios for verification.

Flash correlation offers the use of any convenient marking system to achieve a tagging and authentication capability meeting all of the listed requirements. In addition, it provides the unique capability to update the pattern at any time by overspraying or overprinting additional pattern information, without requiring precise alignment.

To date, optical encoding has not been applied to verification tags, possibly due to the time and cost normally involved in generating and accounting for the encoded images and overlays. However, techniques have been developed which now allow tags to be produced on demand at a cost of less than $0.001 per tag, e.g., using spray painted patterns. The security offered by these techniques is superior to other tagging systems in eliminating the risks of detection, forgery, reapplication, and duplication.

Optically encoded tags provide highly secure, inexpensive assistance to the verification of the identity and integrity of items including documents, containers, and parcels. An optical encoded tag system includes: Means for producing the tag; means for affixing the tag; means for archiving the tag for future comparison; security provisions to restrict access to the archives; means for verifying the tag at a future time; security provisions to prevent duplication or removal and reapplication of the tags; management of distribution of overlays to authorized parties; and procedures to be followed after verification is successful or is not.

The illustrations below visualize the optical encoding principle. Scenarios for its use in verification tagging applications, and mechanisms for production of the tags and overlays are later described.

Two-part random digital patterns, which when overlaid produce a solid black message on speckled background, may be generated as follows.

The tag, or first pattern, $T(x,y)$ may be generated by computer as a random matrix of black and white pixels, $R_g(x,y)$. Dividing $R_g(x,y)$ by 2 to account for the two parts, produces a uniform distribution of numbers between 0 and 1 in a 2-dimensional array, which is then thresholded at 0.5 to produce 50% black and 50% white pixels. The 2-dimensional array can be printed by a video, laser, or ink jet printer onto a reflective material which will be affixed to the item to be tagged. The tag pattern is stored and used to generate the message overlay. Storage can be in computer memory, or on a removable medium such as a floppy disc, or on the backing of the reflective tag material.

A message pattern $M(x,y)$ may be created by using the computer keyboard, mouse, graphics tablet, or other input device, to produce alphanumeric, bar code, handwritten, or image messages. Pixels in the message pattern are given values of "I" or "0", corresponding to black or white in the display.

The message overlay $O(x,y)$ may then be produced on the computer, and printed out, using the following algorithm, where $O(x,y)$ is set to the complement of $M(x,y)=-1$ $$O(x,y)=T(x,y)-M(x,y)$$

Neither $T(x,y)$ nor $M(x,y)$ have an information content. Both are random patterns. The information content is present only in the aligned combination of the two arrays. The readout message $R(x,y)$ is $$R(x,y)=T(x,y)+O(x,y)$$

where + is the Boolean inclusive OR function.

By producing $O(x,y)$ on transparency material, it can be physically overlaid on top of $T(x,y)$. The resulting image, FIG. 21, represents the results of the above question.

Any number of messages can be generated to use the same tag. Various inspectors, for example, can each encode their own signature or other identifying information, using the same tag. Access to two or more overlays generated for the same tag may produce sufficient information to read the messages even without access to the tag, unless an additional step is taken to assure that all messages are uncorrelated with each other. This can be done as follows.

The tag, or first pattern, $T(x,y)$ can be generated by computer as a random matrix of black and white pixels. $R_g(x,y)/2$ produces a uniform distribution of numbers between 0 and 1, which is then thresholded at 0.5 to produce 50% black and 50% white pixels. It is printed by a video, laser, or ink jet printer onto a reflective material which will be affixed to the item to be tagged. The tag pattern is stored and used to generate the message overlay. Storage can be in computer memory, or on a removable medium such as a floppy disk, or on the backing of the reflective tag material.

A message pattern $M(x,y)$ may be created by using the computer keyboard, mouse, graphics tablet, or other input device, to produce alphanumeric, bar code, handwritten, or image messages. Pixels in the message pattern are given values of "1" or "0", corresponding to black and white in the display.

The message overlay $O(x,y)$ is produced on the computer, and then printed out, using the following algorithm, where $O(x,y)$ is set to the complement of $M(x,y)$ when $O(x,y)=-1$.

$$O(x,y)=R_g(x,y)/2 \text{ when } M(x,y)=0 \quad (3)$$

$$O(x,y)=\text{Complement of } T(x,y) \text{ when } M(x,y)=1 \quad (4)$$

Neither $T(x,y)$ nor $O(x,y)$ have any information content. Both are random patterns. The information content is present only in the aligned combination of the two arrays. The readout message $R(x,y)$ is $$R(x,y)=T(x,y)+O(x,y) \quad (5)$$

where + is the Boolean inclusive OR function.

By producing $O(x,y)$ on transparency material, it can be physically overlaid on top of $T(x,y)$. The resulting images, shown in FIG. 22, represent two different messages produced using the same tag.

Rather than computer-generated patterns, a tag can be produced through spraying (see FIG. 23) or sputtering material onto the object to be marked, or by using existing patterns, such as paper fibers, which are considered sufficiently unique, although magnification may be required.

In this case, $T(x,y)$ will not in general be 50% each black and white; it can be any mixture of colors, shapes and sizes of particles. The patterns are scanned by a binary or gray scale or color scanner to produce the recorded image. A hand scanner should be used to allow for the pattern to be sprayed directly onto curved surfaces.

The tag pattern is stored and used to generate the overlay. Verification of the tag may be done using a colored overlay in which the color assignments on the overlay are calculated to render matching pairs of tag and overlay a solid uniform color. Verification is most conveniently performed by re-scanning a tag and performing the comparison within the portable computer. However, the overlay pattern may be printed out and used for manual verification. Changing light conditions, scratches or other defacement of the tags; differences in scanned and re-scanned distances and angles, and other expected operational considerations, can be accommodated with these tags.

If desired, a message pattern $M(x,y)$ can be created and embedded in the overlay. In the binary representation, pixels in the message pattern are given values of "1" or "0", corresponding to black or white in the display.

The message overlay $O(x,y)$ is produced on the computer, and then printed out, using the following algorithm, where $O(x,y)$ is set to the complement of $M(x,y)$ when $O(x,y)=-1$.

$$O(x,y)=R_g(x,y)/2 \text{ when } M(x,y)=0 \quad (6)$$

$$O(x,y)=\text{Complement of } T(x,y) \text{ when } M(x,y)=1 \quad (7)$$

Neither $T(x,y)$ nor $O(x,y)$ have any information content. Both are random patterns. The information content is present only in the aligned combination of the two arrays.

The readout message R(x,y) is $$R(x,y) = T(x,y) + O(x,y) \quad (8)$$

where + is the Boolean inclusive OR function.

By producing O(x,y) on transparency material, it can be physically overlaid on top of T(x,y). The resulting image represents the results of the above equation. Due to the possibility of clumps of particulate matter in the tag pattern, the information written in O(x,y) should be written in symbols which are large relative to the expected distribution of particulates, or the information should be repeated multiple times in the overlay, or both, to help insure readability. A sample of this type of image is illustrated in FIG. 23.

The tagging technique can be applied to various situations, including the following:

Each of 1–"n" parties can independently verify the identity of the tag. The tag itself may be a pattern applied directly on item, or on a frangible tag, affixed to the item to be verified. Attempts at removal destroy the tag. Each authorized party has the same verification overlay.

Each party authorized to verify the tag can do so independently. Changing the tag will be readily apparent to any party. Duplication of the tag can be made as difficult as desired, by such techniques as making it visible only under IR or UV light and only at very specific frequencies, or masking with other patterns visible to photographic film, optical scanners, and other devices likely to be used in attempts to duplicate the tag for use on other items.

Each of 1–"n" parties can independently verify the identity of the tag and also a secret message known only to that party. The tag may be a pattern applied directly on item, or on a frangible tag. Each authorized party would have an overlay which covers both a common area of the tag, and a private portion.

Each party authorized to verify the tag can do so independently of any other party by overlaying the common area of the tag. In addition, each party may have a private message encoded in another area, which only it knows. Further to the provisions detailed above, these features increase the difficulty of duplicating the tag.

The pixels in the tag and overlays can be various sizes, further compounding the difficulty in duplicating the tag. The tag can also be very large, with the overlays using only a portion of the tag. In addition, by placing the tag on a curved surface, or around the corner, it becomes much more difficult to duplicate the tag while holding sufficient registration to enable the duplication to be undetected.

Tags can be designed for use by 1–"n" parties where each party has a different access level. The tag pattern can be applied directly to the item, or on frangible tag. Each party to a particular level of access would have the same overlay and could read the same message. The different levels of access could, for example, correspond to finer pixel sizes, permitting the reading of finer message information. Other levels of security have overlays of larger pixels, which can only read coarse portions of the message.

Alternately, each party might have a different message, although all parties with the same access level share the same granularity to their overlays, in terms of the same pixel size.

Each party at a given level could have an overlay with a common area as well as a private area. That allows common verification as well as individual verification to satisfy each party's requirements for audit purposes.

Multiple automated systems for verification are also possible. A suitable tag pattern could be applied directly to the item to be marked. Such a system would have in memory the overlays corresponding to all patterns to be located.

The system can be programmed to automatically verify the authenticity of each pattern scanned.

The tags and overlays can be produced through a variety of techniques. Preprinted tags and overlays can be carried into the field, where the tags are affixed and overlays distributed. The preprinted books could retain the negative copy images of the tags and overlays removed. While tags are still in the book, they all appear as solid black matrices. An inspector selects a tag at random from the book, and notes its installation location in the book. The associated overlays are distributed to the number of parties authorized to have them. An appropriate book is prepared for each application.

Tags and overlays can also be generated in the field very quickly using a notebook computer and video printer. Message input could be through a small pressure tablet, keyboard, mouse, or other conventional input device. Memory of each tag and overlay can be stored within the computer, along with an audit trail as to the time and place of each application. Either the inspector or any party to the verification can determine its own message, under the scenario involved.

Each inspector, or other tag installer, may have his personal overlay pattern. It is stored both in his computer and a verification scope. In the field, he produces a tag for each item, such that it has his personal message or signature or item number encoded by his personal overlay pattern. He can perform verification either by computer or manually using his verification scope. The verification scope may be a pocket optical correlator which is placed directly on the tag, with an overlay inserted as a reticle in the eyepiece. When used with small tags, this is very convenient. A light source can be provided within the correlator to assist in viewing the aligned image.

A random tag pattern may even be generated by spraying paint or another quick-drying substance, and then scanning the pattern with a hand scanner. Overlays, with or without messages embedded, are then produced by a portable computer and printer in situ. Once the splatter pattern has been scanned into computer memory, the technique is identical to use of computer-generated random or pseudorandom patterns.

Verification of the tags can be accomplished manually or electronically. Manual correlation of tags and overlays can be performed so that the message can be visually examined or read out. Manual verification may be difficult out-of-doors, with gloves on, in poor light, or when many tags are to be verified in a short period of time. However, it is very inexpensive.

The tag may be scanned with a high resolution imaging device, which could be an infrared imager if the tags are to be nonobvious. The computer performs the correlation and displays the resulting message or verification of authenticity. This electronic reading technique is most convenient and the fastest technique when large numbers of items are to be verified in sequence, as in the automated scan for tagged currency.

Many markets exist for the techniques and system described. These include: authentication of signatures and documents; chain of custody tracking; evidence source tagging and verification; tamper indication for envelopes and packages; intrusion detection into sealed areas; improved paper seals and frangible seals; enhanced passport and secure document authentication; robotic inventory control; astronomical change detection, including location of space debris; identification of relocatable targets; and tracking of mobile platforms and sensors.

Markets also exist for systems which detect the loss, or movement of flash correlation artifacts. These include:

1. A scene advance for video tape players, which samples sequential frames and computes the FCA. The nature of videotaped imagery is such that frame-to-frame matching will produce FCA's unless and until there is a major scene change such as associated with a commercial break or abrupt change in the scene. To accommodate smooth transitions made for esthetic purposes between scenes, the flash correlator will sample and compare frames offset in time by about 0.25 seconds rather than successive frames. Due to the speed of flash correlation processing, such a scene change advance can operate with a fast forward mode.

2. A timing track or positioning track can be laid and flash correlated with current timing or positional sensor data. The FCA can be initially calibrated to appear in the center of the correlation array. Any deviation of the FCA from center will produce a control vector which can be used for repositioning or timebased correction. In the particular application to mobile robots, a videotape or multisensor recording can be generated during a training run. During subsequent operation, frame-to-frame flash correlation will detect variations from the programmed route and automatically generate a correctional control vector.

As the description of the preferred embodiments illustrates, flash correlation presents a new, useful, and nonobvious method and apparatus which is an improvement over prior art methods and devices. As will be apparent to those skilled in the art, there are numerous modifications, substitutions, and equivalents to elements of the invention which do not materially deviate from the spirit and scope of the invention. Accordingly, it is expressly intended that all such modification, variations, substitutions, and equivalents for the various elements of the invention which fall within the spirit and scope of the invention be included, as defined by the following claims.

APPENDIX A

```
       subroutine or2img(image1,image2,numx,numy,image3)
       integer*1 image1(1),image2(1),image3(1)
       k=0
       do 10 i=1,numx
       do 10 j=1,numy
       k=k+1
10     image3(k)=image1(k).or.image2(k)
       return
       end subroutine rotate(numx,numy,image1,image2,image3,theta,func)
       implicit integer*4 (i-n)
       implicit real*4 (a-h, o-z)
       integer*1 image1(1),image2(1),image3(1)
       external func
       k=0
       do 10 i=1,numx
       do 10 j=1,numy
       k=k+1
10     image3(k)=image1(k)
       xc=.5*float(numx+1)
       yc=.5*float(numy+1)
       xch=.5+xc
       ych=.5+yc
       c=cos(theta)
       s=sin(theta)
       k=0
       do 60 i=1,numx
       x0=float(i)-xc
       do 60 j=1,numy
       y0=float(j)-yc
       k=k+1
       inew=int(x0*c+y0*s+xch)
       if (inew) 60,60,20
20     if (inew-numx) 30,30,60
30     jnew=int(y0*c-x0*s+ych)
       if (jnew) 60,60,40
40     if (jnew-numy) 50,50,60
50     ient=numy*(inew-1)+jnew
       image3(ient)=func(image2(k),image3(ient))
60     continue
       return
       end subroutine gendot(numx,numy,image,frac,feature)
       implicit integer*4 (i-n)
       implicit real*4 (a-h, o-z)
       integer*1 image(1)
       k=0
       call initrandom(feature)
       do 30 i=1, numx
       do 30 j=1, numy
       k=k+1
       call random(x)
       if (x-frac) 10,10,20
10     image(k)=1
       go to 30
20     image(k)=0
30     continue
       return
``` end

```
        subroutine matcher (numx, numy, nsizex, nsizey, image, ivalue, match
    +   ,threshold, itarget, jtarget, distance)
        implicit integer*4 (i-n)
        implicit real*4 (a-h, o-z)
        integer*1 image(1)
        dimension ivalue(1)
        logical*1 match
        idx=nsizex/2
        idy=nsizey/2
        k=0
        do 10 u=idx+1,numx-idx+1
        do 10 j=idy+1,numy-idy+1
        k=k+1
        ivalue(k)=0
        do 10 l=-idx,idx
        do 10 m=-idy,idy
        n=l*numy+m+(i-1)*numy+j
10      ivalue(k)=ivalue(k)+image(n)
        nx=numx-nsizex+1
        ny=numy-nsizey+1
        is1=0
        is2=0
        ismax=0
        k=0
        do 30 i=1,nx
        do 30 j=1,ny
        k=k+1
        is1=is1+ivalue(k)
        is2=is2+ivalue(k)*ivalue(k)
        if (ivalue(k).le.ismax)go to 30
        ici=i
        icj=j
        ismax=ivalue(k)
30      continue
        t=float(nx*ny)
        fmean=float(is1)/t
        std=sqrt(float(is2)/t-fmean*fmean)
        if (sqrt(float((ici-itarget)**2+(icj-jtarget)**2)).gt.distance)
    +   go to 40
        if (float(ivalue((itarget-1)*nx+jtarget)-fmean)/std.lt.threshold)
    +   go to 40
        match=.true.
        return
40      match=.false.
        return
        end
```

APPENDIX B

```
C COPYRIGHT MIKOS LTD. 1993 ALL RIGHTS RESERVED.
C FLASHCORRELATION; REFERENCE FLASH.INP
      include 'FGRAPH.FI'
      include 'FGRAPH.FD'
      integer*1 image1[allocatable,huge](:)
      integer*1 image2[allocatable,huge](:)
      integer*1 image3[allocatable,huge](:)
      integer*1 cum[allocatable,huge](:)
      integer*4 freq[allocatable,huge](:)
      integer*1 detect,l1,l2,mask1(8),mask2(8),setmsk(8),mm
      integer*1 maska,maskb,mshift,nshift
      integer*2 i,j,iw0,ih0,x,y,itl,ihw,nf,nt,ixc,iyc,fwide,flshcl
      integer*2 iybias,m,iycc,ixcc,z3,ii,l12,iw8
      integer*2 im2ymn,im1ymn,im1ymx,im2xmn,im1xmn,im1xmx
      integer*2 ib1xmn,ib1xmx,ib2xmn,ib1,ib2,fx,fy
      integer*4 imsz,imsz8,k,l,z,y1b,y2b,x1,x2,bias
      logical*1 nodtct
      character message*53
      real*4 tl,a,b,dt,dc,ds,s,c,t,u,alpha,flashamt,thresh,flashmax
      common /bcomm/l1,l2
      equivalence (l12,l1)
      record /rccoord/xy
      data mask1/-1,127,63,31,15,7,3,1/
      data mask2/-128,-64,-32,-16,-8,-4,-2,-1/
      data setmsk/-128,64,32,16,8,4,2,1/
      open(unit=3,file='flash.inp',form='formatted',status='old',
     +err=770)
      read(3,10)iw0,ih0,alpha,detect,thresh,itl,ihw,nf,nt
      close(3)
   10 format(2i10,1e20.0,1i10,1e20.0,4i10)
      alpha=.017453292*alpha
      fwide=int(.5+.5*cos(.5*alpha)/sin(alpha))
      tl=float(itl)
      a=.366322066/float(nf)
win
      b=.5*float(ihw)
      dt=1./float(nt-1)
      dc=6.28318507*float(nf)*dt
      ds=sin(dc)
      dc=cos(dc)
      s=0.
      c=1.
      t=s
      iybias=ishft(ih0-itl,-1)
      iw8=ishft(iw0,-3)
      imsz=iw0*ih0
      imsz8=4+ishft(imsz,-3)
      ixc=ishft(iw0,-1)
      iyc=ishft(ih0,-1)
      allocate(image1(imsz8))
      allocate(image2(imsz8))
      allocate(image3(imsz))
      allocate(cum(imsz))
      allocate(freq(256))
      l2=0
      write(*,20)
   20 format(' First .RAW Image?')
      open(unit=3,file=' ',form='binary',recl=1,status='old',err=770)
      do 30 i=1,256
   30 freq(i)=0
```

```
      do 40 k=1,imsz
      read(3,end=790)ll
      image3(k)=ll
   40 freq(ll2+1)=freq(ll2+1)+1
      close(3)
      i=12345
      call seed(i)
      do 45 k=1,imsz-1
      call random(flashamt)
      l=int(flashamt*float(imsz+1-k))+k
      ll=image3(k)
      image3(k)=image3(l)
   45 image3(l)=ll
      do 50 i=2,256
   50 freq(i)=freq(i)+freq(i-1)
      k=ishft(imsz,-1)
      i=1
   60 i=i+1
      if (freq(i).lt.k)go to 60
      do 70 k=5,imsz8
      image2(k)=0
   70 image1(k)=0
      k=4
      l=0
      do 80 j=1,ih0
      do 80 ii=1,iw8
      k=k+1
      do 80 mm=1,8
      l=l+1
      ll=image3(l)
      if (ll2+1.ge.i)image1(k)=ior(image1(k),setmsk(mm))
   80 continue
      do 90 i=1,256
   90 freq(i)=0
      write(*,100)
  100 format(' Second .RAW Image to Rotate and Negate?')
      open(unit=3,file=' ',form='binary',recl=1,status='old',err=770)
      do 110 k=1,imsz
      read(3,end=790)ll
      cum(k)=ll
  110 freq(ll2+1)=freq(ll2+1)+1
      close(3)
      i=12345
      call seed(i)
      do 115 k=1,imsz-1
      call random(flashamt)
      l=int(flashamt*float(imsz+1-k))+k
      ll=cum(k)
      cum(k)=cum(l)
  115 cum(l)=ll
      do 120 i=2,256
  120 freq(i)=freq(i)+freq(i-1)
      k=ishft(imsz,-1)
      i=1
  130 i=i+1
      if (freq(i).lt.k)go to 130
      do 150 k=1,imsz
      ll=cum(k)
      if (ll2+1.ge.i)go to 140
      cum(k)=-1
```

```
          go to 150
140 cum(k)=0
150 continue
    call rotimg(iw0,ih0,cum,image3,alpha)
    k=4
    l=0
    do 160 j=1,ih0
    do 160 ii=1,iw8
    k=k+1
    do 160 mm=1,8
    l=l+1
    if (image3(l).ne.0)image2(k)=ior(image2(k),setmsk(mm))
160 continue
    deallocate(freq)
    deallocate(cum)
    deallocate(image3)
    allocate(image3(imsz8))
    l12=iw0
    image3(1)=l1
    image3(2)=l2
    l12=ih0
    image3(3)=l1
    image3(4)=l2
    i=setvideomode($vres2color)
    call clearscreen($gclearscreen)
    if (detect.ne.0)go to 170
    nodtct=.true.
    go to 190
170 nodtct=.false.
    flashmax=-1.
    k=3*(ih0+1)*(iw0+1)
    allocate(cum(k),stat=i)
    if (i.eq.0)go to 190
    write(*,180)
    stop
180 format(' Insufficient RAM for Auto-Detection!')
190 do 740 m=1,nt
    u=2.*c*s
    iycc=int(t1*(t+a*u))+iybias
    ixcc=int(b*s)+ixc
590 do 600 z=5,imsz8
600 image3(z)=image1(z)
    if (iyc.le.iycc)go to 611
    im2ymn=iyc-iycc
    im1ymn=0
    im1ymx=ih0-1+iycc-iyc
    go to 620
611 im2ymn=0
    im1ymn=iycc-iyc
    im1ymx=ih0-1
620 if (ixc.le.ixcc)go to 630
    im2xmn=ixc-ixcc
    im1xmn=0
    im1xmx=iw0-1+ixcc-ixc
    go to 640
630 im2xmn=0
    im1xmn=ixcc-ixc
    im1xmx=iw0-1
640 ib1xmn=ishft(im1xmn,-3)
    ib1xmx=ishft(im1xmx,-3)
```

```
      ib2xmn=ishft(im2xmn,-3)
      ibt1mn=iand(im1xmn,7)
      ibt1mx=iand(im1xmx,7)
      ibt2mn=iand(im2xmn,7)
      maska=mask1(1+ibt1mn)
      maskb=mask2(1+ibt1mx)
      y1b=im1ymn*iw8+5
      y2b=im2ymn*iw8+5
      if (ibt1mn-ibt2mn)680,650,690
  650 do 670 y=im1ymn,im1ymx
      x1=y1b+ib1xmn
      x2=y2b+ib2xmn
      do 660 x=ib1xmn,ib1xmx
      image3(x1)=ior(image3(x1),image2(x2))
      x1=x1+1
  660 x2=x2+1
      y1b=y1b+iw8
  670 y2b=y2b+iw8
      go to 730
  680 mshift=ibt2mn
      nshift=mshift-8
      bias=1
      go to 700
  690 mshift=-ibt1mn
      nshift=8+mshift
      bias=-1
  700 ib1=ib1xmn+1
      ib2=ib1xmx-1
      do 720 y=im1ymn,im1ymx
      x1=y1b+ib1xmn
      x2=y2b+ib2xmn
      l1=ishft(image2(x2+bias),nshift)
      l2=ishft(image2(x2),mshift)
      l1=ior(l1,l2)
      l1=iand(maska,l1)
      image3(x1)=ior(image3(x1),l1)
      do 710 x=ib1,ib2
      x1=x1+1
      x2=x2+1
      l1=ishft(image2(x2+bias),nshift)
      l2=ishft(image2(x2),mshift)
      l1=ior(l1,l2)
  710 image3(x1)=ior(image3(x1),l1)
      x1=x1+1
      x2=x2+1
      l1=ishft(image2(x2+bias),nshift)
      l2=ishft(image2(x2),mshift)
      l1=ior(l1,l2)
      l1=iand(maskb,l1)
      image3(x1)=ior(image3(x1),l1)
      y1b=y1b+iw8
  720 y2b=y2b+iw8
  730 call putimage(0,0,image3,$gpreset)
      if (nodtct)go to 711
      call flashdetect(iw0,ih0,image3(5),cum,alpha,flashamt,fx,fy
     +,flshcl)
      flashmax=amax1(flashmax,flashamt)
      istatus=setcolor(flshcl)
      if (flashamt.gt.thresh)z3=ellipse($gfillinterior,fx-fwide,
     +fy-fwide,fx+fwide,fy+fwide)
```

```
711 u=s*dc+c*ds
    c=c*dc-s*ds
    s=u
740 t=t+dt
    if (nodtct)go to 760
    call settextposition(24,1,xy)
750 format(1e16.7,' = Maximum Flash Correlation Strength')
    write(message(1:53),750)flashmax
    call outtext(message)
760 read(*,*)
    i=setvideomode($defaultmode)
    deallocate(image1,image2,image3)
    if (.not.nodtct)deallocate(cum)
    stop
770 write(*,780)
780 format(' No Such File!')
    stop
790 close(3)
    write(*,800)
800 format(' File Size is Inconsistent with Image Dimensions!')
    stop
    end
    subroutine flashdetect(ncol,nrow,image,cum,rotation,flashamt,
   +flashx,flashy,color)
    integer*1 image(1),cum(1),m,temp(4)
    integer*2 ncol,nrow,ncol1,nrow1,ncol3,width,i,j,limitr,limitc,
   +flashx,flashy,fx,fy,w3,color
    integer*4 iul,ill,iur,ilr,delta,mincum,maxcum,k,comp
    real*4 rotation,flashamt,s,s1,s2
    equivalence (comp,temp(1))
    ncol1=ncol+1
    nrow1=nrow+1
    ncol3=3*ncol1
    do 10 i=1,ncol3
 10 cum(i)=0
    iul=ncol3-2
    ill=0
    width=ishft(ncol,-3)
    temp(2)=0
    temp(3)=0
    temp(4)=0
    do 30 j=2,nrow1
    iul=iul+3
    cum(iul)=0
    cum(iul+1)=0
    cum(iul+2)=0
    do 30 i=1,width
    ill=ill+1
    do 30 m=7,0,-1
    iul=iul+3
    if (btest(image(ill),m))go to 20
    temp(1)=0
    go to 30
 20 temp(1)=1
 30 call add3(cum(iul-3),temp,cum(iul))
    iul=1
    do 40 i=2,ncol1
    iul=iul+3
    iur=iul
    do 40 j=2,nrow1
```

```
        ill=iur
        iur=iur+ncol3
     40 call add3(cum(iur),cum(ill),cum(iur))
        width=int(.5+cos(.5*rotation)/sin(rotation))
        w3=3*width
        s1=0.
        s2=0.
        delta=w3*ncol1
        mincum=320000
        maxcum=0
        limitr=nrow1-width
        limitc=ncol1-width
        k=1
        do 70 i=1,limitc
        iul=k
        k=k+3
        do 70 j=1,limitr
        ill=iul+delta
        iur=iul+w3
        ilr=iur+delta
        call add3(cum(ilr),cum(iul),temp)
        call add3(cum(iur),cum(ill),cum(iul))
        call sub3(temp,cum(iul),temp)
        if (comp.ge.mincum)go to 50
        mincum=comp
        flashx=i
        flashy=j
     50 if (comp.le.maxcum)go to 60
        maxcum=comp
        fx=i
        fy=j
     60 call float3(temp,s)
        s1=s1+s
        s2=s2+s*s
     70 iul=iul+ncol3
        s=float(limitc)*float(limitr)
        s1=s1/s
        s2=sqrt(abs(s2/s-s1*s1))
        width=ishft(width,-1)
        s=s1-float(mincum)
        s1=float(maxcum)-s1
        if (s.gt.s1)go to 80
        flashamt=s1/s2
        flashx=fx+width
        flashy=fy+width
        color=255
        return
     80 flashamt=s/s2
        flashx=flashx+width
        flashy=flashy+width
        color=255
        return
        end
        subroutine add3(src1,src2,dest)
        integer*1 src1(1),src2(1),dest(1),s1(4),s2(4)
        integer*4 s11,s21
        equivalence (s11,s1(1)),(s21,s2(1))
        s1(1)=src1(1)
        s1(2)=src1(2)
        s1(3)=src1(3)
```

```
        s1(4)=0
        s2(1)=src2(1)
        s2(2)=src2(2)
        s2(3)=src2(3)
        s2(4)=0
        s11=s11+s21
        dest(1)=s1(1)
        dest(2)=s1(2)
        dest(3)=s1(3)
        return
        end
        subroutine sub3(src1,src2,dest)
        integer*1 src1(1),src2(1),dest(1),s1(4),s2(4)
        integer*4 s11,s21
        equivalence (s11,s1(1)),(s21,s2(1))
        s1(1)=src1(1)
        s1(2)=src1(2)
        s1(3)=src1(3)
        s1(4)=0
        s2(1)=src2(1)
        s2(2)=src2(2)
        s2(3)=src2(3)
        s2(4)=0
        s11=s11-s21
        dest(1)=s1(1)
        dest(2)=s1(2)
        dest(3)=s1(3)
        return
        end
        subroutine float3(src,dest)
        integer*1 src(1),s1(4)
        integer*4 s11
        real*4 dest
        equivalence (s11,s1(1))
        s1(1)=src(1)
        s1(2)=src(2)
        s1(3)=src(3)
        s1(4)=0
        dest=float(s11)
        return
        end
        subroutine rotimg(width,height,pixin,pixout,alpha)
        integer*1 m,pixin(1),pixout(1),n0,n255
        integer*2 width,height,w1,h1,i,j,inew,jnew,ixb(8),iyb(8)
        integer*4 numpix,k,l
        real*4 alpha,xc,yc,xcon,ycon,c,s,xcon1,ycon1,x
        data ixb/-1,0,1,-1,1,-1,0,1/
        data iyb/-1,-1,-1,0,0,1,1,1/
        call gettim(i,j,inew,jnew)
        i=ieor(i,j)+inew*jnew
        call seed(i)
        w1=width-1
        h1=height-1
        xc=.5*float(w1)
        yc=.5*float(h1)
        numpix=width*height
        c=cos(alpha)
        s=sin(alpha)
        xcon=xc-xc*c-yc*s+.5
        ycon=yc+xc*s-yc*c+.5
```

```
      do 10 k=1,numpix
   10 pixout(k)=1
      l=0
      do 60 j=0,h1
      x=float(j)
      xcon1=x*s+xcon
      ycon1=x*c+ycon
      do 60 i=0,w1
      l=l+1
      x=float(i)
      inew=int(xcon1+x*c)
      if (inew)60,30,20
   20 if (inew.gt.w1)go to 60
   30 jnew=int(ycon1-x*s)
      if (jnew)60,50,40
   40 if (jnew.gt.h1)go to 60
   50 k=jnew*width+inew+1
      pixout(k)=pixin(l)
   60 continue
      l=0
      do 180 j=0,h1
      do 180 i=0,w1
      l=l+1
      if (pixout(l))180,180,70
   70 n0=0
      n255=0
      do 140 m=1,8
      inew=i+ixb(m)
      if (inew)140,90,80
   80 if (inew.gt.w1)go to 140
   90 jnew=j+iyb(m)
      if (jnew)140,110,100
  100 if (jnew.gt.h1)go to 140
  110 k=jnew*width+inew+1
      if (pixout(k))120,130,140
  120 n255=n255+1
      go to 140
  130 n0=n0+1
  140 continue
      m=n0+n255
      if (m.ge.6)go to 150
      call random(c)
      if (c-.5)160,170,170
  150 if (n0-n255)160,170,170
  160 pixout(l)=-1
      go to 180
  170 pixout(l)=0
  180 continue
      return
      end
```

FLASH.INP
X AND Y DIMENSIONS OF IMAGES, ANGLE, AUTO DETECT FCA OR NOT (1=YES, 0=NO),
STANDARD DEVIATIONS FOR AUTODETECT, SEARCH PARAMETERS HORIZ VERT AND TIGHTNESS
OF SWEEP, NUMBER OF LOCATIONS TO ANALYZE)

114,114,3,1,3.1,3,3,3,3

PRESENTS SINGLE LOCATION OF POSSIBLE FCA FOR IMAGES 114X114, WITH AUTODETECT OF
FCA'S HAVING DENSITY GREATER THAN 3.1 STANDARD DEVIATIONS FROM BACKGROUND.

I claim:

1. A method of determining whether and to what degree a first array of dispersed elements has changed with time, said first array created at a first instance in time, said method comprising the steps of:
   a) creating at a second instance in time not earlier than said first time instance a second array of dispersed elements;
   b) overlaying in a spatial domain said first and second arrays;
   c) imparting a rotational movement to at least one of said first and second arrays relative to the other of said first and second arrays; and
   d) determining the strength of a correlation artifact to indicate the degree of similarity between said first and second arrays.

2. The change determining method of claim 1, wherein said dispersed element of said first and second arrays have varying intensity values and there is included before step b) a step of inverting the intensity values of said dispersed elements of one of said first and second arrays with respect to said dispersed elements of the other of said first and second arrays.

3. The change determining method of claim 1, wherein before step b) there is included a step of sampling said dispersed elements of said first array in a given fashion to provide said first sampled array, said dispersed elements of said second array to be sampled in said given fashion to provide said second sampled array before the degree of similarity between said first and second arrays is determined in step d).

4. The change determining method of claim 1, wherein before step b) there is included a step of rearranging said first and second arrays in a like manner to provide scrambled first and second arrays respectively.

5. The method of change determining of claim 1, wherein there is further included the steps of affixing a reference pattern to an article, capturing at said first time instance an image of the article with the affixed reference pattern thereon as said first array of elements, capturing at the second time instance an image of the article with the affixed reference pattern thereon as said second array of elements, the strength of said correlation artifact indicating the degree of similarity with said reference pattern.

6. The change determining method of claim 5 as applied to a process for manufacturing an article, wherein said second array represents a properly manufactured article and the presence of said correlation artifact indicates a properly manufactured article.

7. The change determining method of claim 6, wherein said manufacturing process comprises the steps of:
   1) affixing said reference pattern to the article before said step of capturing said first array of dispersed elements is performed;
   2) subjecting said article to at least one manufacturing step whereby said reference pattern may be changed; and
   3) performing steps b, c and d to determine whether said article is being properly manufactured.

8. The change determining method of claim 7, wherein after step c), rotating one of said first and second arrays with respect to the other about a point so that said first and second arrays of dispersed elements are rotationally unaligned, to produce a composite array of the combined elements therefrom.

9. The change determining method of claim 8, wherein there is further included the step of sensing first and second average intensities respectively of all of the combined elements within first and second distinct areas of said composite array.

10. The change determining method of claim 9, wherein there is further included the step of detecting the presence of said correlation artifact produced by the combined elements of the composite array by determining a variation between said first and second average intensities greater than a selected threshold value to indicate a properly manufactured article and by determining a variation of said first and second average intensities not greater than said selected threshold value to indicate the absence of said correlation artifact to indicate an improperly manufactured article.

11. The change determining method of claim 5, wherein the reference pattern has been warped to impose scalar distortions Sx and Sy on said second array, and there is further included a step of dewarping said second array so that its scale and orientation at one of a plurality of x,y grid points of predetermined increments correspond to the scale and orientation of said first array.

12. The change determining method of claim 11, wherein said dewarping step includes the steps of:
   after step c) rotating one of said first and second arrays through an angle $\theta$ with respect to the other;
   moving one of said first and second arrays a predetermined distance, $\Delta_x$, in a first direction;
   measuring the corresponding displacements $C_x$, $C_y$, of said correlation artifact, $C_x$ being parallel to the first direction, and $C_y$ being perpendicular to the first direction;
   subsequently moving said one array a predetermined distance, $\Delta_y$, in a second direction, perpendicular to the first direction;
   measuring the corresponding displacements $D_x$, $D_y$, of said correlation artifact, $D_x$ being perpendicular to the second direction, and $D_y$ being parallel to the second direction;
   evaluating the rotation angle, $\theta$, and scalar distortions $S_x$, $S_y$, between said first and second arrays at the location of said correlation artifact using the measured displacements according to following relationships:

$$\theta = \arctan\left[\frac{(C_y\Delta_y + D_x\Delta_x)}{(D_y\Delta_x - C_x\Delta_y)}\right]$$

$$S_x = \frac{D_x\sqrt{(C_y\Delta_y + D_x\Delta_x)^2 + (D_y\Delta_x - C_x\Delta_y)^2}}{\Delta_y(C_yD_y + C_xD_x)}$$

$$S_y = \frac{-C_y\sqrt{(C_y\Delta_y + D_x\Delta_x)^2 + (D_y\Delta_x - C_x\Delta_y)^2}}{\Delta_x(C_yD_y + C_xD_x)}$$

repositioning at least one of the images under said correlation artifact according to the following relationships:

$$\delta_x = x_o(1 - [X]S_x \cos\theta) + y_oS_x \sin\theta$$

$$\delta_y = -x_oS_y \sin\theta + y_o(1 - S_y \cos\theta)$$

where $x_o$, $y_o$ are the coordinates of the x, y grid point in said second array, and $\delta_x$, $\delta_y$ are the distances along the respective axes that the record information at the grid point $(x_o, y_o)$ must be moved to dewarp the array information for that grid point; and repeating the foregoing steps for each x,y grid point.

13. The change determining method of claim 12, wherein there is further included the steps of:

generating a superimposed image of said dewarping second array and said corresponding first array; and inspecting said superimposed image to identify regions at variance with corresponding regions of said first array to thereby identify changes occurring in the reference pattern.

14. A method of examining a sequence of images including the method of determining as claimed in claim 1, wherein a sequence of images includes at least first and second images, and said first and second arrays of dispersed elements correspond respectively to the first and second images, and there is further included the steps of storing at said first time instance said first array, and executing steps b) and c) to indicate the presence of said correlation artifact as an indication of similarity between the first and second images.

15. The image examining method as claimed in claim 14, wherein the image sequence comprises a plurality of images, and the first and second image are spaced apart.

16. The image examining method as claimed in claim 15, wherein each of the plurality of images is approximately the same size and the first and second images are spaced a selected number of images apart.

17. The image examining method as claimed in claim 16, wherein the image sequence includes at least two sets of sequential images corresponding to distinct scenes, using the absence of said correlation artifact to identify a change of scenes.

18. The image examining method as claimed in claim 17, wherein the image sequence is recorded on a video recording medium.

19. A method of automatic advancing to the next scene of images recorded on the video recording medium including the image examining method of claim 18, wherein detecting the absence of said correlation artifact terminates the advancing of the video recording medium to view the first image on the next scene.

20. A method of automatic advancing to the next scene of images stored on the video recording medium including the image examining method of claim 18, wherein the video recording medium is automatically advanced as long as correlation artifact is present.

21. A method of determining whether an unknown article is one of a plurality of known articles including said change determining method of claim 1, further including the steps of:

capturing an image of the plurality of known articles to provide a corresponding plurality of first arrays of dispersed elements;

creating a database of said plurality of first arrays;

said step a) including capturing an image of the unknown article to provide said second array of dispersed elements;

said steps b), c) and d) including overlaying said second array on said database and using flash correlation to identify the strongest match between said second array and one of said plurality of arrays.

22. The method of determining of claim 21, wherein the unknown and plurality of articles are fibers of varying sizes, colors, and shapes.

23. The method of determining of claim 22, wherein each of said capturing steps takes an image of a pattern previously applied to each of said known and unknown articles.

24. The method of determining of claim 23, wherein the applied patterns are tooling marks on fired bullets and shell casings.

25. The method of determining of claim 23, wherein the applied pattern are printed information including bar codes.

26. The method of claim 23, wherein the applied patterns are biometric indicators.

27. A method of determining the degree of similarity between a first array of dispersed elements and a second array of dispersed elements, said method comprising the steps of:

a) providing said first and second arrays;

b) overlaying in a spatial domain said first and second arrays;

c) imparting a rotational movement to at least one of said first and second arrays relative to the other of said first and second arrays; and d) determining the strength of a correlation artifact to indicate the degree of similarity between said first and second arrays.

28. The change determining method of claim 27, wherein said rotational movement occurs about a point, and said point is disposed within said spatial domain of said overlaid first and second arrays.

29. The change determining method of claim 27, wherein said dispersed elements of said first and second arrays have varying intensity values and there is included before step b) a step of inverting the intensity values of said dispersed elements of one of said first and second arrays with respect to said dispersed elements of the other of said first and second arrays.

30. The change determining method of claim 27, wherein before step b) there is included a step of sampling said dispersed elements of said first array in a given fashion to provide said first sampled array, said dispersed elements of said second array to be sampled in said given fashion to provide said second sampled array before the degree of similarity between said first and second sampled arrays is determined in step d).

31. The change determining method of claim 27, wherein before step b) there is included a step of rearranging said first and second arrays in a like manner to provide scrambled first and second arrays respectively.

* * * * *